(12) United States Patent
Shibata

(10) Patent No.: US 11,366,297 B2
(45) Date of Patent: *Jun. 21, 2022

(54) VARIABLE MAGNIFICATION OPTICAL SYSTEM, OPTICAL APPARATUS AND METHOD FOR MANUFACTURING VARIABLE MAGNIFICATION OPTICAL SYSTEM

(71) Applicant: NIKON CORPORATION, Tokyo (JP)

(72) Inventor: Satoru Shibata, Yokohama (JP)

(73) Assignee: Nikon Corporation, Tokyo (JP)

( * ) Notice: Subject to any disclaimer, the term of this patent is extended or adjusted under 35 U.S.C. 154(b) by 189 days.

This patent is subject to a terminal disclaimer.

(21) Appl. No.: 16/528,603

(22) Filed: Jul. 31, 2019

(65) Prior Publication Data

US 2019/0353881 A1    Nov. 21, 2019

Related U.S. Application Data

(60) Division of application No. 14/979,409, filed on Dec. 27, 2015, now Pat. No. 10,409,043, which is a
(Continued)

(30) Foreign Application Priority Data

Jun. 28, 2013 (JP) .................................. 2013-136678
Jun. 28, 2013 (JP) .................................. 2013-136679
(Continued)

(51) Int. Cl.
*G02B 15/14* (2006.01)
*G02B 15/20* (2006.01)
(Continued)

(52) U.S. Cl.
CPC ...... *G02B 15/144113* (2019.08); *G02B 13/18* (2013.01); *G02B 15/145121* (2019.08); *G02B 15/20* (2013.01); *G02B 27/646* (2013.01)

(58) Field of Classification Search
None
See application file for complete search history.

(56) References Cited

U.S. PATENT DOCUMENTS 7,136,231 B2    11/2006   Ito et al.
8,238,039 B2 *  8/2012   Yamagami ..... G02B 15/144113
                                                                  359/687
(Continued)

FOREIGN PATENT DOCUMENTS

CN    102193175 A    9/2011
CN    202049279 U    11/2011
(Continued)

OTHER PUBLICATIONS

Office Action dated Jul. 1, 2020, in Chinese Patent Application No. 201811026007.5.
(Continued)

*Primary Examiner* — Derek S. Chapel
(74) *Attorney, Agent, or Firm* — SGPatents PLLC

(57) ABSTRACT

A variable power optical system (ZL) used for an optical apparatus, such as a camera (1), includes, in order from an object: a first lens group (G1) having positive refractive power; a second lens group (G2) having negative refractive power; a third lens group (G3) having positive refractive power; and a fourth lens group (G4) having positive refractive power. The distance between the respective lens groups changes upon zooming from the wide-angle end state to the telephoto end state. The third lens group (G3) includes: an intermediate group (G3b) constituted by a positive lens, a negative lens, a negative lens, and a positive lens; and an image side group (G3c) having negative refractive power and disposed to an image side of the intermediate group (G3b). Upon focusing, the position of the intermediate group
(Continued)

(G3b) with respect to the image plane is fixed and the image side group (G3c) moves along the optical axis.

19 Claims, 62 Drawing Sheets

Related U.S. Application Data continuation of application No. PCT/JP2014/003418, filed on Jun. 26, 2014.

(30) Foreign Application Priority Data

Nov. 18, 2013 (JP) ................................ 2013-237570
Nov. 18, 2013 (JP) ................................ 2013-237571

(51) Int. Cl.
    *G02B 27/64*     (2006.01)
    *G02B 13/18*     (2006.01)

(56) References Cited

U.S. PATENT DOCUMENTS

| | | | |
|---|---|---|---|
| 10,409,043 B2* | 9/2019 | Shibata | G02B 13/18 |
| 2003/0165020 A1 | 9/2003 | Satori et al. | |
| 2004/0161228 A1 | 8/2004 | Nanba | |
| 2005/0046962 A1 | 3/2005 | Nanba | |
| 2007/0279743 A1 | 12/2007 | Kushida | |
| 2008/0019018 A1* | 1/2008 | Ito | G02B 15/144113 |
| | | | 359/687 |
| 2008/0297901 A1* | 12/2008 | Mitsuki | G02B 27/646 |
| | | | 359/557 |
| 2011/0149118 A1 | 6/2011 | Misaka | |
| 2011/0176224 A1* | 7/2011 | Sato | G03B 3/10 |
| | | | 359/683 |
| 2011/0261469 A1 | 10/2011 | Arai | |
| 2011/0273776 A1 | 11/2011 | Obama et al. | |
| 2012/0019925 A1 | 1/2012 | Kurioka et al. | |
| 2012/0050603 A1 | 3/2012 | Imaoka et al. | |
| 2012/0087017 A1 | 4/2012 | Fujisaki | |
| 2012/0307366 A1 | 12/2012 | Bito et al. | |
| 2013/0038946 A1 | 2/2013 | Morooka | |
| 2013/0169856 A1 | 7/2013 | Misaka | |
| 2015/0241672 A1* | 8/2015 | Masugi | G02B 9/64 |
| | | | 359/683 |
| 2016/0109692 A1 | 4/2016 | Shibata | |
| 2017/0068076 A1* | 3/2017 | Ito | G02B 15/143105 |

FOREIGN PATENT DOCUMENTS

| | | |
|---|---|---|
| EP | 1 965 242 A1 | 9/2008 |
| JP | 2000-227549 A | 8/2000 |
| JP | 2001-183585 A | 7/2001 |
| JP | 2002-169087 A | 6/2002 |
| JP | 2003-255228 A | 9/2003 |
| JP | 2004-212512 A | 7/2004 |
| JP | 2005-062228 A | 3/2005 |
| JP | 2006-308957 A | 11/2006 |
| JP | 2007-219040 A | 8/2007 |
| JP | 2007-322669 A | 12/2007 |
| JP | 2008-064777 A | 3/2008 |
| JP | 2008-122492 A | 5/2008 |
| JP | 2008-191301 A | 8/2008 |
| JP | 2011-128361 A | 6/2011 |
| JP | 2011-128371 A | 6/2011 |
| JP | 2011-170086 A | 9/2011 |
| JP | 2011-186159 A | 9/2011 |
| JP | 2011-232502 A | 11/2011 |
| JP | 2012-042660 A | 3/2012 |
| JP | 2012-042927 A | 3/2012 |
| JP | 2012-083472 A | 4/2012 |
| JP | 2012-159746 A | 8/2012 |
| JP | 2015-099174 A | 5/2015 |
| JP | 2015-099175 A | 5/2015 |
| WO | WO 2011/102089 A1 | 8/2011 |

OTHER PUBLICATIONS

Office Action dated Jun. 9, 2020, in Chinese Patent Application No. 201811025342.3.
International Search Report from International Patent Application No. PCT/JP2014/003418, dated Sep. 22, 2014.
International Preliminary Report on Patentability from International Patent Application No. PCT/JP2014/003418, dated Jan. 7, 2016.
Office Action dated Jul. 21, 2017 in Japanese Patent Application No. 2013-237570.
Office Action dated Oct. 4, 2018 in Japanese Patent Application No. 2017-211089.
Office Action dated Oct. 4, 2018 in Japanese Patent Application No. 2017-211090.
Extended European search report for European Patent Application No. 14818689.3, dated Dec. 19, 2016.
Office Action dated Nov. 8, 2017 in Chinese Patent Application No. 201480042953.2.
Office Action dated Apr. 5, 2017 in Chinese Patent Application No. 201480042953.2.
Office Action dated Apr. 20, 2017 in Korean Patent Application No. 10-2016-7002435.
Office Action dated Mar. 17, 2021, in Chinese Patent Application No. 201811025342.3.

* cited by examiner

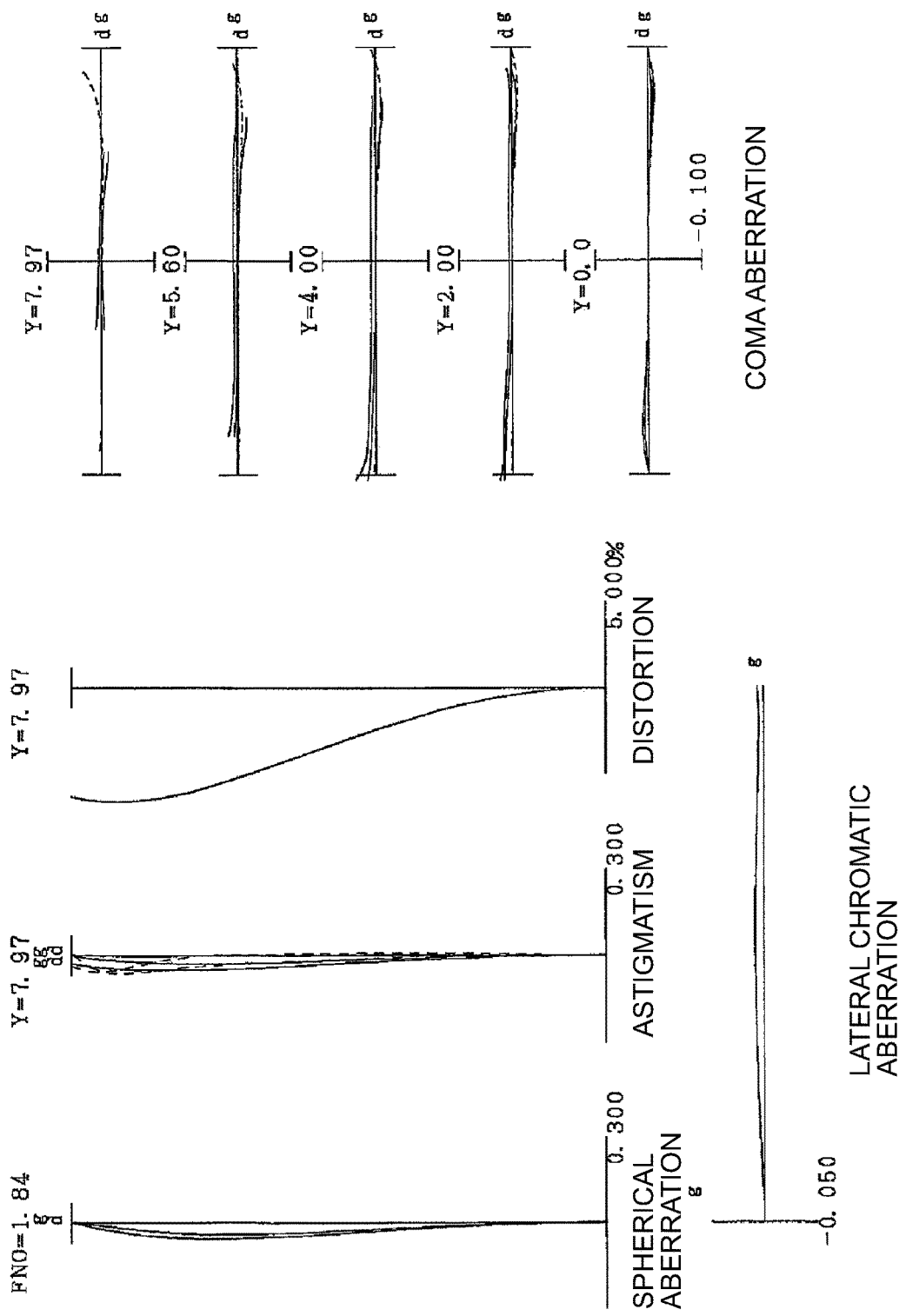

COMA ABERRATION

COMA ABERRATION

COMA ABERRATION

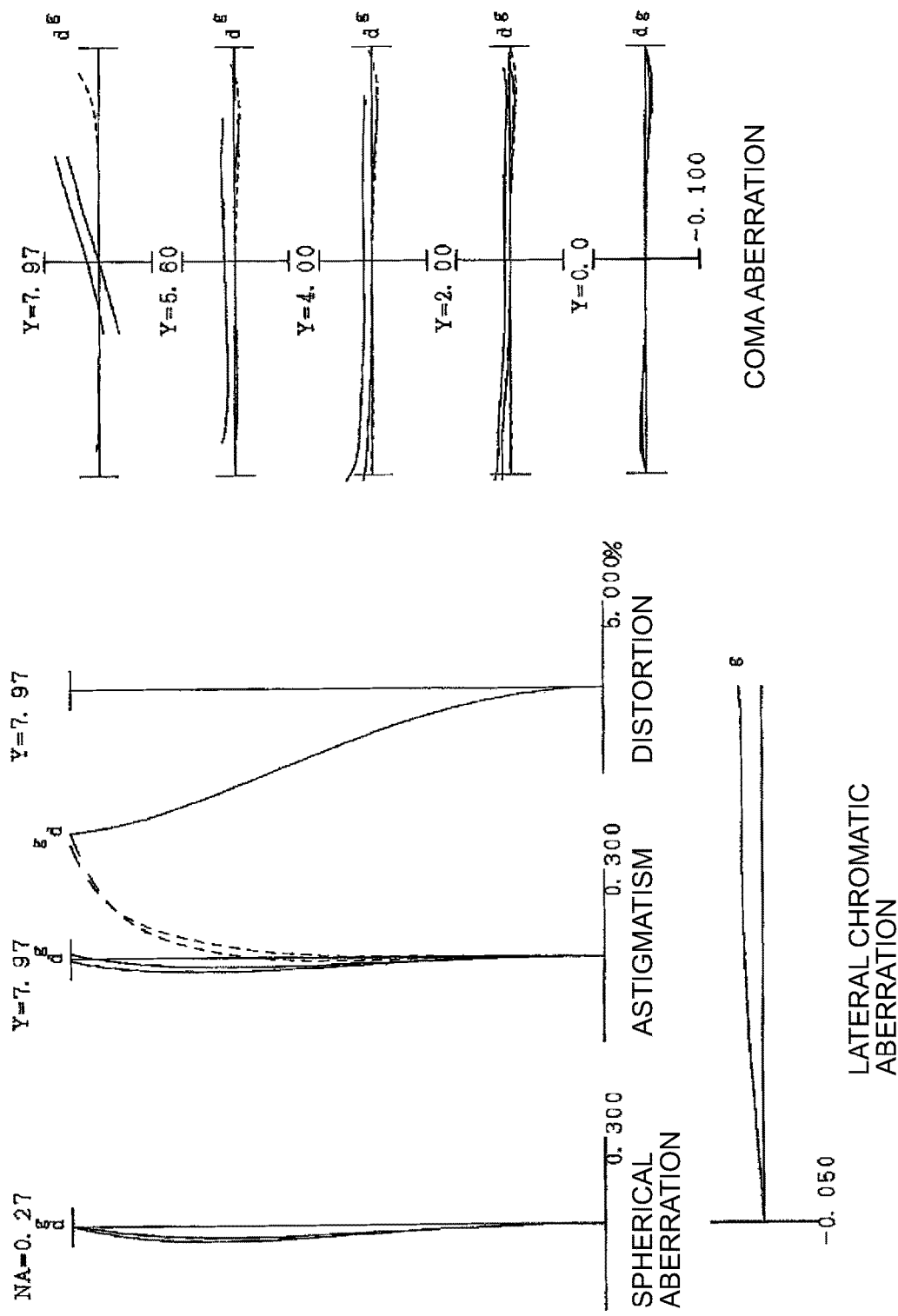

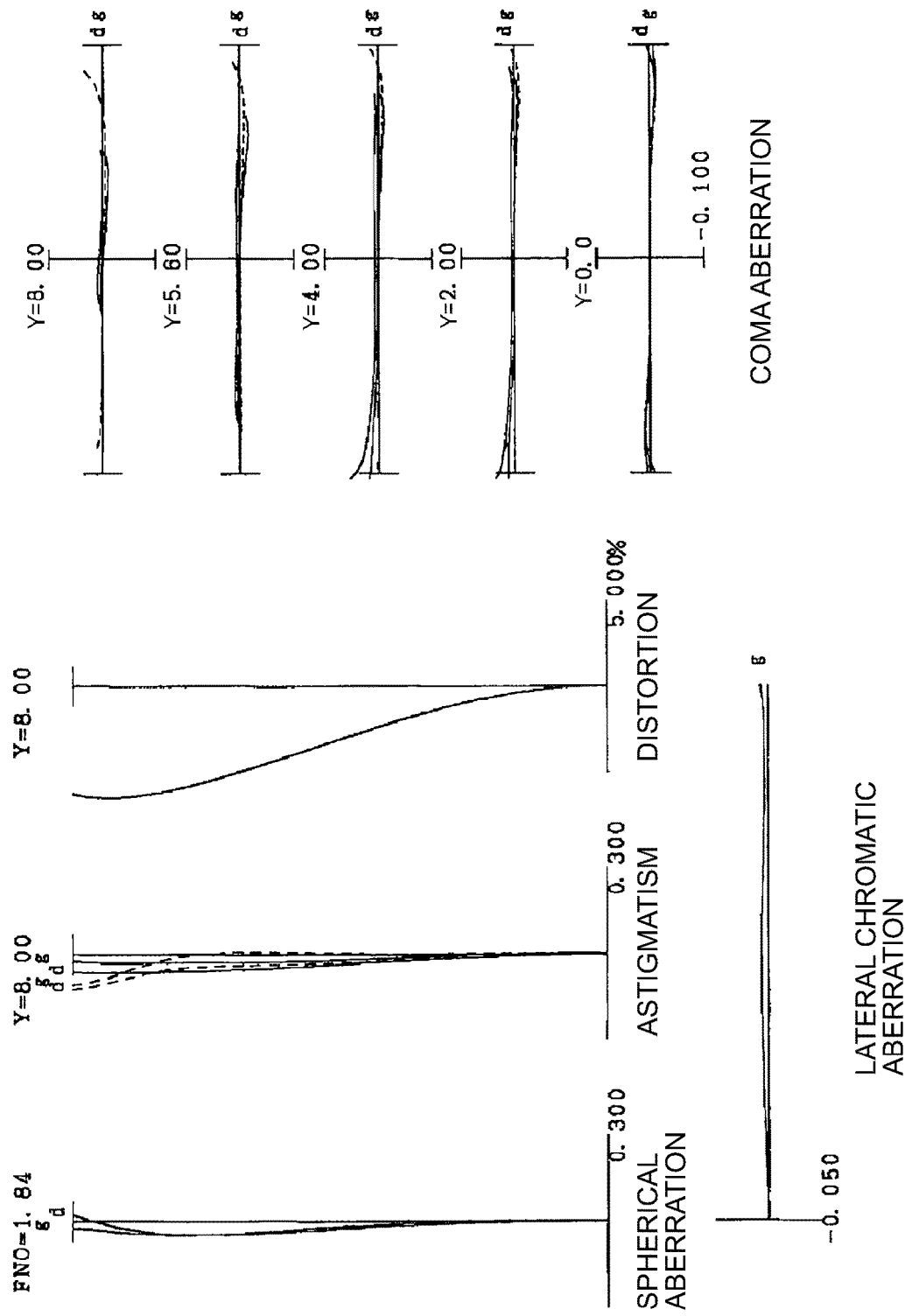

COMA ABERRATION

COMA ABERRATION

COMA ABERRATION

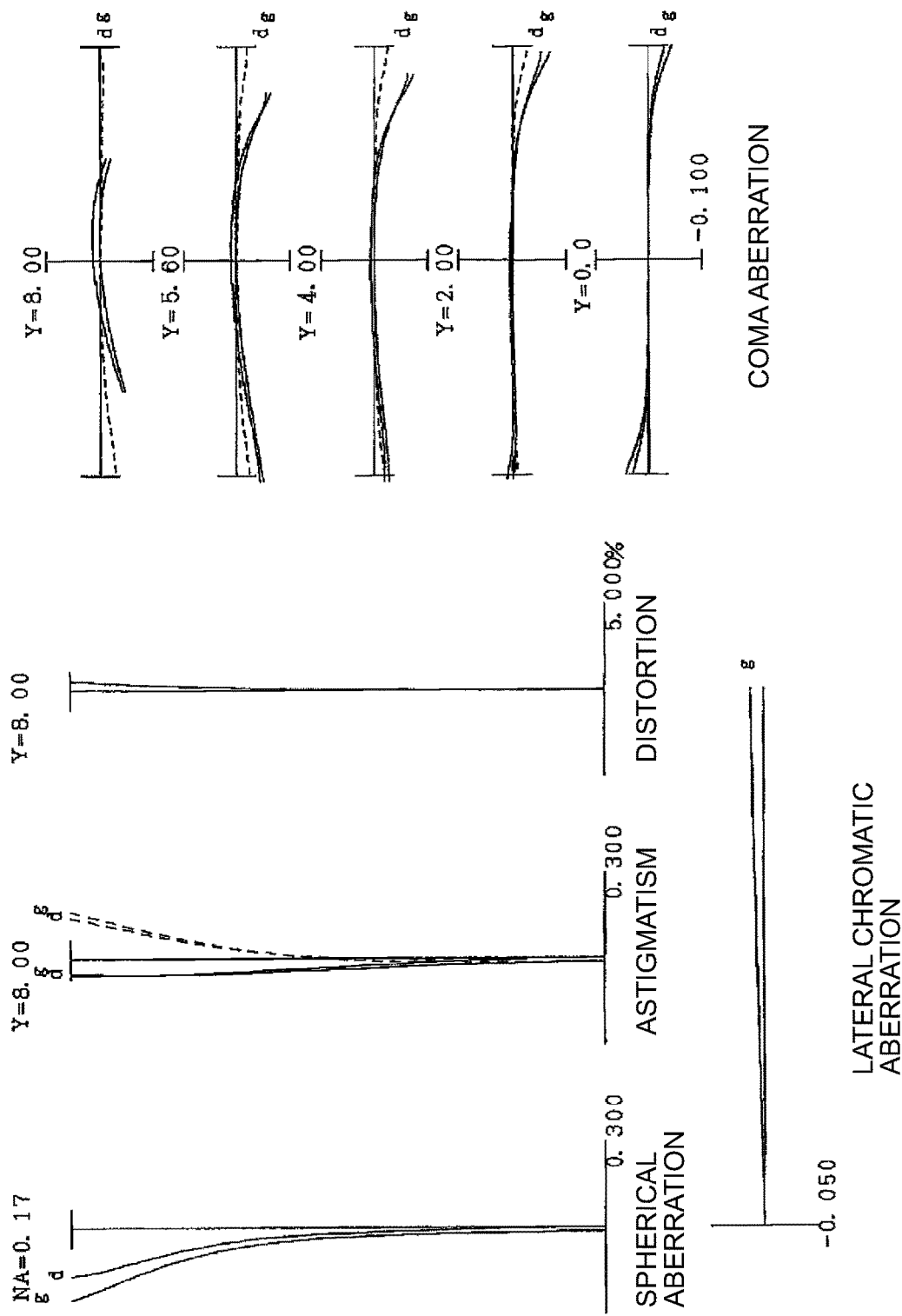

COMA ABERRATION

COMA ABERRATION

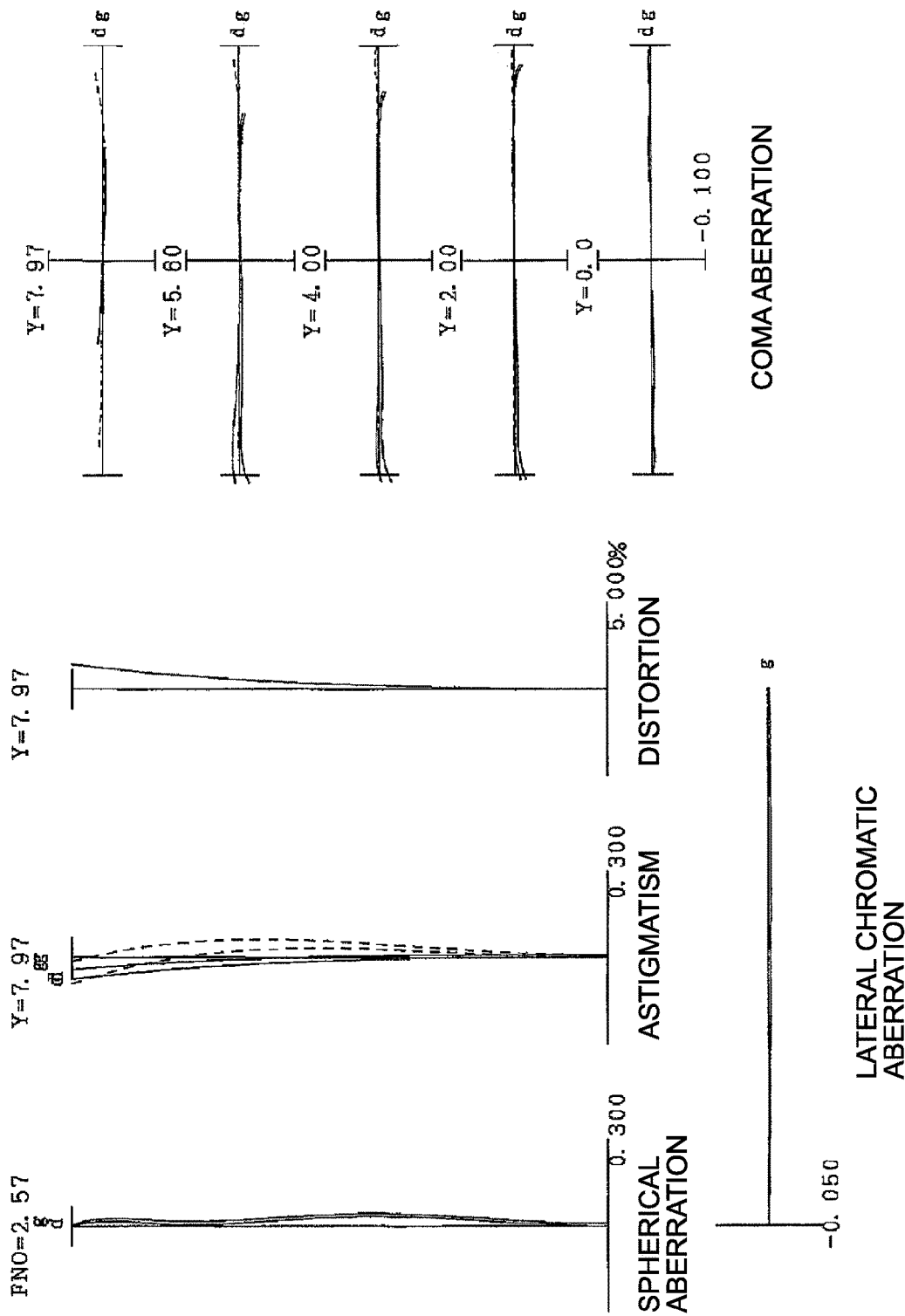

COMA ABERRATION

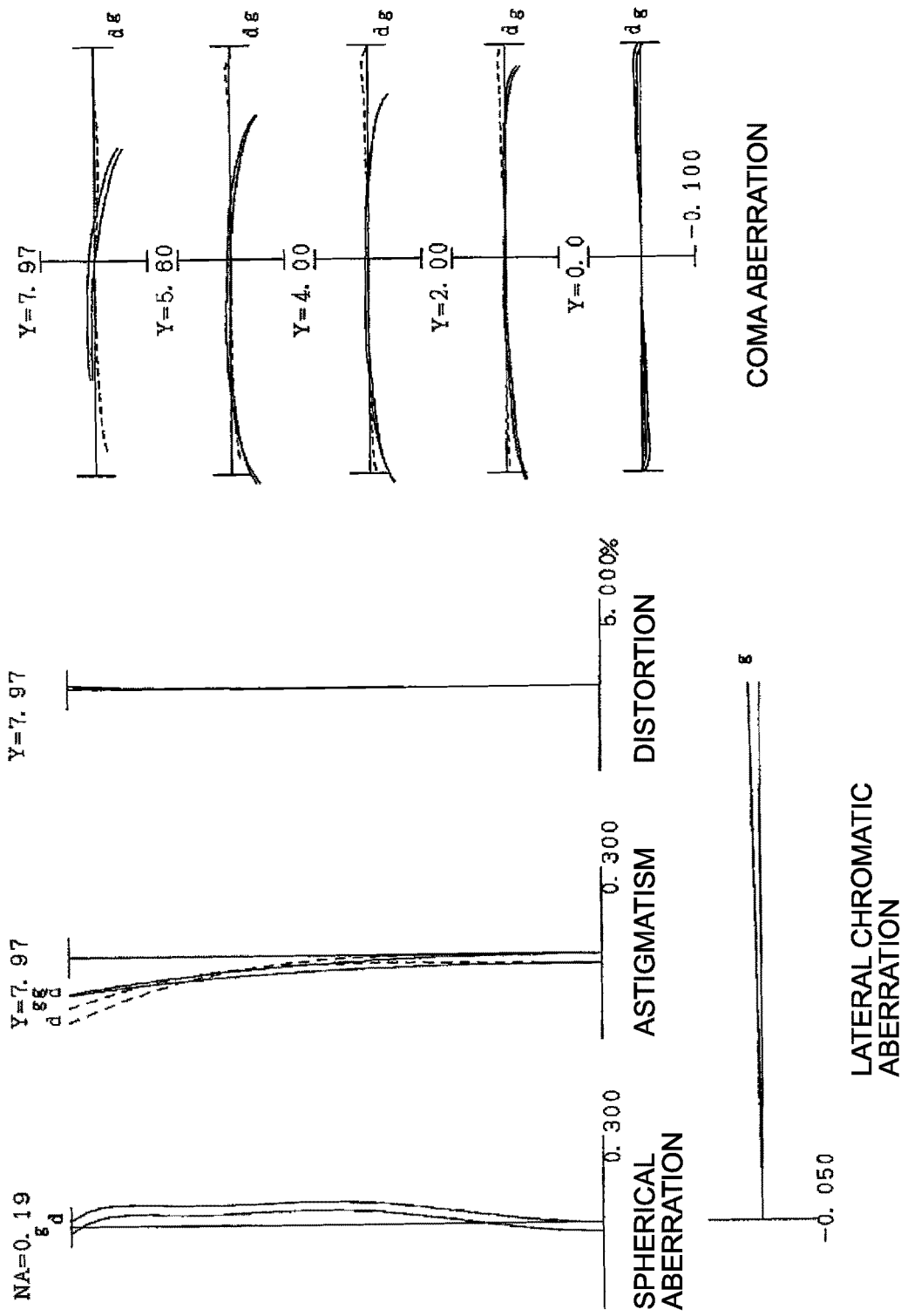

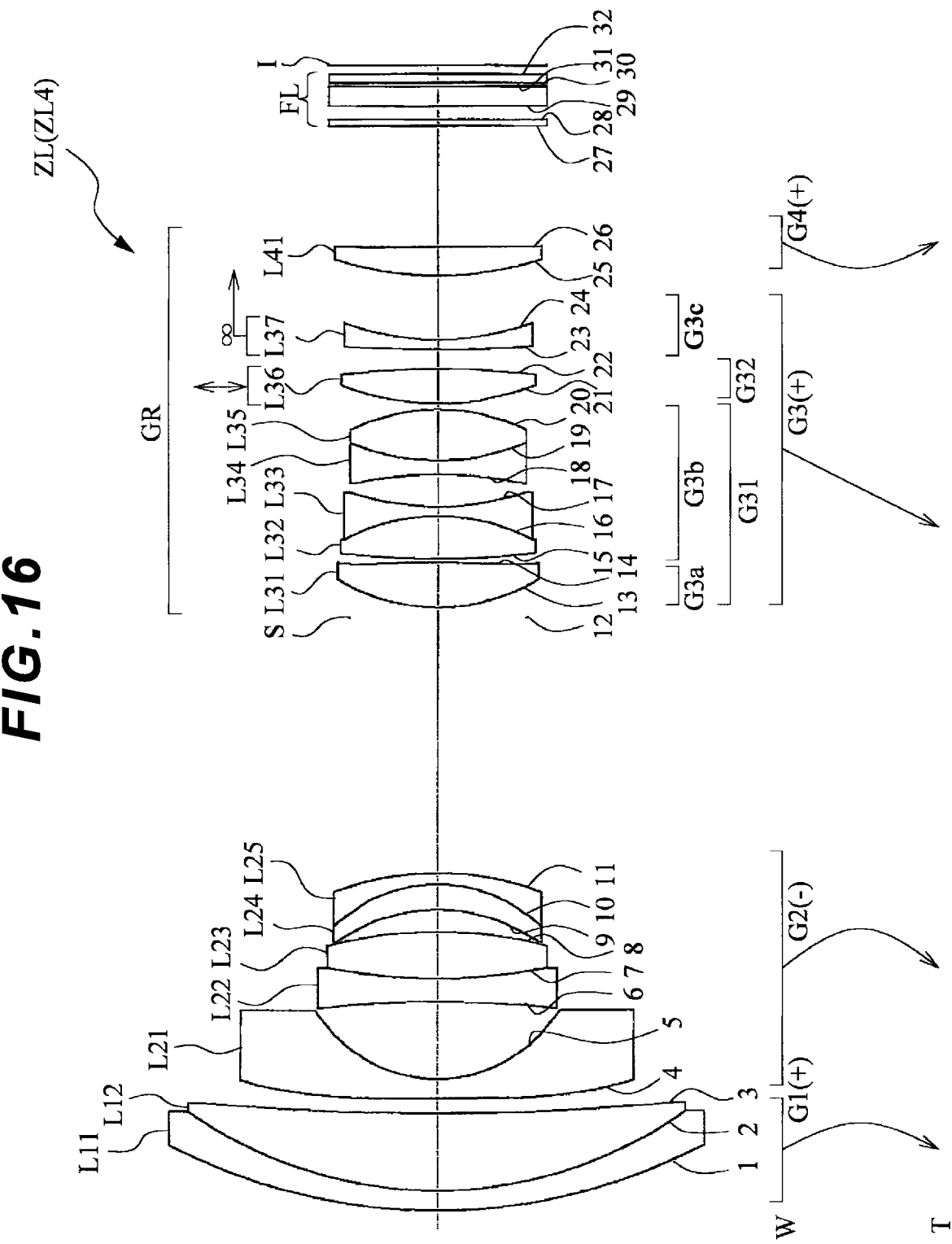

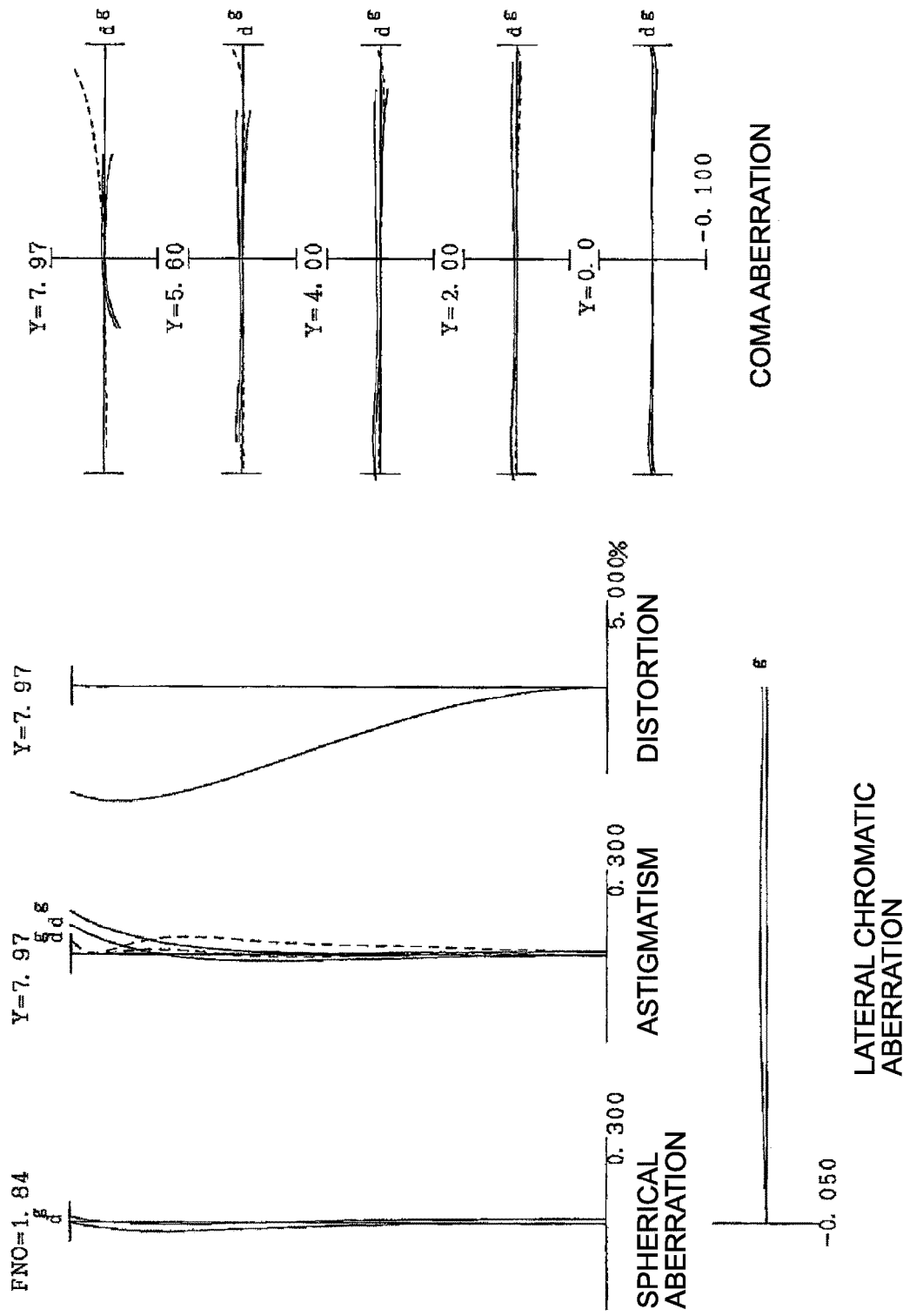

COMA ABERRATION

COMA ABERRATION

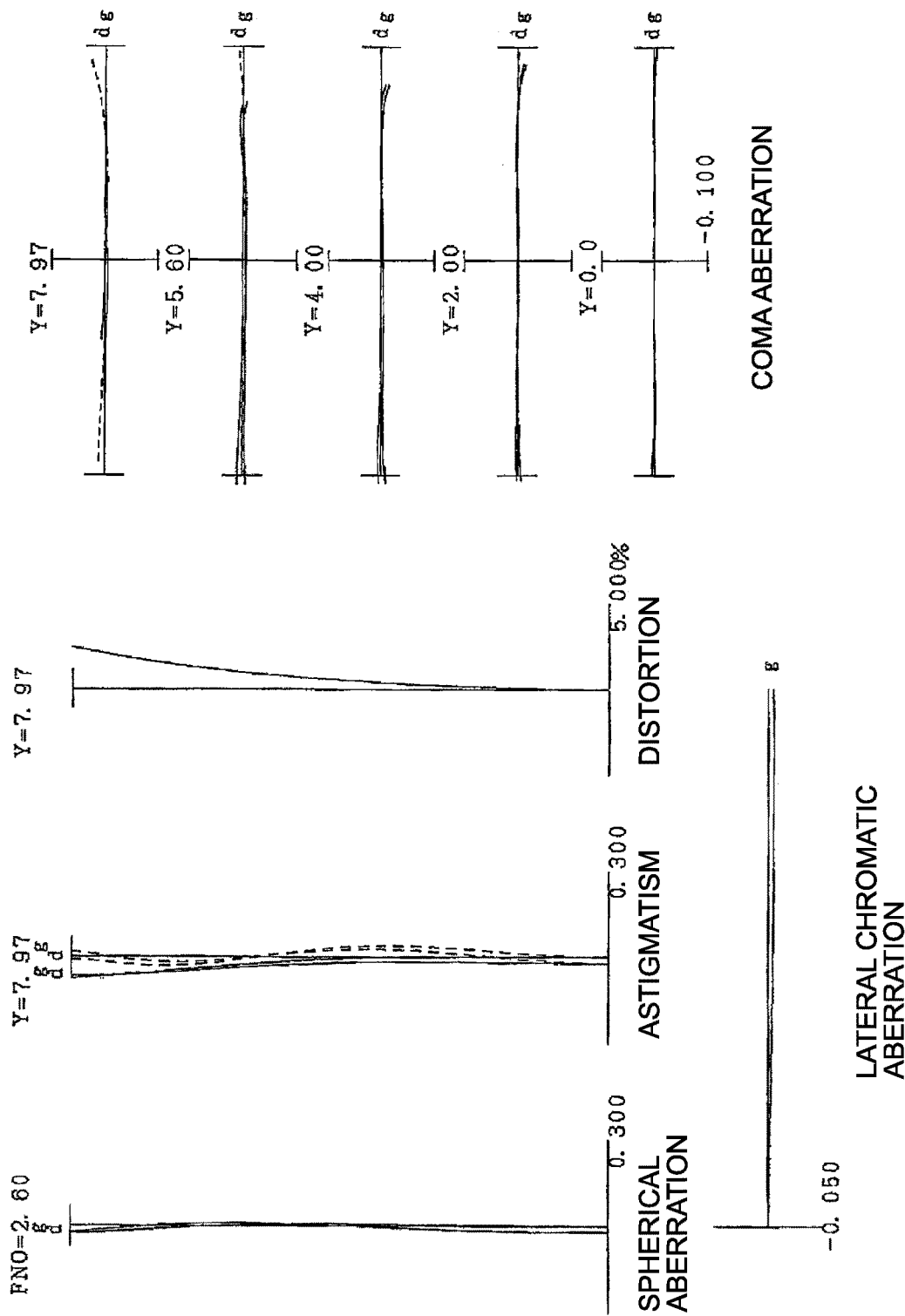

COMA ABERRATION

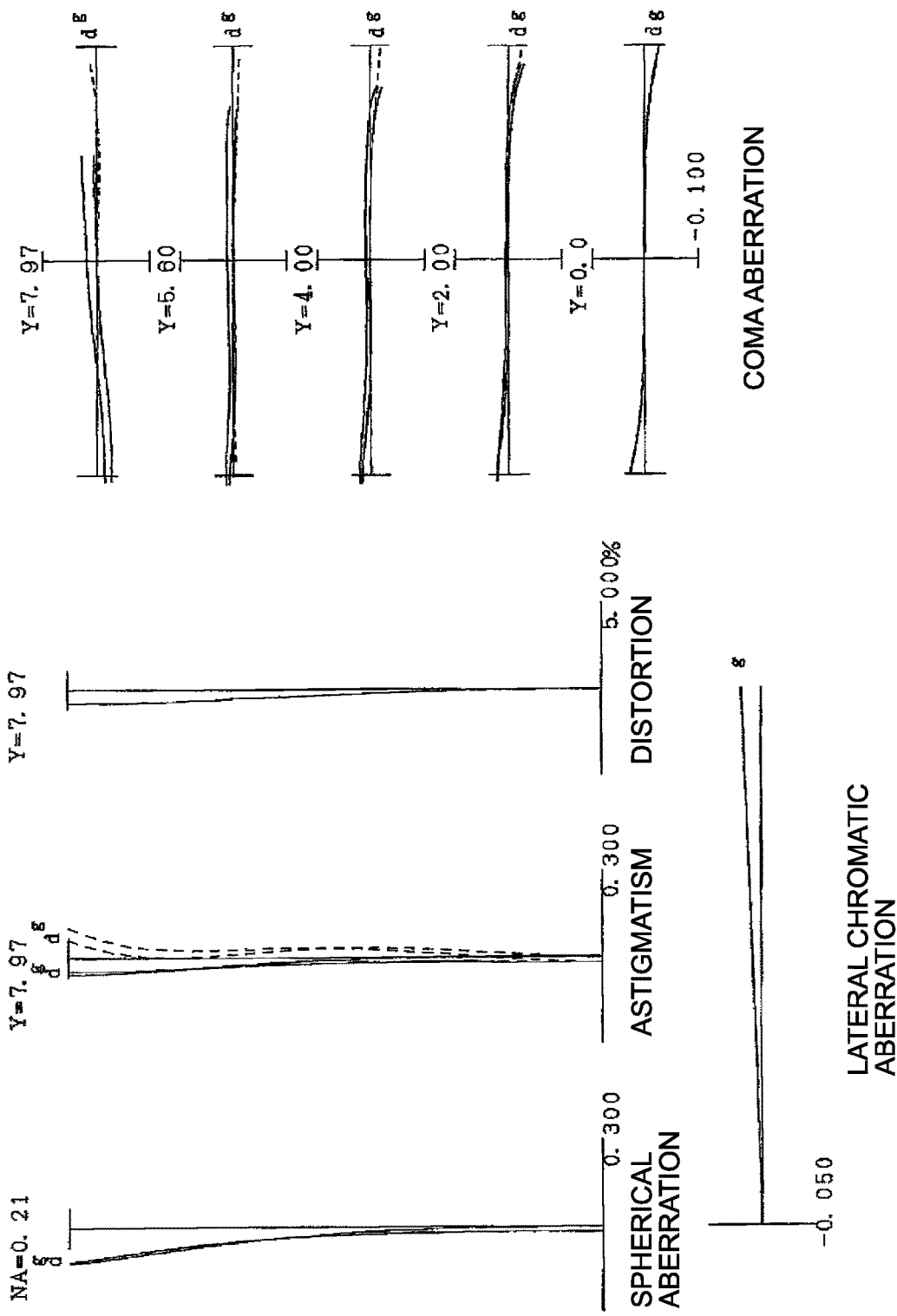

COMA ABERRATION

COMA ABERRATION

COMA ABERRATION

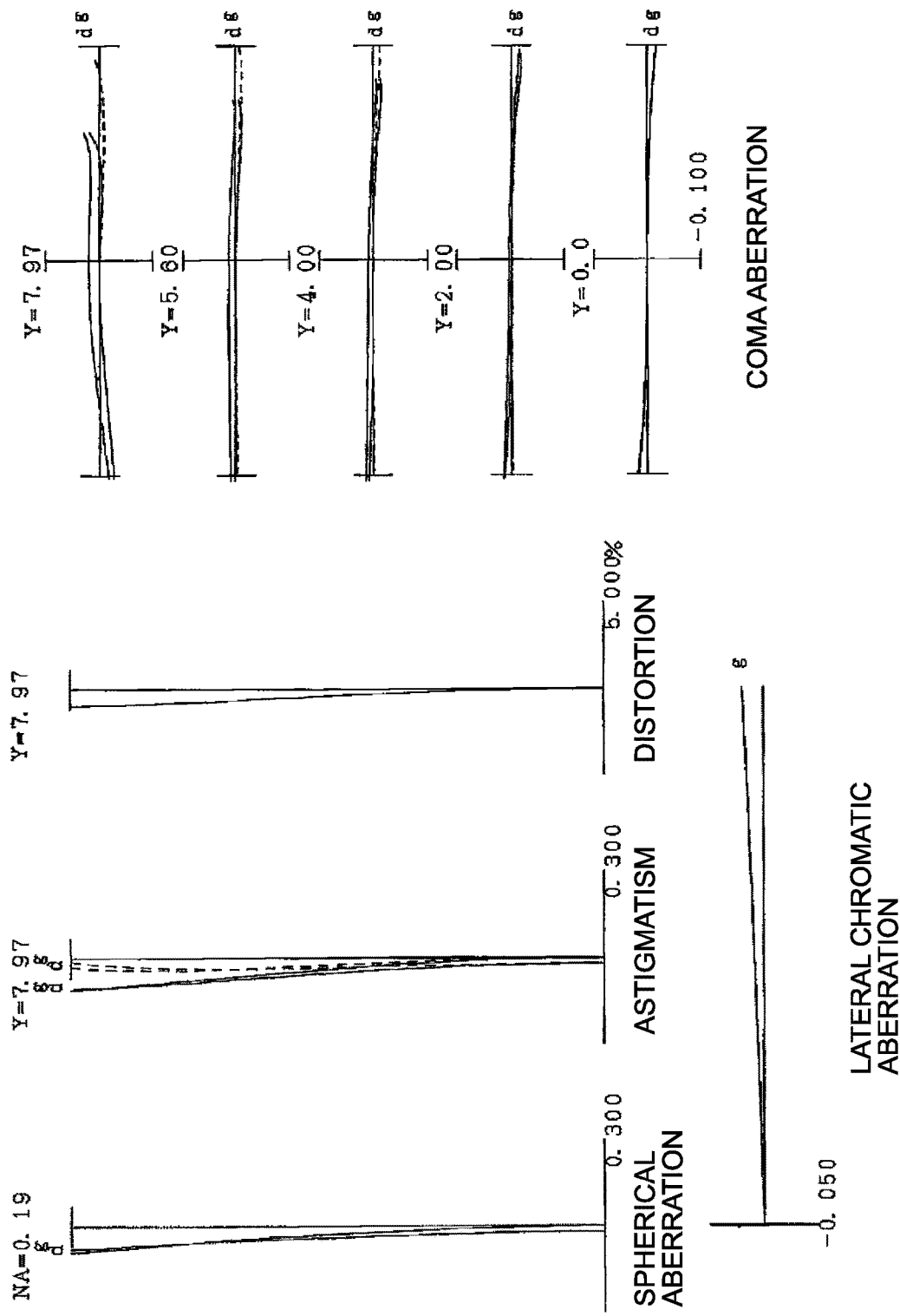

COMA ABERRATION

COMA ABERRATION

COMA ABERRATION

VARIABLE MAGNIFICATION OPTICAL SYSTEM, OPTICAL APPARATUS AND METHOD FOR MANUFACTURING VARIABLE MAGNIFICATION OPTICAL SYSTEM

RELATED APPLICATIONS

This is a continuation of PCT International Application No. PCT/JP2014/003418, filed on Jun. 26, 2014, which is hereby incorporated by reference. This application also claims the benefit of Japanese Patent Application Nos. 2013-136678 and 2013-136679 filed in Japan on Jun. 28, 2013, and Nos. 2013-237570 and 2013-237571 filed in Japan on Nov. 18, 2013, which are hereby incorporated by reference.

TECHNICAL FIELD

The present invention relates to a variable power optical system, an optical apparatus and a manufacturing method for a variable power optical system.

TECHNICAL BACKGROUND

Variable power optical systems suitable for a photographic camera, electronic still camera, video camera and the like have been proposed (e.g. see Patent Document 1).

PRIOR ARTS LIST

Patent Document

Patent Document 1: Japanese Laid-Open Patent Publication No. 2006-308957(A)

SUMMARY OF THE INVENTION

Problems to be Solved by the Invention

A conventional variable power optical system, however, cannot sufficiently satisfy the demand for larger aperture to further implement brighter lenses, since the F number thereof is about f/3.5.

With the foregoing in view, it is an object of the present invention to provide a variable power optical system having a high brightness and excellent optical performance, an optical apparatus that includes this variable power optical system, and a manufacturing method for this variable power optical system.

Means to Solve the Problems

To solve the above problem, a variable power optical system according to Embodiment 1 includes, in order from an object: a first lens group having positive refractive power; a second lens group having negative refractive power; a third lens group having positive refractive power; and a fourth lens group having positive refractive power. The distance between the first lens group and the second lens group, the distance between the second lens group and the third lens group, and the distance between the third lens group and the fourth lens group change respectively upon zooming from a wide-angle end state to a telephoto end state, and the third lens group includes: an intermediate group constituted by, in order from the object, a positive lens, a negative lens, a negative lens and a positive lens; and an image side group having negative refractive power and disposed to an image side of the intermediate group. The position of the intermediate group with respect to the image plane is fixed and the image side group moves along the optical axis upon focusing.

It is preferable that the variable power optical system according to Embodiment 1 satisfies the following conditional expressions:

$$0.4 < (-f2)/(fw \times ft)^{1/2} < 1.1$$

where f2 denotes a focal length of the second lens group, fw denotes a focal length of the variable power optical system in the wide-angle end state, and ft denotes a focal length of the variable power optical system in the telephoto end state.

In the variable power optical system according to Embodiment 1, it is preferable that the third lens group includes an object side group having positive refractive power and disposed to the object side of the intermediate group.

In the variable power optical system according to Embodiment 1, it is preferable that the image side group is constituted by one negative lens.

In the variable power optical system according to Embodiment 1, it is preferable that the image side group is constituted by one negative meniscus lens having a concave surface facing the image plane.

In the variable power optical system according to Embodiment 1, it is preferable that the image side group includes at least one negative lens, and satisfies the following conditional expressions:

$$ndF + 0.0052 \times vdF - 1.965 < 0$$

$$vdF > 60$$

where ndF denotes a refractive index of a medium of the negative lens included in the image side group at d-line, and vdF denotes an Abbe number of the medium of the negative lens included in the image side group.

In the variable power optical system according to Embodiment 1, it is preferable that the third lens group includes an object side group having positive refractive power and disposed to the object side of the intermediate group, the object side group includes one positive lens, and the following conditional expression is satisfied:

$$vdO > 60$$

where vdO denotes an Abbe number of a medium of the positive lens included in the object side group.

It is preferable that the variable power optical system according to Embodiment 1 satisfies the following conditional expression:

$$4.0 < f4/fw < 11.0$$

where f4 denotes a focal length of the fourth lens group, and fw denotes a focal length of the variable power optical system in the wide-angle end state.

In the variable power optical system according to Embodiment 1, it is preferable that the first lens group moves toward the image plane first and then moves toward the object upon zooming from the wide-angle end state to the telephoto end state.

In the variable power optical system according to Embodiment 1, it is preferable that the third lens group includes a vibration-isolating lens group which is disposed to the image side of the intermediate group, has positive refractive power, and moves so as to have a component in a direction orthogonal to the optical axis.

In the variable power optical system according to Embodiment 1, it is preferable that the third lens group includes, in order from the object: a first sub-group of which position with respect to the image plane is fixed upon correcting camera shake; and a second sub-group used as a vibration-isolating lens group which has positive refractive power and can move so as to have a component in a direction orthogonal to the optical axis upon correcting camera shake, and the following conditional expression is satisfied:

$$1.5 < fv \times FNOw/f3 < 5.0$$

where f3 denotes a focal length of the third lens group, fv denotes a focal length of the second sub-group, and FNOw denotes an F number in the wide-angle end state.

A variable power optical system according to Embodiment 2 includes, in order from an object: a first lens group having positive refractive power; a second lens group having negative refractive power; a third lens group having positive refractive power; and a fourth lens group having positive refractive power. The distance between the first lens group and the second lens group, the distance between the second lens group and the third lens group, and the distance between the third lens group and the fourth lens group change respectively upon zooming from a wide-angle end state to a telephoto end state, and the third lens group includes: an intermediate group constituted by, in order from the object, a first positive lens, a first negative lens, a second negative lens and a second positive lens; and an image side group having negative refractive power and disposed to an image side of the intermediate group. The position of the intermediate group with respect to the image plane is fixed and the image side group moves along the optical axis upon focusing, and the following conditional expression is satisfied:

$$-0.8 < (R2a+R1b)/(R2a-R1b) < 0.5$$

where R2a denotes a radius of curvature of the image plane side lens surface of the first negative lens, and R1b denotes a radius of curvature of the object side lens surface of the second negative lens.

It is preferable that the variable power optical system according to Embodiment 2 satisfies the following conditional expression:

$$0.4 < (-f2)/(fw \times ft)^{1/2} < 1.1$$

where f2 denotes a focal length of the second lens group, fw denotes a focal length of the variable power optical system in the wide-angle end state, and ft denotes a focal length of the variable power optical system in the telephoto end state.

In the variable power optical system according to Embodiment 2, it is preferable that the third lens group includes an object side group having positive refractive power and disposed to the object side of the intermediate group.

In the variable power optical system according to Embodiment 2, it is preferable that the image side group is constituted by one negative lens.

In the variable power optical system according to Embodiment 2, it is preferable that the image side group is constituted by one negative meniscus lens having a concave surface facing the image plane.

In the variable power optical system according to Embodiment 2, it is preferable that the image side group includes at least one negative lens, and satisfies the following conditional expressions:

$$ndF + 0.0052 \times vdF - 1.965 < 0$$

$$vdF > 60$$

where ndF denotes a refractive index of a medium of the negative lens included in the image side group at d-line, and vdF denotes an Abbe number of the medium of the negative lens included in the image side group.

In the variable power optical system according to Embodiment 2, it is preferable that the third lens group includes an object side group having positive refractive power and disposed to the object side of the intermediate group, the object side group includes one positive lens, and the following conditional expression is satisfied:

$$vdO > 60$$

where vdO denotes an Abbe number of a medium of the positive lens included in the object side group.

It is preferable that the variable power optical system according to Embodiment 2 satisfies the following conditional expression:

$$4.0 < f4/fw < 11.0$$

where f4 denotes a focal length of the fourth lens group, and fw denotes a focal length of the variable power optical system in the wide-angle end state.

In the variable power optical system according to Embodiment 2, it is preferable that the first lens group moves toward the image plane first and then moves toward the object upon zooming from the wide-angle end state to the telephoto end state.

In the variable power optical system according to Embodiment 2, it is preferable that the third lens group includes a vibration-isolating lens group which is disposed to the image side of the intermediate group, has positive refractive power, and moves so as to have a component in a direction orthogonal to the optical axis.

In the variable power optical system according to Embodiment 2, it is preferable that the third lens group includes, in order from the object: a first sub-group of which position with respect to the image plane is fixed upon correcting camera shake; and a second sub-group used as a vibration-isolating lens group which has positive refractive power and can move so as to have a component in a direction orthogonal to the optical axis upon correcting camera shake, and the following conditional expression is satisfied:

$$1.5 < fv \times FNOw/f3 < 5.0$$

where f3 denotes a focal length of the third lens group, fv denotes a focal length of the second sub-group, and FNOw denotes an F number in the wide-angle end state.

A variable power optical system according to Embodiment 3 includes, in order from an object: a first lens group having positive refractive power; a second lens group having negative refractive power; and a rear group having positive refractive power and disposed to an image side of the second lens group. The distance between the first lens group and the second lens group, and the distance between the second lens group and the rear group change respectively upon zooming from a wide-angle end state to a telephoto end state, and the rear group includes: an intermediate group constituted by, in order from the object, a positive lens, a negative lens, a negative lens, and a positive lens; and a vibration-isolating lens group having positive refractive power, disposed to an image side of the intermediate group and moving so as to have a component in a direction orthogonal to the optical axis.

In the variable power optical system according to Embodiment 3, it is preferable that the rear group includes at least a third lens group having positive refractive power and disposed closest to the object, each distance between lenses constituting the third lens group is constant upon zooming from a wide-angle end state to a telephoto end state, the third lens group includes the intermediate group, and the following conditional expression is satisfied:

$$1.0<f3/\Delta T3<2.2$$

where $\Delta T3$ denotes a moving distance of the third lens group upon zooming from the wide-angle end state to the telephoto end state, and f3 denotes a focal length of the third lens group.

In the variable power optical system according to Embodiment 3, it is preferable that the rear group includes an object side group having positive refractive power and disposed to the object side of the intermediate group.

In the variable power optical system according to Embodiment 3, it is preferable that the vibration-isolating lens group is constituted by one positive lens.

In the variable power optical system according to Embodiment 3, it is preferable that the vibration-isolating lens group is constituted by one biconvex lens.

In the variable power optical system according to Embodiment 3 it is preferable that the vibration-isolating lens group includes at least one positive lens, and satisfies the following conditional expressions:

$$ndVR+0.0052 \times vdVR-1.965<0$$

$$vdVR>60$$

where ndVR denotes a refractive index of a medium of the positive lens included in the vibration-isolating lens group at d-line, and vdVR denotes an Abbe number of the medium of the positive lens included in the vibration-isolating lens group.

In the variable power optical system according to Embodiment 3, it is preferable that the rear group includes an object side group having positive refractive power and disposed to the object side of the intermediate group, the object side group includes one positive lens, and the following conditional expressions is satisfied:

$$vdO>60$$

where vdO denotes an Abbe number of a medium of the positive lens included in the object side group.

In the variable power optical system according to Embodiment 3, it is preferable that the rear group includes a plurality of lens groups, each distance between the plurality of lens groups included in the rear group changes upon zooming from a wide-angle end state to a telephoto end state, and when a lens group closest to the image, out of the plurality of lens groups, is a final lens group, the following conditional expression is satisfied:

$$4.0<fr/fw<11.0$$

where fr denotes a focal length of the final lens group, and fw denotes a focal length of the variable power optical system in the wide-angle end state.

In the variable power optical system according to Embodiment 3, it is preferable that the rear group includes, in order from the object, a third lens group having positive refractive power and a fourth lens group, the distance between the third lens group and the fourth lens group changes upon zooming from the wide-angle end state to the telephoto end state, the third lens group includes at least the intermediate lens group, and the following conditional expression is satisfied:

$$0.9<f3/(fw \times ft)^{1/2}<2.0$$

where f3 denotes a focal length of the third lens group, fw denotes a focal length of the variable power optical system in the wide-angle end state, and ft denotes a focal length of the variable power optical system in the telephoto end state.

In the variable power optical system according to Embodiment 3, it is preferable that the first lens group moves toward the image plane first and then moves toward the object upon zooming from the wide-angle end state to the telephoto end state.

A variable power optical system according to Embodiment 4 includes, in order from an object: a first lens group having positive refractive power; a second lens group having negative refractive power; and a rear group having positive refractive power, and the rear group includes at least a third lens group having positive refractive power and disposed closest to the object in the rear group. The distance between the first lens group and the second lens group, and the distance between the second lens group and the rear group changes respectively and each distance between lenses constituting the third lens group is constant upon zooming from a wide-angle end state to a telephoto end state. The third lens group includes, in order from the object: a first sub-group of which position with respect to the image plane is fixed upon correcting camera shake; and a second sub-group used as a vibration-isolating lens group which has positive refractive power and can move so as to have a component in a direction orthogonal to the optical axis upon correcting camera shake, and the following conditional expression is satisfied:

$$1.5<fv \times FNOw/f3<5.0$$

where f3 denotes a focal length of the third lens group, fv denotes a focal length of the second sub-group, and FNOw denotes an F number in the wide-angle end state.

In the variable power optical system according to Embodiment 4, it is preferable that the first sub-group includes an intermediate group constituted by, in order from the object, a positive lens, a negative lens, a negative lens and a positive lens.

In the variable power optical system according to Embodiment 4, it is preferable that the first sub-group includes an object side group having positive refractive power and disposed to the object side of the intermediate group.

In the variable power optical system according to Embodiment 4, it is preferable that the second sub-group is constituted by one positive lens.

In the variable power optical system according to Embodiment 4, it is preferable that the second sub-group is constituted by one biconvex lens.

In the variable power optical system according to Embodiment 4, it is preferable that the second sub-group includes at least one positive lens, and satisfies the following conditional expressions:

$$ndVR+0.0052 \times vdVR-1.965<0$$

$$vdVR>60$$

where ndVR denotes a refractive index of a medium of the positive lens included in the second sub-group at d-line, and vdVR denotes an Abbe number of the medium of the positive lens included in the second sub-group.

In the variable power optical system according to Embodiment 4, it is preferable that the first sub-group includes: an intermediate group constituted by, in order from the object, a positive lens, a negative lens, a negative lens, and a positive lens; and an object side group having positive refractive power and disposed to the object side of the intermediate group, the object side group includes one positive lens, and the following conditional expression is satisfied:

$$vdO > 60$$

where vdO denotes an Abbe number of a medium of the positive lens included in the object side group.

In the variable power optical system according to Embodiment 4, it is preferable that the rear group includes a plurality of lens groups, each distance between the plurality of lens groups included in the rear group changes upon zooming from a wide-angle end state to a telephoto end state, and when a lens group closest to the image, out of the plurality of lens groups, is a final lens group, the following conditional expression is satisfied:

$$4.0 < fr/fw < 11.0$$

where fr denotes a focal length of the final lens group, and fw denotes a focal length of the variable power optical system in the wide-angle end state.

In the variable power optical system according to Embodiment 4, it is preferable that the rear group includes, in order from the object, the third lens group and the fourth lens group, the distance between the third lens group and the fourth lens group changes upon zooming from the wide-angle end state to the telephoto end state, the third lens group includes at least the intermediate lens group, and the following conditional expression is satisfied:

$$0.9 < f3/(fw \times ft)^{1/2} < 2.0$$

where f3 denotes a focal length of the third lens group, fw denotes a focal length of the variable power optical system in the wide-angle end state, and ft denotes a focal length of the variable power optical system in the telephoto end state.

In the variable power optical system according to Embodiment 4, it is preferable that the first lens group moves toward the image plane first and then moves toward the object upon zooming from the wide-angle end state to the telephoto end state.

An optical apparatus according to the present invention includes any one of the above mentioned variable power optical systems according to Embodiment 1.

An optical apparatus according to the present invention includes any one of the above mentioned variable power optical systems according to Embodiment 2.

An optical apparatus according to the present invention includes any one of the above mentioned variable power optical systems according to Embodiment 3.

An optical apparatus according to the present invention includes any one of the above mentioned variable power optical systems according to Embodiment 4.

A manufacturing method for a variable power optical system according to the present invention is a manufacturing method for a variable power optical system which includes, in order from an object: a first lens group having positive refractive power; a second lens group having negative refractive power; a third lens group having positive refractive power; and a fourth lens group having positive refractive power. The method includes: disposing each lens group so that the distance between the first lens group and the second lens group, the distance between the second lens group and the third lens group, and the distance between the third lens group and the fourth lens group change respectively upon zooming from a wide-angle end state to a telephoto end state; and configuring the third lens group so as to include: an intermediate group constituted by, in order from the object, a positive lens, a negative lens, a negative lens, and a positive lens; and an image side group having negative refractive power and disposed to an image side of the intermediate group, and disposing the third lens group so that the position of the intermediate group with respect to the image plane is fixed and the image side group moves along the optical axis upon focusing.

A manufacturing method for a variable power optical system according to the present invention is a manufacturing method for a variable power optical system which includes, in order from an object: a first lens group having positive refractive power; a second lens group having negative refractive power; a third lens group having positive refractive power; and a fourth lens group having positive refractive power. The method includes: disposing each lens group so that the distance between the first lens group and the second lens group, the distance between the second lens group and the third lens group, and the distance between the third lens group and the fourth lens group change respectively upon zooming from a wide-angle end state to a telephoto end state; configuring the third lens group so as to include: an intermediate group constituted by, in order from the object, a positive lens, a negative lens, a negative lens, and a positive lens; and an image side group having negative refractive power and disposed to an image side of the intermediate group, and disposing the third lens group so that the position of the intermediate group with respect to the image plane is fixed and the image side group moves along the optical axis upon focusing; and disposing each lens group so that the following conditional expression is satisfied:

$$0.4 < (-f2)/(fw \times ft)^{1/2} < 1.1$$

where f2 denotes a focal length of the second lens group, fw denotes a focal length of the variable power optical system in the wide-angle end state, and ft denotes a focal length of the variable power optical system in the telephoto end state.

A manufacturing method for a variable power optical system according to the present invention is a manufacturing method for a variable power optical system which includes, in order from an object: a first lens group having positive refractive power; a second lens group having negative refractive power; a third lens group having positive refractive power; and a fourth lens group having positive refractive power. The method includes: disposing each lens group so that the distance between the first lens group and the second lens group, the distance between the second lens group and the third lens group, and the distance between the third lens group and the fourth lens group change respectively upon zooming from a wide-angle end state to a telephoto end state; configuring the third lens group so as to include: an intermediate group constituted by, in order from the object, a first positive lens, a first negative lens, a second negative lens, and a second positive lens; and an image side group having negative refractive power and disposed to an image side of the intermediate group, and disposing the third lens group so that the position of the intermediate group with respect to the image plane is fixed and the image side group moves along the optical axis upon focusing; and disposing the third lens group so that the following conditional expression is satisfied:

$$-0.8 < (R2a+R1b)/(R2a-R1b) < 0.5$$

where R2a denotes a radius of curvature of an image side lens surface of the first negative lens, and R1b denotes a radius of curvature of an object side lens surface of the second negative lens.

A manufacturing method for a variable power optical system according to the present invention is a manufacturing method for a variable power optical system which includes, in order from an object: a first lens group having positive refractive power; a second lens group having negative refractive power; and a rear group having positive refractive power and disposed to an image side of the second lens group. The method includes: disposing each lens group so that the distance between the first lens group and the second lens group, and the distance between the second lens group and the rear lens group change respectively upon zooming from a wide-angle end state to a telephoto end state; and disposing, in the rear group: an intermediate group constituted by, in order from the object, a positive lens, a negative lens, a negative lens, and a positive lens; and a vibration-isolating lens group having positive refractive power, disposed to an image side of the intermediate group and moving so as to have a component in a direction orthogonal to the optical axis.

A manufacturing method for a variable power optical system according to the present invention is a manufacturing method for a variable power optical system which includes, in order from an object: a first lens group having positive refractive power; a second lens group having negative refractive power; and a rear group having positive refractive power and disposed to an image side of the second lens group. The method includes: disposing each lens group so that the distance between the first lens group and the second lens group, and the distance between the second lens group and the rear group change respectively upon zooming from a wide-angle end state to a telephoto end state; disposing, in the rear group: an intermediate group constituted by, in order from the object, a positive lens, a negative lens, a negative lens and a positive lens; and a vibration-isolating lens group having positive refractive power, disposed to an image side of the intermediate group and moving so as to have a component in a direction orthogonal to the optical axis; disposing, in the rear group, at least a third lens group having positive refractive power and disposed closest to the object; disposing the third lens group so that each distance between lenses constituting the third lens group is constant upon zooming from the wide-angle end state to the telephoto end state; disposing the third lens group so as to include the intermediate group; and disposing the third lens group so that the following conditional expression is satisfied:

$$1.0 < f3/\Delta T3 < 2.2$$

where $\Delta T3$ denotes a moving distance of the third lens group upon zooming from the wide-angle end state to the telephoto end state, and f3 denotes a focal length of the third lens group.

A manufacturing method for a variable power optical system according to the present invention is a manufacturing method for a variable power optical system which includes, in order from an object: a first lens group having positive refractive power; a second lens group having negative refractive power; and a rear group having positive refractive power. The method includes: disposing, in the rear group, at least a third lens group having positive refractive power and disposed closest to the object in the rear group; disposing each lens group so that the distance between the first lens group and the second lens group, and the distance between the second lens group and the rear group change respectively, and each distance between lenses constituting the third lens group is constant upon zooming from a wide-angle end state to a telephoto end state; disposing, in the third lens group and in order from the object: a first sub-group of which position with respect to the image plane is fixed upon correcting camera shake; and a second sub-group used as a vibration-isolating lens group which has positive refractive power and can move so as to have a component in a direction orthogonal to the optical axis upon correcting camera shake; and disposing each lens group so that the following conditional expression is satisfied:

$$1.5 < fv \times FNOw/f3 < 5.0$$

where f3 denotes a focal length of the third lens group, fv denotes a focal length of the second sub-group, and FNOw denotes an F number in the wide-angle end state.

Advantageous Effects of the Invention

According to the present invention, a variable power optical system having a high brightness and excellent optical performance, an optical apparatus that includes this variable power optical system, and a manufacturing method for this variable power optical system can be provided.

BRIEF DESCRIPTION OF THE DRAWINGS

FIGS. 2A and 2B are graphs showing various aberrations of the variable power optical system according to Example 1 upon focusing on infinity, where FIG. 2A are graphs showing various aberrations in the wide-angle end state, and FIG. 2B are graphs showing coma aberrations when image blur is corrected in the wide-angle end state;

FIGS. 5A, 5B and 5C are graphs showing various aberrations of the variable power optical system according to Example 1 upon focusing on a close point, where FIG. 5A shows the wide-angle end state, FIG. 5B shows the intermediate focal length state, and FIG. 5C shows the telephoto end state;

FIGS. 7A and 7B are graphs showing various aberrations of the variable power optical system according to Example 2 upon focusing on infinity, where FIG. 7A are graphs showing various aberrations in the wide-angle end state, and FIG. 7B are graphs showing coma aberrations when image blur is corrected in the wide-angle end state;

FIGS. 10A, 10B and 10C are graphs showing various aberrations of the variable power optical system according to Example 2 upon focusing on a close point, where FIG. 10A shows the wide-angle end state, FIG. 10B shows the intermediate focal length state, and FIG. 10C shows the telephoto end state;

FIGS. 14A and 14B are graphs showing various aberrations of the variable power optical system according to Example 3 upon focusing on infinity, where FIG. 14A are graphs showing various aberrations in the telephoto end state, and FIG. 14B are graphs showing coma aberrations when image blur is corrected in the telephoto end state;

FIGS. 15A, 15B and 15C are graphs showing various aberrations of the variable power optical system according to Example 3 upon focusing on a close point, where FIG. 15A shows the wide-angle end state, FIG. 15B shows the intermediate focal length state, and FIG. 15C shows the telephoto end state;

FIG. 16 is a cross-sectional view depicting a lens configuration of a variable power optical system according to Example 4;

FIGS. 17A and 17B are graphs showing various aberrations of the variable power optical system according to Example 4 upon focusing on infinity, where FIG. 17A are graphs showing various aberrations in the wide-angle end state, and FIG. 17B are graphs showing coma aberrations when image blur is corrected in the wide-angle end state;

FIGS. 19A and 19B are graphs showing various aberrations of the variable power optical system according to Example 4 upon focusing on infinity, where FIG. 19A are graphs showing various aberrations in the telephoto end state, and FIG. 19B are graphs showing coma aberrations when image blur is corrected in the telephoto end state;

FIGS. 20A, 20B and 20C are graphs showing various aberrations of the variable power optical system according to Example 4 upon focusing on a close point, where FIG. 20A shows the wide-angle end state, FIG. 20B shows the intermediate focal length state, and FIG. 20C shows the telephoto end state;

FIGS. 25A, 25B and 25C are graphs showing various aberrations of the variable power optical system according to Example 5 upon focusing on a close point, where FIG. 25A shows the wide-angle end state, FIG. 25B shows the intermediate focal length state, and FIG. 25C shows the telephoto end state;

DESCRIPTION OF THE EMBODIMENTS

Embodiments of the present invention will now be described with reference to the drawings. Many of the composing elements in Embodiments 1 to 4 are the same or similar, therefore same or similar components are described using a same drawing (same reference symbol) for convenience of explanation.

Embodiment 1

Figure 1:
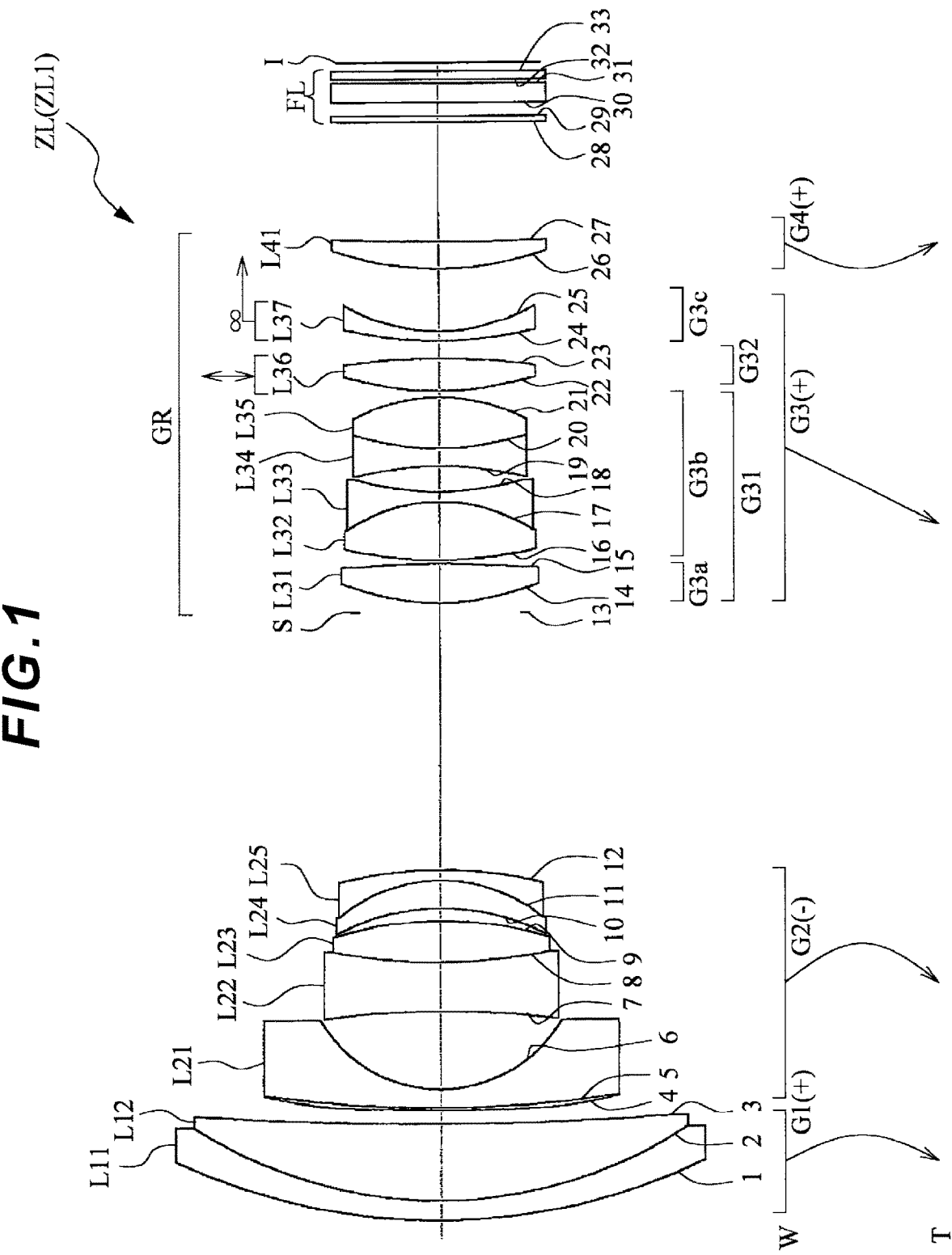
FIG. 1 is a cross-sectional view depicting a lens configuration of a variable power optical system according to Example 1.

Embodiment 1 will now be described with reference to the drawings. As shown in FIG. 1, a variable power optical system ZL according to Embodiment 1 includes, in order from an object: a first lens group G1 having positive refractive power; a second lens group G2 having negative refractive power; a third lens group G3 having positive refractive power; and a fourth lens group G4 having positive refractive power. In this variable power optical system ZL, the distance between the first lens group G1 and the second lens group G2, the distance between the second lens group G2 and the third lens group G3, and the distance between the third lens group G3 and the fourth lens group G4 change respectively upon zooming from the wide-angle end state to the telephoto end state. In this variable power optical system ZL, the third lens group G3 includes: an intermediate group G3b constituted by, in order from the object, a positive lens, a negative lens, a negative lens and a positive lens; and an image side group G3c having negative refractive power and disposed to the image side of the intermediate group G3b, and focusing is performed from infinity to an object at close distance by moving the image side group G3c along the optical axis in a state of fixing the position of the intermediate group G3b with respect to the image plane. By configuring the variable power optical system ZL of this embodiment in this way, excellent optical performance can be implemented with bright lenses having small (or bright) F numbers. In other words, the intermediate group G3b of the third lens group G3 is constituted by four lenses having a symmetric structure (positive, negative, negative, positive), whereby spherical aberration, curvature of field, and coma aberration can be corrected well while keeping the F numbers small for high brightness. If an aperture stop S is disposed between the second lens group G2 and the third lens group G3 (or to the object side of the third lens group G3), and focusing is performed by the image side group G3c disposed to the image side of the intermediate group G3b, the distance between the aperture stop S and the focusing lens group can be increased, and fluctuation of the image plane upon focusing can be controlled. "Lens component" refers to a single lens or to a cemented lens where a plurality of lenses are cemented.

It is preferable that the variable power optical system ZL according to this embodiment satisfies the following conditional expression (1).

$$0.4<(-f2)/(fw\times ft)^{1/2}<1.1 \quad (1)$$

where f2 denotes a focal length of the second lens group G2, fw denotes a focal length of the variable power optical system ZL in the wide-angle end state, and ft denotes a focal length of the variable power optical system ZL in the telephoto end state.

The conditional expression (1) specifies a focal length of the second lens group G2. If the upper limit value of the conditional expression (1) is exceeded, the refractive power of the second lens group G2 decreases, hence the moving distance upon zooming increases and the total length of the optical system increases, which is not desirable. To demonstrate the effect of the invention with certainty, it is preferable that the upper limit value of the conditional expression (1) is 1.0. To demonstrate the effect of the invention to the maximum, it is preferable that the upper limit value of the conditional expression (1) is 0.9. On the other hand, if the lower limit value of the conditional expression (1) is not reached, the refractive power of the second lens group G2 increases, and curvature of field and astigmatism cannot be corrected well, which is not desirable. To demonstrate the effect of the invention with certainty, it is preferable that the lower limit value of the conditional expression (1) is 0.5. To demonstrate the effect of the invention to the maximum, it is preferable that the lower limit value of the conditional expression (1) is 0.6.

In the variable power optical system ZL according to this embodiment, it is preferable that the third lens group G3 includes an object side group G3a having positive refractive power and disposed to the object side of the intermediate group G3b. By this configuration, even better optical performance can be implemented with bright lenses having small (bright) F numbers. Further high-order spherical aberration, which tends to be generated in bright lenses, can be corrected well.

In the variable power optical system ZL according to this embodiment, it is preferable that the image side group G3c, which is included in the third lens group G3 and is used for focusing, is constituted by one negative lens. By this configuration, the focusing lens can be lighter and focusing speed can be easily increased. Further, it is preferable that the image side group G3c is constituted by one negative meniscus lens having a concave surface facing the image plane. By this configuration, fluctuation of spherical aberration generated upon focusing can be controlled, and high speed focusing can be implemented.

In the variable power optical system ZL according to this embodiment, it is preferable that the image side group G3c included in the third lens group G3 has at least one negative lens, and this negative lens satisfies the following conditional expression (2).

$$ndF+0.0052\times vdF-1.965<0 \quad (2)$$

where ndF denotes a refractive index of a medium of the negative lens included in the image side group G3c at d-line.

The conditional expression (2) specifies the refractive index of the medium of the negative lens included in the image side group G3c at d-line. If the upper limit value of the conditional expression (2) is exceeded, glass material having relatively high refractive power and high color dispersibility must be used for this negative lens, and longitudinal chromatic aberration cannot be corrected well in a range from infinity to an object at a close distance upon focusing, which is not desirable.

It is preferable that the negative lens included in the image side group G3c of the third lens group G3 satisfies the following conditional expression (3).

$$vdF>60 \quad (3)$$

where vdF denotes an Abbe number of the medium of the negative lens included in the image side group G3c.

The conditional expression (3) specifies an Abbe number of the medium of the negative lens included in the image side group G3c. If the lower limit value of the conditional expression (3) is not reached, dispersibility of the focusing lens increases, and longitudinal chromatic aberration, which tends to stand out in a bright lens, cannot be corrected sufficiently in the range from infinity to an object at close distance upon focusing, which is not desirable. To demonstrate the effect of the invention with certainty, it is preferable that the lower limit value of the conditional expression (3) is 62.

In the variable power optical system ZL according to this embodiment, if the third lens group G3 includes an object side group G3a having positive refractive power and disposed to the object side of the intermediate group G3b, it is preferable that this object side group G3a includes one positive lens and satisfies the following conditional expression (4).

$$vdO>60 \qquad (4)$$

where vdO denotes an Abbe number of a medium of the positive lens included in the object side group G3a.

The conditional expression (4) specifies the Abbe number of the medium of the positive lens included in the object side group G3a of the third lens group G3. If the lower limit value of the conditional expression (4) is not reached, longitudinal chromatic aberration, which tends to be generated in bright lenses, increases, and correction thereof becomes difficult, which is not desirable. To demonstrate the effect of the invention with certainty, it is preferable that the lower limit value of the conditional expression (4) is 62. To demonstrate the effect of the invention to the maximum, it is preferable that the lower limit value of the conditional expression (4) is 65.

It is preferable that that the variable power optical system ZL according to this embodiment satisfies the following conditional expression (5).

$$4.0<f4/fw<11.0 \qquad (5)$$

where f4 denotes a focal length of the fourth lens group G4, and fw denotes a focal length of the variable power optical system ZL in the wide-angle end state.

The conditional expression (5) specifies the focal length of the fourth lens group G4. If the upper limit value of the conditional expression (5) is exceeded, the refractive power of the fourth lens group G4 decreases, and correction of curvature of field upon zooming becomes difficult, which is not desirable. To demonstrate the effect of the invention with certainty, it is preferable that the upper limit value of the conditional expression (5) is 10.0. To demonstrate the effect of the invention to the maximum, it is preferable that the upper limit value of the conditional expression (5) is 9.0. On the other hand, if the lower limit value of the conditional expression (5) is not reached, the refractive power of the fourth lens group G4 increases, and correction of distortion becomes difficult, and back focus cannot be secured, which is not desirable. To demonstrate the effect of the invention with certainty, it is preferable that the lower limit value of the conditional expression (5) is 5.0. To demonstrate the effect of the invention to the maximum, it is preferable that the lower limit value of the conditional expression (5) is 6.0.

In the variable power optical system ZL according to this embodiment, it is preferable that the first lens group G1 moves toward the image plane first, then moves toward the object upon zooming from the wide-angle end state to the telephoto end state. By this configuration, the diameter of the first lens group G1 is kept small while preventing abaxial light interrupt when the distance between the first lens group G1 and the second lens group G2 is increased, and a sudden change of distortion can be controlled.

In the variable power optical system ZL according to this embodiment, it is preferable that the third lens group G3 is disposed to the image side of the intermediate group G3b, and includes an image side group having positive refractive power, and camera shake (image blur) is corrected by using this image side group as a vibration-isolating lens group (hereafter called "vibration-isolating lens group G32") that moves so as to have a component in a direction orthogonal to the optical axis in a state of fixing the position of the intermediate group G3b with respect to the image plane. By disposing the vibration-isolating lens group G32 having positive refractive power to the image side of the intermediate group G3b in this way, a vibration-isolating function can be provided without increasing the number of lenses of the vibration-isolating lens group G32, even if bright lenses having small (bright) F numbers are used.

In the variable power optical system ZL according to this embodiment, it is preferable that the third lens group G3 includes, in order from the object: a first sub-group G31; and a second sub-group G32 having positive refractive power. And the camera shake (image blur) is corrected using a second sub-group G32 as a vibration-isolating lens group, which moves so as to have a component in a direction orthogonal to the optical axis in a state of fixing the position of the first sub-group G31 with respect to the image plane. If the second sub-group (vibration-isolating lens group) G32 having positive refractive power is disposed to the image side of the first sub-group G31 in this way, a vibration-isolating function can be provided without increasing the number of lenses of the second sub-group (vibration-isolating lens group) G32, even if the bright lenses with small (bright) F numbers are used.

It is preferable that the variable power optical system ZL according to this embodiment satisfies the following conditional expression (6).

$$1.5<fv\times FNOw/f3<5.0 \qquad (6)$$

where f3 denotes a focal length of the third lens group G3, fv denotes a focal length of the second sub-group G32, and FNOw denotes an F number in the wide-angle end state.

The conditional expression (6) specifies the focal length of the second sub-group G32, used as the vibration-isolating lens group, and the focal length of the third lens group G3. If the upper limit value of the conditional expression (6) is exceeded, the refractive power of the second sub-group G32 decreases. Further, the moving distance of the second sub-group G32 upon vibration isolation (upon image blur correction) increases, and the diameter of the second sub-group G32 increases, which makes the second sub-group G32 heavier, and makes it difficult to correct eccentric coma aberration well upon vibration isolation, which is not desirable. To demonstrate the effect of the invention with certainty, it is preferable that the upper limit value of the conditional expression (6) is 4.5. To demonstrate the effect of the invention to the maximum, it is preferable that the upper limit value of the conditional expression (6) is 4.0. On the other hand, if the lower limit value of the conditional expression (6) is not reached, the refractive power of the second sub-group G32 increases, and eccentric astigmatism and eccentric coma aberration cannot be corrected well upon vibration isolation, which is not desirable. To demonstrate the effect of the invention with certainty, it is preferable that the lower limit value of the conditional expression (6) is 1.6. To demonstrate the effect of the invention with even higher certainty, it is preferable that the lower limit value of the conditional expression (6) is 1.8. To demonstrate the effect of the invention to the maximum, it is preferable that the lower limit value of the conditional expression (6) is 2.2.

In the variable power optical system ZL according to this embodiment, at least one positive lens component may or may not be disposed between the intermediate group G3b and the image side group G3c of the third lens group G3. In the same manner, the object side group G3a disposed to the object side of the intermediate group G3b of the third lens group G3 may be omitted. In the four lenses (positive, negative, negative, positive) included in the intermediate group G3b, the positive lens and the negative lens may be cemented or each lens may be disposed as a single lens respectively.

By the above configuration, a variable power optical system ZL having high brightness and excellent optical performance can be provided.

Figure 30:
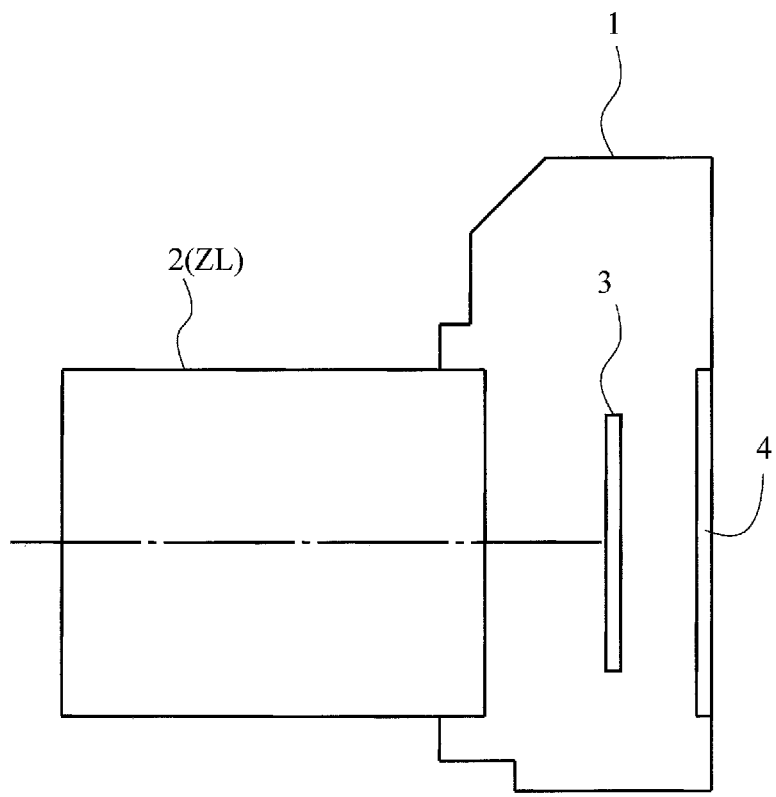
FIG. 30 is a cross-sectional view of a camera that includes the variable power optical system.

A camera, which is an optical apparatus including the variable power optical system ZL according to this embodiment, will be described with reference to FIG. 30. This camera 1 is an interchangeable lens type mirrorless camera that includes the variable power optical system ZL according to this embodiment as an image capturing lens 2. In this camera 1, the light from an object (not illustrated) is collected by the image capturing lens 2, and forms an object image on an image plane of the imaging unit 3 via an OLPF (Optical Low-Pass Filter), which is not illustrated. Then the object image is photo-electric converted by a photo-electric conversion element disposed in the imaging unit 3, whereby the image of the object is generated. This image is displayed on an EVF (Electronic View Finder) 4 disposed in the camera 1. Thereby the user can view the object via the EVF 4.

If a release button (not illustrated) is pressed by the user, the photo-electric-converted image is stored in a memory (not illustrated) by the imaging unit 3. Thus the user can capture the image of the object using this camera 1. In this embodiment, an example of the mirrorless camera was described, but an effect similar to the case of this camera 1 can be demonstrated even when the variable power optical system ZL according to this embodiment may be included in a single lens reflex type camera, which has a quick return mirror in the camera main unit and views the object using a finder optical system.

The following content can be adopted within a range where the optical performance is not diminished.

In this example, the variable power optical system ZL constituted by four lens groups was shown, but the present invention can also be applied to a configuration using a different number of lens groups, such as five lens groups or six lens groups. A lens or a lens group may be added to the configuration on the side closest to the object, or a lens or a lens group may be added to the configuration on the side closest to the image. "Lens group" refers to a portion having at least one lens isolated by an air space which Changes upon zooming. In the variable power optical system ZL of this embodiment, the first lens group G1 to the fourth lens group G4 move along the optical axis respectively, such that each air space between the lens groups changes upon zooming.

A single or plurality of lens group(s) or a partial lens group may be designed to be a focusing lens group, which performs focusing from an object at infinity to an object at a close distance by moving in the optical axis direction. This focusing lens group can be applied to auto focus, and is also suitable for driving a motor for auto focusing (driving using an ultrasonic motor or the like). It is particularly preferable that a part of the third lens group G3 (image side group G3c, as mentioned above) is designed to be the focusing lens group, and the positions of other lenses with respect to the image plane are preferably fixed upon focusing.

A lens group or a partial lens group may be designed to be a vibration-isolating lens group, which corrects image blurs generated by camera shake, by moving the lens group or the partial lens group so as to have a component in a direction orthogonal to the optical axis or rotating (oscillating) the lens group or the partial lens group in an in-plane direction that includes the optical axis. It is particularly preferable that at least a part of the third lens group G3 (e.g. lens disposed to the image side of the four lenses (positive, negative, negative, positive) of the intermediate group G3b) is designed to be the vibration-isolating lens group.

The lens surface may be formed to be a spherical surface or a plane, or an aspherical surface. If the lens surface is a spherical surface or a plane, lens processing, assembly and adjustment are easy, and deterioration of optical performance, due to an error generated in processing, assembly and adjustment, can be prevented. Even if the image plane is shifted, the drawing performance is not affected very much, which is desirable. If the lens surface is aspherical, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index-distributed lens (GRIN lens) or a plastic lens.

It is preferable that the aperture stop S is disposed near the third lens group G3, but the role of the aperture stop may be substituted by the frame of the lens, without disposing a separate member as the aperture stop.

Each lens surface may be coated with an anti-reflection film, which has high transmittance in a wide wavelength region, in order to decrease flares and ghosts, and implement high optical performance with high contrast.

The zoom ratio of the variable power optical system ZL of this embodiment is about 2.5 to 4.

Figure 31:
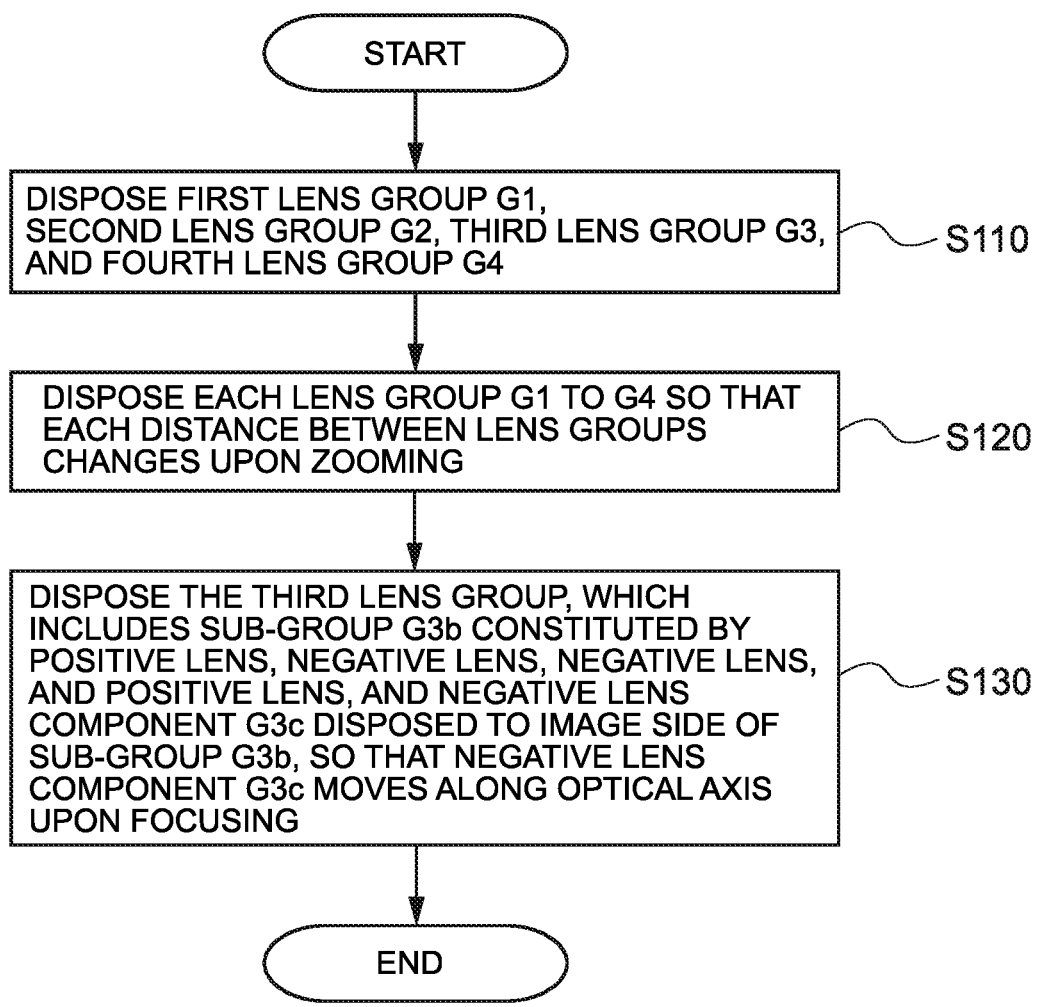
FIG. 31 is a flow chart depicting a manufacturing method for the variable power optical system according to Embodiment 1 represented by Example 1 to Example 5.

An outline of a manufacturing method for the variable power optical system ZL according to this embodiment will now be described with reference to FIG. 31. First each lens is disposed to prepare the first to fourth lens groups G1 to G4 (step S110). Each lens group is disposed so that the distance between the first lens group G1 and the second lens group G2, the distance between the second lens group G2 and the third lens group G3, and the distance between the third lens group G3 and the fourth lens group G4 change respectively upon zooming from the wide-angle end state to the telephoto end state (step S120). The third lens group G3 includes: the intermediate group G3b constituted by, in order from the object, the positive lens, the negative lens, the negative lens and the positive lens; and the image side group G3c having negative refractive power and disposed to the image side of the intermediate group G3b, and the third lens group G3 is disposed so that the position of the intermediate group G3b with respect to the image plane is fixed, and the image side group G3c moves along the optical axis upon focusing (step S130).

In the manufacturing method for the variable power optical system ZL according to this embodiment, it is preferable that each lens group is disposed so that the above mentioned conditional expression (1) is satisfied.

As shown in FIG. 1, according to a concrete example of this embodiment, the first lens group G1 is prepared by disposing a cemented lens, where a negative meniscus lens L11 having a convex surface facing the object and a positive meniscus lens L12 having a convex surface facing the object are cemented in order from the object. The second lens group G2 is prepared by disposing: a negative lens L21, of which aspherical shape is formed by creating a resin layer on an object side lens surface of a negative meniscus lens having a convex surface facing the object; a cemented lens where a biconcave lens L22 and a biconvex lens L23 are cemented; and a cemented lens where a positive meniscus lens L24 having a concave surface facing the object, and a negative lens L25 which has a concave surface facing the object and of which image side lens surface is aspherical, are cemented. The third lens group G3 is prepared by disposing: a positive lens L31 of which object side and image side lens surfaces are aspherical; a cemented lens where a biconvex lens L32 and a biconcave lens L33 are cemented; a cemented lens where a biconcave lens L34 and a biconvex lens L35 are cemented; a positive lens L36 of which object side and image side lens surfaces are aspherical; and a negative meniscus lens L37 having a convex surface facing the object. The fourth lens group G4 is prepared by disposing a positive lens L41 of which object side lens surface is aspherical. These lens groups are disposed according to the above mentioned procedure, whereby the variable power optical system ZL is manufactured.

Embodiment 2

Embodiment 2 will now be described with reference to the drawings. As shown in FIG. 1, a variable power optical system ZL according to Embodiment 2 includes, in order from an object: a first lens group G1 having positive refractive power; a second lens group G2 having negative refractive power; a third lens group G3 having positive refractive power; and a fourth lens group G4 having positive refractive power. In this variable power optical system ZL, the distance between the first lens group G1 and the second lens group G2, the distance between the second lens group G2 and the third lens group G3, and the distance between the third lens group G3 and the fourth lens group G4 change respectively upon zooming from the wide-angle end state to the telephoto end state. In this variable power optical system ZL, the third lens group G3 includes: an intermediate group G3b constituted by, in order from the object, a first positive lens, a first negative lens, a second negative lens and a second positive lens; and an image side group G3c having negative refractive power and disposed to an image side of the intermediate group G3b, and focusing is performed from infinity to an object at close distance by moving the image side group G3c along the optical axis in a state of fixing the position of the intermediate group G3b with respect to the image plane. By designing the variable power optical system ZL of this embodiment to have this configuration, excellent optical performance can be implemented with bright lenses having small (bright) F numbers. In other words, the intermediate group G3b of the third lens group G3 is constituted by four lenses having a symmetric structure (positive, negative, negative, positive), whereby spherical aberration, curvature of field, and coma aberration can be corrected well while keeping the F numbers small for high brightness. If an aperture stop S is disposed between the second lens group G2 and the third lens group G3 (or to the object side of the third lens group G3), and focusing is performed by the image side group G3c disposed to the image side of the intermediate group G3b, the distance between the aperture stop S and the focusing lens group can be increased, and fluctuation of the image plane upon focusing can be controlled. "Lens component" refers to a single lens or to a cemented lens where a plurality of lenses are cemented.

In the variable power optical system ZL according to this embodiment, it is preferable that an air lens created by the first negative lens and the second negative lens included in the intermediate group G3b of the third lens group G3 satisfies the following conditional expression (7).

$$-0.8 < (R2a + R1b)/(R2a - R1b) < 0.5 \quad (7)$$

where R2a denotes a radius of curvature of an image side lens surface of the first negative lens, and R1b denotes a radius of curvature of an object side lens surface of the second negative lens.

The conditional expression (7) specifies the shape of the air lens created by the first negative lens and the second negative lens included in the intermediate group G3b of the third lens group G3. If the upper limit value of the conditional expression (7) is exceeded, the positive refractive power of the image side of the third lens group G3 (image side of the air lens) is required to be increased, which makes it difficult to correct abaxial aberrations, such as coma aberration, and is not desirable. To demonstrate the effect of the invention with certainty, it is preferable that the upper limit value of the conditional expression (7) is 0.4. To demonstrate the effect of the invention with even higher certainty, it is preferable that the upper limit value of the conditional expression (7) is 0.3. To demonstrate the effect of the invention to the maximum, it is preferable that the upper limit value of the conditional expression (7) is 0.2. On the other hand, if the lower limit value of the conditional expression (7) is not reached, the object side of the third lens group G3 (object side of the air lens) requires strong positive refractive power, which makes it difficult to correct spherical aberration, and is not desirable. To demonstrate the effect of the invention with certainty, it is preferable that the lower limit value of the conditional expression (7) is −0.7. To demonstrate the effect of the invention with even higher certainty, it is preferable that the lower limit value of the conditional expression (7) is −0.6. To demonstrate the effect of the invention to the maximum, it is preferable that the lower limit value of the conditional expression (7) is −0.5.

It is preferable that the variable power optical system ZL according to this embodiment satisfies the following conditional expression (1).

$$0.4 < (-f2)/(fw \times ft)^{1/2} < 1.1 \quad (1)$$

where f2 denotes a focal length of the second lens group G2, fw denotes a focal length of the variable power optical system ZL in the wide-angle end state, and ft denotes a focal length of the variable power optical system ZL in the telephoto end state.

The conditional expression (1) specifies a focal length of the second lens group G2. If the upper limit value of the conditional expression (1) is exceeded, the refractive power of the second lens group G2 decreases, hence the moving distance upon zooming increases and the total length of the optical system increases, which is not desirable. To demonstrate the effect of the invention with certainty, it is preferable that the upper limit value of the conditional expression (1) is 1.0. To demonstrate the effect of the invention to the maximum, it is preferable that the upper limit value of the conditional expression (1) is 0.9. On the other hand, if the lower limit value of the conditional expression (1) is not reached, the refractive power of the second lens group G2 increases, and curvature of field and astigmatism cannot be corrected well, which is not desirable. To demonstrate the effect of the invention with certainty, it is preferable that the lower limit value of the conditional expression (1) is 0.5. To demonstrate the effect of the invention to the maximum, it is preferable that the lower limit value of the conditional expression (1) is 0.6.

In the variable power optical system ZL according to this embodiment, it is preferable that the third lens group G3 includes an object side group G3a having positive refractive power and disposed to the object side of the intermediate group G3b. By this configuration, even better optical performance can be implemented with bright lenses having small F numbers. Further high-order spherical aberration, which tends to be generated in bright lenses, can be corrected well.

In the variable power optical system ZL according to this embodiment, it is preferable that the image side group G3c, which is included in the third lens group G3 and is used for focusing, is constituted by one negative lens. By this configuration, the focusing lens can be lighter and focusing speed can be easily increased. Further, it is preferable that the image side group G3c is constituted by one negative meniscus lens having a concave surface facing the image plane. By this configuration, fluctuation of spherical aberration generated upon focusing can be controlled, and high speed focusing can be implemented.

In the variable power optical system ZL according to this embodiment, it is preferable that the image side group G3c included in the third lens group G3 has at least one negative lens, and this negative lens satisfies the following conditional expression (2).

$$ndF+0.0052\times vdF-1.965<0 \quad (2)$$

where ndF denotes a refractive index of a medium of the negative lens included in the image side group G3c at d-line.

The conditional expression (2) specifies the refractive index of the medium of the negative lens included in the image side group G3c at d-line. If the upper limit value of the conditional expression (2) is exceeded, glass material having relatively high refractive power and high color dispersibility must be used for this negative lens, and longitudinal chromatic aberration cannot be corrected well in a range from infinity to an object at close distance upon focusing, which is not desirable.

It is preferable that the negative lens included in the image side group G3c of the third lens group G3 satisfies the following conditional expression (3).

$$vdF>60 \quad (3)$$

where vdF denotes an Abbe number of the medium of the negative lens included in the image side group G3c.

The conditional expression (3) specifies an Abbe number of the medium of the negative lens included in the image side group G3c. If the lower limit value of the conditional expression (3) is not reached, dispersibility of the focusing lens increases, and longitudinal chromatic aberration, which tends to stand out in a bright lens, cannot be corrected sufficiently in the range from infinity to an object at close distance upon focusing, which is not desirable. To demonstrate the effect of the invention with certainty, it is preferable that the lower limit value of the conditional expression (3) is 62.

In the variable power optical system ZL according to this embodiment, if the third lens group G3 includes an object side group G3a having positive refractive power and disposed to the object side of the intermediate group G3b, it is preferable that this object side group G3a includes one positive lens and satisfies the following conditional expression (4).

$$vdO>60 \quad (4)$$

where vdO denotes an Abbe number of a medium of the positive lens included in the object side group G3a.

The conditional expression (4) specifies the Abbe number of the medium of the positive lens included in the object side group G3a of the third lens group G3. If the lower limit value of the conditional expression (4) is not reached, longitudinal chromatic aberration, which tends to be generated in bright lenses, increases, and correction thereof becomes difficult, which is not desirable. To demonstrate the effect of the invention with certainty, it is preferable that the lower limit value of the conditional expression (4) is 62. To demonstrate the effect of the invention to the maximum, it is preferable that the lower limit value of the conditional expression (4) is 65.

It is preferable that that the variable power optical system ZL according to this embodiment satisfies the following conditional expression (5).

$$4.0<f4/fw<11.0 \quad (5)$$

where f4 denotes a focal length of the fourth lens group G4, and fw denotes a focal length of the variable power optical system ZL in the wide-angle end state.

The conditional expression (5) specifies the focal length of the fourth lens group G4. If the upper limit value of the conditional expression (5) is exceeded, the refractive power of the fourth lens group G4 decreases, and correction of curvature of field upon zooming becomes difficult, which is not desirable. To demonstrate the effect of the invention with certainty, it is preferable that the upper limit value of the conditional expression (5) is 10.0. To demonstrate the effect of the invention to the maximum, it is preferable that the upper limit value of the conditional expression (5) is 9.0. On the other hand, if the lower limit value of the conditional expression (5) is not reached, the refractive power of the fourth lens group G4 increases, and correction of distortion becomes difficult, and back focus cannot be secured, which is not desirable. To demonstrate the effect of the invention with certainty, it is preferable that the lower limit value of the conditional expression (5) is 5.0. To demonstrate the effect of the invention to the maximum, it is preferable that the lower limit value of the conditional expression (5) is 6.0.

In the variable power optical system ZL according to this embodiment, it is preferable that the first lens group G1 moves toward the image plane first, then moves toward the object upon zooming from the wide-angle end state to the telephoto end state. By this configuration, the diameter of the first lens group G1 is kept small while preventing abaxial light interrupt when the distance between the first lens group G1 and the second lens group G2 is increased, and a sudden change of distortion can be controlled.

In the variable power optical system ZL according to this embodiment, it is preferable that the third lens group G3 is disposed to the image side of the intermediate group G3b, and includes an image side group having positive refractive power, and camera shake (image blur) is corrected by using this image side group as a vibration-isolating lens group (hereafter called "vibration-isolating lens group G32") which moves so as to have a component in a direction orthogonal to the optical axis in a state of fixing the position of the intermediate group G3b with respect to the image plane. By disposing the vibration-isolating lens group G32 having positive refractive power to the image side of the intermediate group G3b in this way, a vibration-isolating function can be provided without increasing the number of lenses of the vibration-isolating lens group G32, even if the bright lenses having small F numbers are used.

In the variable power optical system ZL according to this embodiment, it is preferable that the third lens group G3 includes, in order from the object: a first sub-group G31; and a second sub-group G32 having positive refractive power. And the camera shake (image blur) is corrected using the second sub-group G32 as a vibration-isolating lens group which moves so as to have a component in a direction orthogonal to the optical axis, in a state of fixing the position of the first sub-group G31 with respect to the image plane. By disposing the second sub-group (vibration-isolating lens group) G32 having positive refractive power to the image side of the first sub-group G31 in this way, a vibration-isolating function can be provided without increasing the number of lenses of the second sub-group (vibration-isolating lens group) G32, even if the bright lenses having small F numbers are used.

It is preferable that the variable power optical system ZL according to this embodiment satisfies the following conditional expression (6).

$$1.5 < fv \times FNOw/f3 < 5.0 \qquad (6)$$

where f3 denotes a focal length of the third lens group G3, fv denotes a focal length of the second sub-group G32, and FNOw denotes an F number in the wide-angle end state.

The conditional expression (6) specifies the focal length of the second sub-group G32 used as the vibration-isolating lens group, and the focal length of the third lens group G3. If the upper limit value of the conditional expression (6) is exceeded, the refractive power of the second sub-group G32 decreases. Further, the moving distance of the second sub-group G32, upon vibration isolation (image blur correction) increases, and the diameter of the second sub-group G32 increases, which increases the weight of the second sub-group G32, and makes it difficult to correct the eccentric coma aberration well upon vibration isolation, which is not desirable. To demonstrate the effect of the invention with certainty, it is preferable that the upper limit value of the conditional expression (6) is 4.5. To demonstrate the effect of the invention to the maximum, it is preferable that the upper limit value of the conditional expression (6) is 4.0. On the other hand, if the lower limit value of the conditional expression (6) is not reached, the refractive power of the second sub-group G32 increases, and eccentric astigmatism and eccentric coma aberration cannot be corrected well upon vibration isolation, which is not desirable. To demonstrate the effect of the invention with certainty, it is preferable that the lower limit value of the conditional expression (6) is 1.6. To demonstrate the effect of the invention with even higher certainty, it is preferable that the lower limit value of the conditional expression (6) is 1.8. To demonstrate the effect of the invention to the maximum, it is preferable that the lower limit value of the conditional expression (6) is 2.2.

In the variable power optical system ZL according to this embodiment, at least one positive lens component may or may not be disposed between the intermediate group G3b and the image side group G3c of the third lens group G3. In the same manner, the object side group G3a disposed to the object side of the intermediate group G3b of the third lens group G3 may be omitted. In the intermediate group G3b, the positive lens and the negative lens may be cemented or each lens may be disposed as a single lens respectively.

By the above configuration, a variable power optical system ZL having high brightness and excellent optical performance can be provided.

A camera, which is an optical apparatus including the variable power optical system ZL according to this embodiment, will be described with reference to FIG. 30. This camera 1 is an interchangeable lens type mirrorless camera that includes the variable power optical system ZL according to this embodiment as an image capturing lens 2. In this camera 1, the light from an object (not illustrated) is collected by the image capturing lens 2, and forms an object image on an image plane of the imaging unit 3 via an OLPF (Optical Low-Pass Filter), which is not illustrated. Then the object image is photo-electric converted by a photo-electric conversion element disposed in the imaging unit 3, whereby the image of the object is generated. This image is displayed on an EVF (Electronic View Finder) 4 disposed in the camera 1. Thereby the user can view the object via the EVF 4.

If a release button (not illustrated) is pressed by the user, the photo-electric-converted image is stored in a memory (not illustrated) by the imaging unit 3. Thus the user can capture the image of the object using this camera 1. In this embodiment, an example of the mirrorless camera was described, but an effect similar to the case of this camera 1 can be demonstrated even when the variable power optical system ZL according to this embodiment may be included in a single lens reflex type camera, which has a quick return mirror in the camera main unit and views the object using a finder optical system.

The following content can be adopted within a range where the optical performance is not diminished.

In this example, the variable power optical system ZL constituted by four lens groups was shown, but the present invention can also be applied to a configuration using a different number of lens groups, such as five lens groups or six lens groups. A lens or a lens group may be added to the configuration on the side closest to the object, or a lens or a lens group may be added to the configuration on the side closest to the image. "Lens group" refers to a portion having at least one lens isolated by an air space which changes upon zooming. In the variable power optical system ZL of this embodiment, the first lens group G1 to the fourth lens group G4 move along the optical axis respectively, such that each air space between the lens groups changes upon zooming.

A single or plurality of lens group(s) or a partial lens group may be designed to be a focusing lens group, which performs focusing from an object at infinity to an object at a close distance by moving in the optical axis direction. This focusing lens group can be applied to auto focus, and is also suitable for driving a motor for auto focusing (driving using an ultrasonic motor or the like). It is particularly preferable that a part of the third lens group G3 (image side group G3c, as mentioned above) is designed to be the focusing lens group, and the positions of other lenses with respect to the image plane are preferably fixed upon focusing.

A lens group or a partial lens group may be designed to be a vibration-isolating lens group, which corrects image blurs generated by camera shake, by moving the lens group or the partial lens so as to have a component in a direction orthogonal to the optical axis or rotating (oscillating) the lens group or the partial lens group in an in-plane direction that includes the optical axis. It is particularly preferable that at least a part of the third lens group G3 (e.g. lens disposed to the image side of the four lenses (positive, negative, negative, positive) of the intermediate group G3b) is designed to be the vibration-isolating lens group.

The lens surface may be formed to be a spherical surface or a plane, or an aspherical surface. If the lens surface is a spherical surface or a plane, lens processing, assembly and adjustment are easy, and deterioration of optical performance, due to an error generated in processing, assembly and adjustment, can be prevented. Even if the image plane is shifted, the drawing performance is not affected very much, which is desirable. If the lens surface is aspherical, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index-distributed lens (GRIN lens) or a plastic lens.

It is preferable that the aperture stop S is disposed near the third lens group G3, but the role of the aperture stop may be substituted by the frame of the lens, without disposing a separate member as the aperture stop.

Each lens surface may be coated with an anti-reflection film, which has high transmittance in a wide wavelength region, in order to decrease flares and ghosts, and implement high optical performance with high contrast.

The zoom ratio of the variable power optical system ZL of this embodiment is about 2.5 to 4.

Figure 32:
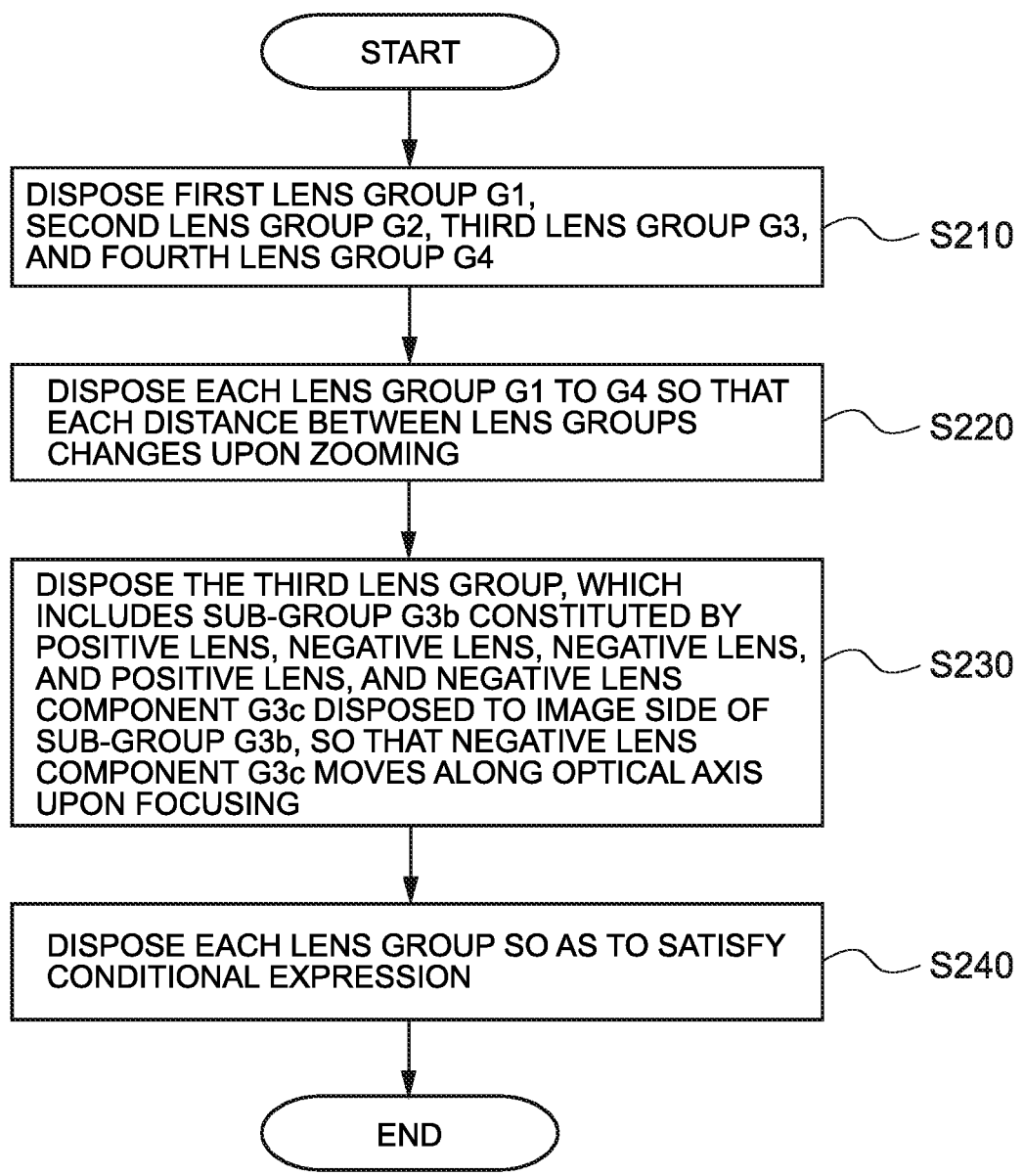
FIG. 32 is a flow chart depicting a manufacturing method for the variable power optical system according to Embodiment 2 represented by Example 1 to Example 5.

An outline of a manufacturing method for the variable power optical system ZL according to this embodiment will now be described with reference to FIG. 32. First each lens is disposed to prepare the first to fourth lens groups G1 to G4 (step S210). Each lens group is disposed so that the distance between the first lens group G1 and the second lens group G2, the distance between the second lens group G2 and the third lens group G3, and the distance between the third lens group G3 and the fourth lens group G4 change respectively upon zooming from the wide-angle end state to the telephoto end state (step S220). The third lens group G3 includes: the intermediate group G3$b$ constituted by, in order from the object, the first positive lens, the first negative lens, the second negative lens and the second positive lens; and an image side group G3$c$ having negative refractive power and disposed to the image side of the intermediate group G3$b$, and the third lens group G3 is disposed so that the position of the intermediate group G3$b$ with respect to the image plane is fixed, and the image side group G3$c$ moves along the optical axis upon focusing (step S230).

Further, each lens group is disposed so that at least the above mentioned conditional expression (7) is satisfied (step S240). As shown in FIG. 1, according to a concrete example of this embodiment: the first lens group G1 is prepared by disposing a cemented lens, where a negative meniscus lens L11 having a convex surface facing the object and a positive meniscus lens L12 having a convex surface facing the object are cemented in order from the object. The second lens group G2 is prepared by disposing: a negative lens L21, of which aspherical shape is formed by creating a resin layer on the object side lens surface of a negative meniscus lens having a convex surface facing the object; a cemented lens where a biconcave lens L22 and a biconvex lens L23 are cemented; and a cemented lens where a positive meniscus lens L24 having a concave surface facing the object, and a negative lens L25 which has a concave surface facing the object and of which image side lens surface is aspherical, are cemented. The third lens group G3 is prepared by disposing: a positive lens L31 of which object side and image side lens surfaces are aspherical; a cemented lens where a biconvex lens L32 and a biconcave lens L33 are cemented; a cemented lens where a biconcave lens L34 and a biconvex lens L35 are cemented; a positive lens L36 of which object side and image side lens surfaces are aspherical, and a negative meniscus lens L37 having a convex surface facing the object. The fourth lens group G4 prepared by disposing a positive lens L41 of which object side lens surface is aspherical. These lens groups are disposed according to the above mentioned procedure, whereby the variable power optical system ZL is manufactured.

Embodiment 3

Embodiment 3 will now be described with reference to the drawings. As shown in FIG. 1, a variable power optical system ZL according to this embodiment includes, in order from an object: a first lens group G1 having positive refractive power; a second lens group G2 having negative refractive power; and a rear group GR having positive refractive power and disposed to the image side of the second lens group G2. The variable power optical system ZL is configured such that the distance between the first lens group G1 and the second lens group G2, and the distance between the second lens group G2 and the rear group GR change respectively upon zooming from the wide-angle end state to the telephoto end state. In the variable power optical system ZL, the rear group GR includes: an intermediate group G3$b$ constituted by, in order from the object, a positive lens, a negative lens, a negative lens and a positive lens; and an image side group having positive refractive power and disposed to the image side of the intermediate group G3$b$. Camera shake (image blur) is corrected by using the image side group as a vibration-isolating lens group (hereafter called "vibration-isolating lens group G32") which moves so as to have a component in a direction orthogonal to the optical axis in a state of fixing the position of the intermediate group G3$b$ with respect to the image plane. By configuring the variable power optical system ZL of this embodiment in this way, excellent optical performance can be implemented with bright lenses having small F numbers. In other words, the intermediate group G3$b$ of the rear group GR is constituted by four lenses having a symmetric structure (positive, negative, negative, positive), whereby spherical aberration, curvature of field and coma aberration can be corrected well while keeping the F numbers small for high brightness. Further, by disposing the vibration-isolating lens group G32 having positive refractive power, to the image side of the intermediate group G3$b$, a vibration-isolating function can be provided without increasing the number of lenses of the vibration-isolating lens group G32, even if brightness lenses having small F numbers are used. "Lens component" refers to a single lens or to a cemented lens where a plurality of lenses are cemented.

The variable power optical system ZL according to this embodiment may be configured such that the rear group GR includes at least a third lens group G3 having positive refractive power and disposed closest to the object, and each distance between lenses constituting the third lens group G3 is constant upon zooming from the wide-angle end state to the telephoto end state. The third lens group G3 includes the above mentioned intermediate group G3$b$. It is preferable that the variable power optical system ZL having this configuration satisfies the following conditional expression (8).

$$1.0 < f3/\Delta T3 < 2.2 \tag{8}$$

where $\Delta T3$ denotes a moving distance of the third lens group G3 upon zooming from the wide-angle end state to the telephoto end state, and f3 denotes a focal length of the third lens group G3.

The conditional expression (8) specifies the focal length of the third lens group G3 and the moving distance of the third lens group G3 upon zooming. If the upper limit value of the conditional expression (8) is exceeded, the power of the third lens group G3 becomes too weak with respect to the moving distance, and the moving of the third lens group G3 cannot contribute to zooming. As a result, the power of the first lens group G1 and the second lens group G2 increase, and the sizes of the first lens group G1 and the second lens group G2 are increased, or curvature of field cannot be corrected well, which is not desirable. To demonstrate the effect of the invention with certainty, it is preferable that the upper limit value of the conditional expression (8) is 2.0. To demonstrate the effect of the invention with even higher certainty, it is preferable that the upper limit value of the conditional expression (8) is 1.8. To demonstrate the effect of the invention to the maximum, it is preferable that the upper limit value of the conditional expression (8) is 1.75. On the other hand, if the lower limit value of the conditional expression (8) is not reached, the power of the third lens group G3 becomes too strong with respect to the moving distance, and the spherical aberration cannot be corrected well, which is not desirable. To demonstrate the effect of the invention with certainty, it is preferable that the lower limit value of the conditional expression (8) is 1.2. To demonstrate the effect of the invention with even higher certainty, it is preferable that the lower limit value of the conditional expression (8) is 1.3. To demonstrate the effect of the invention to the maximum, it is preferable that the lower limit value of the conditional expression (8) is 1.4.

In the variable power optical system ZL of this embodiment, it is preferable that the rear group GR includes an object side group G3a having positive refractive power and disposed to the object side of the intermediate group G3b. By this configuration, good optical performance can be maintained using bright lenses having small F numbers. Further, high-order spherical aberration, which tends to be generated in bright lenses, can be corrected well.

In the variable power optical system ZL, it is preferable that the vibration-isolating lens group G32 is constituted by one positive lens. By this configuration, the lens used for vibration isolation can be lighter, and the vibration-isolating mechanism can be lighter, and the vibration-isolating performance can easily be improved. Further, it is preferable that the vibration-isolating lens group G32 is constituted by one biconvex lens. By this configuration, fluctuation of coma aberration, which is generated upon vibration isolation, can be controlled.

In the variable power optical system ZL according to this embodiment, it is preferable that the vibration-isolating lens group G32 includes at least one positive lens, and this positive lens satisfies the following conditional expression (9).

$$ndVR+0.0052 \times vdVR-1.965<0 \qquad (9)$$

where ndVR denotes a refractive index of a medium of the positive lens included in the vibration-isolating lens group G32, and vdVR denotes an Abbe number of the medium of the positive lens included in the vibration-isolating lens group G32.

The conditional expression (9) specifies the refractive index of the medium of the positive lens included in the vibration-isolating lens group G32 at d-line. If the upper limit value of the conditional expression (9) is exceeded, glass material having relatively high refractive power and high color dispersibility must be used for this positive lens, and the lateral chromatic aberration cannot be corrected well in a range of camera shake correction, which is not desirable.

It is also preferable that the positive lens included in the vibration-isolating lens group G32 satisfies the following conditional expression (10).

$$vdVR>60 \qquad (10)$$

where vdVR denotes an Abbe number of the medium of the positive lens included in the vibration-isolating lens group G32.

The conditional expression (10) specifies an Abbe number of the medium of the positive lens included in the vibration-isolating lens group G32. If the lower limit value of the conditional expression (10) is not reached, dispersibility of the vibration-isolating lens group G32 increases, and lateral chromatic aberration, which tends to stand out upon camera shake correction, cannot be sufficiently corrected in the range of camera shake correction, which is not desirable. To demonstrate the effect of the invention with certainty, it is preferable that the lower limit value of the conditional expression (10) is 62.

In the variable power optical system ZL according to this embodiment, if the rear group GR includes an object side group G3a having positive refractive power and disposed to the object side of the intermediate group G3b, it is preferable that this object side group G3a includes one positive lens and satisfies the following conditional expression (4).

$$vdO>60 \qquad (4)$$

where vdO denotes an Abbe number of a medium of the positive lens included in the object side group G3a.

The conditional expression (4) specifies the Abbe number of the medium of the positive lens included in the object side group G3a of the rear group GR. If the lower limit value of the conditional expression (4) is not reached, longitudinal chromatic aberration, which tends to be generated in bright lenses, increases, and correction thereof becomes difficult, which is not desirable. To demonstrate the effect of the invention with certainty, it is preferable that the lower limit value of the conditional expression (4) is 62. To demonstrate the effect of the invention to the maximum, it is preferable that the lower limit value of the conditional expression (4) is 65.

The variable power optical system ZL according to this embodiment is configured such that the rear group GR includes a plurality of lens groups (e.g. third lens group G3 and fourth lens group G4 in FIG. 1), and each distance of the plurality of lense groups included in the rear group GR changes upon zooming from the wide-angle end state to the telephoto end state. When a lens group closest to the image (e.g. fourth lens group G4 in FIG. 1), out of the plurality of lens groups, is the final lens group, it is preferable that the variable power optical system ZL according to this embodiment satisfies the following conditional expression (11).

$$4.0<fr/fw<11.0 \qquad (11)$$

where fr denotes a focal length of the final lens group, and fw denotes a focal length of the variable power optical system ZL in the wide-angle end state.

The conditional expression (11) specifies the focal length of the final lens group. If the upper limit value of the conditional expression (11) is exceeded, the refractive power of the final lens group decreases, and correction of curvature of field upon zooming becomes difficult, which is not desirable. To demonstrate the effect of the invention with certainty, it is preferable that the upper limit value of the conditional expression (11) is 10.0. To demonstrate the effect of the invention to the maximum, it is preferable that the upper limit value of the conditional expression (11) is 9.0. On the other hand, if the lower limit value of the conditional expression (11) is not reached, the refractive power of the final lens group increases, and correction of distortion becomes difficult and back focus cannot be secured, which is not desirable. To demonstrate the effect of the invention with certainty, it is preferable that the lower limit value of the conditional expression (11) is 5.0. To demonstrate the effect of the invention to the maximum, it is preferable that the lower limit value of the conditional expression (11) is 6.0.

The variable power optical system ZL according to this embodiment may be configured such that the rear group GR includes, in order from the object, a third lens group G3 having positive refractive power and a fourth lens group G4, and the distance between the third lens group G3 and the fourth lens group G4 changes upon zooming from the wide-angle end state to the telephoto end state. The third lens group G3 includes at least the above mentioned intermediate lens group G3b. It is preferable that the variable power optical system ZL having this configuration satisfies the following conditional expression (12).

$$0.9 < f3/(fw \times ft)^{1/2} < 2.0 \tag{12}$$

where f3 denotes a focal length of the third lens group G3, fw denotes a focal length of the variable power optical system ZL in the wide-angle end state, and ft denotes a focal length of the variable power optical system ZL in the telephoto end state.

The conditional expression (12) specifies the focal length of the third lens group G3. If the upper limit value of the conditional expression (12) is exceeded, the refractive power of the third lens group G3 decreases and the total length of the optical system increases, which is not desirable. To demonstrate the effect of the invention with certainty, it is preferable that the upper limit value of the conditional expression (12) is 1.8. To demonstrate the effect of the invention to the maximum, it is preferable that the upper limit value of the conditional expression (12) is 1.6. On the other hand, if the lower limit value of the conditional expression (12) is not reached, the refractive power of the third lens group G3 increases and correction of spherical aberration becomes difficult, which is not desirable. To demonstrate the effect of the invention with certainty, it is preferable that the lower limit value of the conditional expression (12) is 1.0. To demonstrate the effect of the conditional expression (12) to the maximum, it is preferable that the lower limit value of the conditional expression (12) is 1.1.

It is preferable that the variable power optical system ZL according to this embodiment satisfies the following conditional expression (7).

$$1.5 < fv \times FNOw/f3 < 5.0 \tag{7}$$

where f3 denotes a focal length of the third lens group G3, fv denotes a focal length of the vibration-isolating lens group G32, and FNOw denotes an F number in the wide-angle end state.

The conditional expression (7) specifies the focal length of the vibration-isolating lens group G32 and the focal length of the third lens group G3. If the upper limit value of the conditional expression (7) is exceeded, the refractive power of the vibration-isolating lens group G32 decreases. Further, the moving distance of the vibration-isolating lens group G32 upon vibration isolation (upon image blur correction) increases, and the diameter of the vibration-isolating lens group G32 increases, which makes the vibration-isolating lens group G32 heavier, and makes it difficult to correct eccentric coma aberration well upon vibration isolation, which is not desirable. To demonstrate the effect of the invention with certainty, it is preferable that the upper limit value of the conditional expression (7) is 4.5. To demonstrate the effect of the invention to the maximum, it is preferable that the upper limit value of the conditional expression (7) is 4.0. On the other hand, if the lower limit value of the conditional expression (7) is not reached, the refractive power of the vibration-isolating lens group G32 increases, and eccentric astigmatism and eccentric coma aberration cannot be corrected well upon vibration isolation, which is not desirable. To demonstrate the effect of the invention with certainty, it is preferable that the lower limit value of the conditional expression (7) is 1.6. To demonstrate the effect of the invention with even higher certainty, it is preferable that the lower limit value of the conditional expression (7) is 1.8. To demonstrate the effect of the invention to the maximum, it is preferable that the lower limit value of the conditional expression (7) is 2.2.

In the variable power optical system ZL according to this embodiment, it is preferable that the first lens group G1 moves toward the image plane first, then moves toward the object upon zooming from the wide-angle end state to the telephoto end state. By this configuration, the diameter of the first lens group G1 is kept small while preventing abaxial light interrupt when the distance between the first lens group G1 and the second lens group G2 is increased, and a sudden change of distortion can be controlled.

The variable power optical system ZL according to this embodiment may be configured such that the rear group GR is constituted by, in order from the object: a third lens group G3 having positive refractive power; and a fourth lens group G4 having positive refractive power, and the distance between the third lens group G3 and the fourth lens group G4 changes upon zooming, or may be configured such that the rear group GR is constituted by, in order from the object: a third lens group G3 having positive refractive power; a fourth lens group G4 having negative refractive power; and a fifth lens group G5 having positive refractive power, and the distance between the third lens group G3 and the fourth lens group G4 and the distance between the fourth lens group G4 and the fifth lens group G5 change respectively upon zooming. In the variable power optical system ZL according to this embodiment, it is preferable that the third lens group G3 includes, in order from the object: a front side group G3a; an intermediate group G3b; and a vibration-isolating lens group G32, which move together upon zooming, and the intermediate group G3b is constituted by four lenses (positive, negative, negative, positive). The vibration-isolating lens group G32 may be designed as the fourth lens group G4, instead of being included in the third lens group G3. The object side group G3a disposed to the object side of the intermediate group G3b of the rear group GR may be omitted. In the four lenses (positive, negative, negative, positive) included in the intermediate group G3b, the positive lens and the negative lens may be cemented, or each lens thereof may be disposed as a single lens.

In the variable power optical system ZL according to this embodiment, it is preferable that the third lens group G3 includes at least two lens components disposed to the image side of the intermediate group G3b. By disposing at least two lens components to the image side of the intermediate group G3b, the focusing lens group and the vibration-isolating lens group G32 can be disposed in the third lens group G3. It is preferable that the third lens group G3 is constituted by, in order from the object: the front side group G3a; the intermediate lens group G3b; the vibration-isolating lens group G32; and the focusing lens group. The vibration-isolating lens group G32 is preferably constituted by one positive lens, but may be constituted by one cemented lens, or constituted by a plurality of lens components.

In the variable power optical system ZL according to this embodiment, the front side group G3a is constituted by one aspherical lens, but may be constituted by two spherical lenses.

By the above configuration, a variable power optical system ZL having high brightness and excellent optical performance can be provided.

A camera, which is an optical apparatus including the variable power optical system ZL according to this embodiment, will be described with reference to FIG. 30. This camera 1 is an interchangeable lens type mirrorless camera that includes the variable power optical system ZL according to this embodiment as an image capturing lens 2. In this camera 1, the light from an object (not illustrated) is collected by the image capturing lens 2, and forms an object image on an image plane of the imaging unit 3 via an OLPF (Optical Low-Pass Filter), which is not illustrated. Then the object image is photo-electric converted by a photo-electric conversion element disposed in the imaging unit 3, whereby the image of the object is generated. This image is displayed on an EVF (Electronic View Finder) 4 disposed in the camera 1. Thereby the user can view the object via the EVF 4.

If a release button (not illustrated) is pressed by the user, the photo-electric-converted image is stored in a memory (not illustrated) by the imaging unit 3. Thus the user can capture the image of the object using this camera 1. In this embodiment, an example of the mirrorless camera was described, but an effect similar to the case of this camera 1 can be demonstrated even when the variable power optical system ZL according to this embodiment may be included in a single lens reflex type camera, which has a quick return mirror in the camera main unit and views the object using a finder optical system.

The following content can be adopted within a range where the optical performance is not diminished.

In this example, the variable power optical system ZL constituted by four lens groups or five lens groups was shown, but the present invention can also be applied to a configuration using a different number of lens groups, such as six lens groups or seven lens groups. A lens or a lens group may be added to the configuration on the side closest to the object, or a lens or a lens group may be added to the configuration on the side closest to the image. In concrete terms, a lens group, of which position with respect to the image plane is fixed upon zooming, may be added to the configuration one the side closest to the image. "Lens group" refers to a portion having at least one lens isolated by an air space which changes upon zooming. In the variable power optical system ZL of this embodiment, the first lens group G1 to the fourth lens group G4 (or the fifth lens group G5) move along the optical axis respectively, such that each air space between the lens groups changes upon zooming.

A single or plurality of lens group(s) or a partial lens group may be designed to be a focusing lens group, which performs focusing from an object att infinity to an object at a close distance by moving in the optical axis direction. This focusing lens group can be applied to auto focus, and is also suitable for driving a motor for auto focusing (driving using an ultrasonic motor or the like). It is particularly preferable that a part of the rear group (third lens group G3) (e.g. a negative lens component disposed to the image side of the vibration-isolating lens group G32, or the fourth lens group G4 disposed to the image side of the third lens group G3) is designed to be the focusing lens group, and the positions of other lenses with respect to the image plane are fixed upon focusing. Considering the load applied to the motor, it is preferable that the focusing lens group is constituted by single lenses.

A lens group or a partial lens group may be designed to be a vibration-isolating lens group, which corrects image blurs generated by camera shake, by moving the lens group or the partial lens group so as to have a component in a direction orthogonal to the optical axis or rotating (oscillating) the lens group or the partial lens group in an in-plane direction that includes the optical axis. It is particularly preferable that at least a part of the rear group GR (e.g. vibration-isolating lens group G32 of the third lens group G3) is designed to be the vibration-isolating lens group, as mentioned above.

The lens surface may be formed to be a spherical surface or a plane, or an aspherical surface. If the lens surface is a spherical surface of plane, lens processing, assembly and adjustment are easy, and deterioration of optical performance, due to an error generated in processing, assembly and adjustment can be prevented. Even if the image plane is shifted, the drawing performance is not affected very much, which is desirable. If the lens surface is aspherical, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index-distributed lens (GRIN lens) or a plastic lens.

It is preferable that the aperture stop S is disposed near the third lens group G3, but the role of the aperture stop may be substituted by the frame of the lens, without disposing a separate member as the aperture stop.

Each lens surface may be coated with an anti-reflection film, which has high transmittance in a wide wavelength region, in order to decrease flares and ghosts, and implement high optical performance with high contrast.

The zoom ratio of the variable power optical system ZL of this embodiment is about 2.5 to 4. The F number of the variable power optical system ZL of this embodiment is smaller than 3.5 in the wide-angle end state to the telephoto end state.

Figure 33:
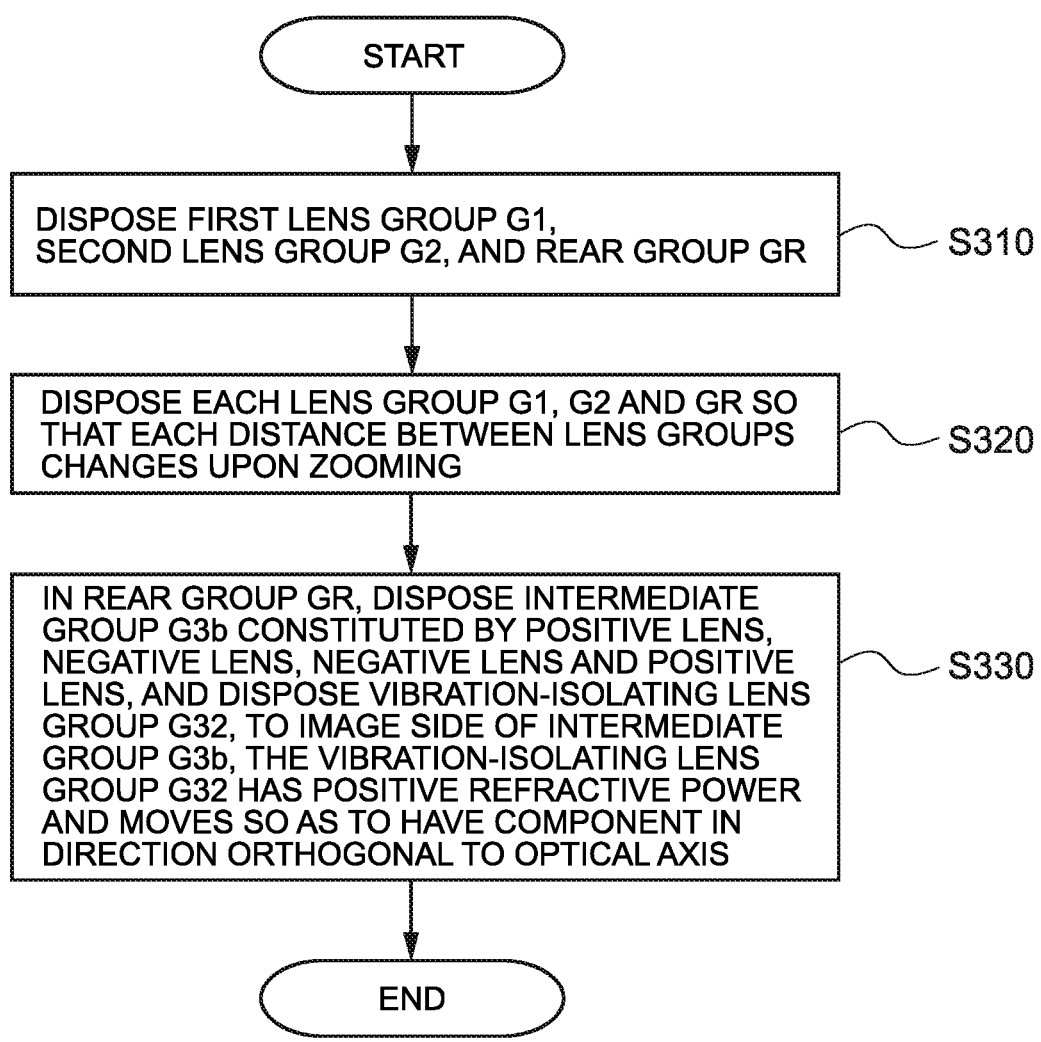
FIG. 33 is a flow chart depicting a manufacturing method for the variable power optical system according to Embodiment 3 represented by Example 1 to Example 6.

An outline of a manufacturing method for the variable power optical system ZL according to this embodiment will now be described with reference to FIG. 33. First each lens is disposed to prepare the first lens group G1, the second lens group G2 and the rear group GR respectively (step S310). Each lens group is disposed so that the distance between the first lens group G1 and the second lens group G2, and the distance between the second lens group G2 and the rear group GR change respectively upon zooming from the wide-angle end state to the telephoto end state (step S320). In the rear group GR, the intermediate group G3b constituted by, in order from the object, a positive lens, a negative lens, a negative lens, and a positive lens; and the vibration-isolating lens group G32 having positive refractive power which is disposed to the image side of the intermediate group G3b and moves to have a component in a direction orthogonal to the optical axis, are disposed (steps S330).

In the manufacturing method for the variable power optical system ZL according to this embodiment, each lens group is disposed such that the rear group GR includes at least the third lens group G3 having positive refractive power and disposed closest to the object, the distance between lenses constituting the third lens group G3 is constant upon zooming from the wide-angle end state to the telephoto end state. It is preferable that the third lens group G3 includes the intermediate group G3b and satisfies the above mentioned conditional expression (8).

As shown in FIG. 1, according to a concrete example of this embodiment, the first lens group G1 is prepared by disposing a cemented lens, where a negative meniscus lens L11 having a convex surface facing the object and a positive meniscus lens L12 having a convex surface facing the object are cemented in order from the object. The second lens group G2 is prepared by disposing: a negative lens L21, of which aspherical shape is formed by creating a resin layer on the object side lens surface of a negative meniscus lens having a convex surface facing the object; a cemented lens where a biconcave lens L22 and a biconvex lens L23 are cemented; and a cemented lens where a positive meniscus lens L24 having a concave surface facing the object, and a negative lens L25 which has a concave surface facing the object and of which image side lens surface is aspherical, are cemented. The third lens group G3 is prepared by disposing: a positive lens L31 of which object side and image side lens surfaces are aspherical, a cemented lens where a biconvex lens L32 and a biconcave lens L33 are cemented; a cemented lens where a biconcave lens L34 and a biconvex lens L35 are cemented; a positive lens L36 of which object side and image side lens surfaces are aspherical; and a negative meniscus lens L37 having a convex surface facing the object. The fourth lens group G4 is prepared by disposing a positive lens L41 of which object side lens surface is aspherical. The third lens group G3 and the fourth lens group G4 constitute the rear group GR. These lens groups are disposed according to the above mentioned procedure, whereby the variable power optical system ZL is manufactured.

Embodiment 4

Embodiment 4 will now be described with reference to the drawings. As shown in FIG. 1, a variable power optical system ZL according to this embodiment includes, in order from an object: a first lens group G1 having positive refractive power; a second lens group G2 having negative refractive power; and a rear group GR having positive refractive power. The rear group GR includes a third lens group G3 having positive refractive power and disposed on the side closest to the object in the rear group GR. The variable power optical system ZL is configured such that the distance between the first lens group G1 and the second lens group G2 and the distance between the second lens group G2 and the rear group GR change respectively, and each distance between lenses constituting the third lens group G3 is constant upon zooming from the wide-angle end state to the telephoto end state. In the variable power optical system ZL, the third lens group G3 includes, in order from the object, a first sub-group G31 and a second sub-group G32 having positive refractive power. Camera shake (image blur) is corrected using a second sub-group G32 as a vibration-isolating lens group, which moves so as to have a component in a direction orthogonal to the optical axis in a state of fixing the position of the first sub-group G31 with respect to the image plane. By configuring the variable power optical system ZL in this way, excellent optical performance can be implemented with bright lenses having small F numbers. Further, by disposing the second sub-group (vibration-isolating lens group) G32 having positive refractive power to the image side of the first sub-group G31, a vibration-isolating function can be provided without increasing the number of lenses of the second sub-group (vibration-isolating lens group) G32, even if the bright lenses having small F numbers are used. "Lens component" refers to a single lens or to a cemented lens where a plurality of lenses are cemented.

It is preferable that the variable power optical system ZL according to this embodiment satisfies the following conditional expression (6).

$$1.5 < fv \times FNOw/f3 < 5.0 \quad (6)$$

where f3 denotes a focal length of the third lens group G3, fv denotes a focal length of the second sub-group G32, and FNOw denotes an F number in the wide-angle end state.

The conditional expression (6) specifies the focal length of the second sub-group G32 used as the vibration-isolating lens group, and the focal length of the third lens group G3. If the upper limit value of the conditional expression (6) is exceeded, the refractive power of the second sub-group G32 decreases. Further, the moving distance of the second sub-group G32 upon vibration isolation (upon image blur correction) increases, and the diameter of the second sub-group G32 increases, which makes the second sub-group G32 heavier, and makes it difficult to correct eccentric coma aberration well upon vibration isolation, which is not desirable. To demonstrate the effect of the invention with certainty, it is preferable that the upper limit value of the conditional expression (6) is 4.5. To demonstrate the effect of the invention to the maximum, it is preferable that the upper limit value of the conditional expression (6) is 4.0. On the other hand, if the lower limit value of the conditional expression (6) is not reached, the refractive power of the second sub-group G32 increases, and eccentric astigmatism and eccentric coma aberration cannot be corrected well upon vibration isolation, which is not desirable. To demonstrate the effect of the invention with certainty, it is preferable that the lower limit value of the conditional expression (6) is 1.6. To demonstrate the effect of the invention with even higher certainty, it is preferable that the lower limit value of the conditional expression (6) is 1.8. To demonstrate the effect of the invention to the maximum, it is preferable that the lower limit value of the conditional expression (6) is 2.2.

In the variable power optical system ZL according to this embodiment, the first sub-group G31 includes an intermediate group G3b, constituted by, in order from the object, a positive lens, a negative lens, a negative lens, and a positive lens. In other words, the intermediate group G3b of the rear group GR is constituted by four lenses having a symmetric structure (positive, negative, negative, positive), whereby spherical aberration, curvature of field and coma aberration can be corrected well, while keeping the F numbers small for high brightness.

In the variable power optical system ZL of this embodiment, it is preferable that the first sub-group G31 of the third lens group G3 includes an object side group G3a having positive refractive power and disposed to the object side of the intermediate group G3b. By this configuration, good optical performance can be maintained using bright lenses having small F numbers. Further, high-order spherical aberration, which tends to be generated in bright lenses, can be corrected well.

In the variable power optical system ZL, it is preferable that the second sub-group G32, which is the vibration-isolating lens group G32, and which is included in the third lens group G3 and is used for vibration isolation, is constituted by one positive lens. By this configuration, the lens used for vibration isolation can be lighter, and the vibration-isolating mechanism can be lighter, and the vibration-isolating performance can easily be improved. Further, it is preferable that the second sub-group G32 is constituted by one biconvex lens. By this configuration, fluctuation of coma aberration, which is generated upon vibration isolation, can be controlled.

In the variable power optical system ZL according to this embodiment, it is preferable that the second sub-group G32 included in the third lens group G3 includes at least one positive lens, and this positive lens satisfies the following conditional expression (9).

$$ndVR+0.0052 \times vdVR-1.965<0 \qquad (9)$$

where ndVR denotes a refractive index of a medium of the positive lens included in the second sub-group G32, and vdVR denotes an Abbe number of the medium of the positive lens included in the second sub-group G32.

The conditional expression (9) specifies the refractive index of the medium of the positive lens included in the second sub-group G32 at d-line. If the upper limit value of the conditional expression (9) is exceeded, glass material having relatively high refractive power and high color dispersibility must be used for this positive lens, and the lateral chromatic aberration cannot be corrected well in a range of camera shake correction, which is not desirable.

It is also preferable that the positive lens included in the second sub-group G32 of the third lens group G3 satisfies the following conditional expression (10).

$$vdVR>60 \qquad (10)$$

where vdVR denotes an Abbe number of the medium of the positive lens included in the second sub-group G32.

The conditional expression (10) specifies an Abbe number of the medium of the positive lens included in the second sub-group G32. If the lower limit value of the conditional expression (10) is not reached, dispersibility of the second sub-group G32 used as the vibration-isolating lens group increases, and lateral chromatic aberration, which tends to stand out upon camera shake correction, cannot be sufficiently corrected in the range of camera shake correction, which is not desirable. To demonstrate the effect of the invention with certainty, it is preferable that the lower limit value of the conditional expression (10) is 62.

In the variable power optical system ZL according to this embodiment, if the first sub-group G31 of the third lens group G3 includes an object side group G3a having positive refractive power and disposed to the object side of the intermediate group G3b, it is preferable that this object side group G3a includes one positive lens and satisfies the following conditional expression (4).

$$vdO>60 \qquad (4)$$

where vdO denotes an Abbe number of a medium of the positive lens included in the object side group G3a.

The conditional expression (4) specifies the Abbe number of the medium of the positive lens included in the object side group G3a of the first sub-group G31 of the third lens group G3. If the lower limit value of the conditional expression (4) is not reached, longitudinal chromatic aberration, which tends to be generated in bright lenses, increases, and correction thereof becomes difficult, which is not desirable. To demonstrate the effect of the invention with certainty, it is preferable that the lower limit value of the conditional expression (4) is 62. To demonstrate the effect of the invention to the maximum, it is preferable that the lower limit value of the conditional expression (4) is 65.

The variable power optical system ZL according to this embodiment is configured such that the rear group GR includes a plurality of lens groups (e.g. third lens group G3 and fourth lens group G4 in FIG. 1), and each distance of the plurality of lense groups included in the rear group GR changes upon zooming from the wide-angle end state to the telephoto end state. When a lens group closest to the image (e.g. fourth lens group G4 in FIG. 1), out of the plurality of lens groups, is the final lens group, it is preferable that the variable power optical system ZL according to this embodiment satisfies the following conditional expression (11).

$$4.0<fr/fw<11.0 \qquad (11)$$

where fr denotes a focal length of the final lens group, and fw denotes a focal length of the variable power optical system ZL in the wide-angle end state.

The conditional expression (11) specifies the focal length of the final lens group. If the upper limit value of the conditional expression (11) is exceeded, the refractive power of the final lens group decreases, and correction of curvature of field upon zooming becomes difficult, which is not desirable. To demonstrate the effect of the invention with certainty, it is preferable that the upper limit value of the conditional expression (11) is 10.0. To demonstrate the effect of the invention to the maximum, it is preferable that the upper limit value of the conditional expression (11) is 9.0. On the other hand, if the lower limit value of the conditional expression (11) is not reached, the refractive power of the final lens group increases, and correction of distortion becomes difficult and back focus cannot be secured, which is not desirable. To demonstrate the effect of the invention with certainty, it is preferable that the lower limit value of the conditional expression (11) is 5.0. To demonstrate the effect of the invention to the maximum, it is preferable that the lower limit value of the conditional expression (11) is 6.0.

The variable power optical system ZL according to this embodiment may be configured such that the rear group GR includes, in order from the object, a third lens group G3 having positive refractive power and a fourth lens group G4, and the distance between the third lens group G3 and the fourth lens group G4 changes upon zooming from the wide-angle end state to the telephoto end state. The third lens group G3 includes at least the intermediate lens group G3b. It is preferable that the variable power optical system ZL having this configuration satisfies the following conditional expression (12).

$$0.9<f3/(fw \times ft)^{1/2}<2.0 \qquad (12)$$

where f3 denotes a focal length of the third lens group G3, fw denotes a focal length of the variable power optical system ZL in the wide-angle end state, and ft denotes a focal length of the variable power optical system ZL in the telephoto end state.

The conditional expression (12) specifies the focal length of the third lens group G3. If the upper limit value of the conditional expression (12) is exceeded, the refractive power of the third lens group G3 decreases and the total length of the optical system increases, which is not desirable. To demonstrate the effect of the invention with certainty, it is preferable that the upper limit value of the conditional expression (12) is 1.8. To demonstrate the effect of the invention to the maximum, it is preferable that the upper limit value of the conditional expression (12) is 1.6. On the other hand, if the lower limit value of the conditional expression (12) is not reached, the refractive power of the third lens group G3 increases and correction of spherical aberration becomes difficult, which is not desirable. To demonstrate the effect of the invention with certainty, it is preferable that the lower limit value of the conditional expression (12) is 1.0. To demonstrate the effect of the conditional expression (12) to the maximum, it is preferable that the lower limit value of the conditional expression (12) is 1.1.

It is preferable that the variable power optical system ZL according to this embodiment satisfies the following conditional expression (8).

$$1.0 < f3/\Delta T3 < 2.2 \tag{8}$$

where ΔT3 denotes a moving distance of the third lens group G3 upon zooming from the wide-angle end state to the telephoto end state, and f3 denotes a focal length of the third lens group G3.

The conditional expression (8) specifies the focal length of the third lens group G3 and the moving distance of the third lens group G3 upon zooming. If the upper limit value of the conditional expression (8) is exceeded, the power of the third lens group G3 becomes too weak with respect to the moving distance, and the moving of the third lens group G3 cannot contribute to zooming. As a result, the power of the first lens group G1 and the second lens group G2 increase, and the sizes of the first lens group G1 and the second lens group G2 are increased, or curvature of field cannot be corrected well, which is not desirable. To demonstrate the effect of the invention with certainty, it is preferable that the upper limit value of the conditional expression (8) is 2.0. To demonstrate the effect of the invention with even higher certainty, it is preferable that the upper limit value of the conditional expression (8) is 1.8. To demonstrate the effect of the invention to the maximum, it is preferable that the upper limit value of the conditional expression (8) is 1.75. On the other hand, if the lower limit value of the conditional expression (8) is not reached, the power of the third lens group G3 becomes too strong with respect to the moving distance, and the spherical aberration cannot be corrected well, which is not desirable. To demonstrate the effect of the invention with certainty, it is preferable that the lower limit value of the conditional expression (8) is 1.2. To demonstrate the effect of the invention with even higher certainty, it is preferable that the lower limit value of the conditional expression (8) is 1.3. To demonstrate the effect of the invention to the maximum, it is preferable that the lower limit value of the conditional expression (8) is 1.4.

In the variable power optical system ZL according to this embodiment, it is preferable that the first lens group G1 moves toward the image plane first, then moves toward the object upon zooming from the wide-angle end state to the telephoto end state. By this configuration, the diameter of the first lens group G1 is kept small while preventing abaxial light interrupt when the distance between the first lens group G1 and the second lens group G2 is increased, and a sudden change of distortion can be controlled.

The variable power optical system ZL according to this embodiment may be configured such that the rear group GR is constituted by, in order from the object: a third lens group G3 having positive refractive power and a fourth lens group G4 having positive refractive power; and the distance between the third lens group G3 and the fourth lens group G4 changes upon zooming, or may be configured such that the rear group GR is constituted by, in order from the object: a third lens group G3 having positive refractive power; a fourth lens group G4 having negative refractive power; and a fifth lens group G5 having positive refractive power, and the distance between the third lens group G3 and the fourth lens group G4 and the distance between the fourth lens group G4 and the fifth lens group G5 change respectively upon zooming. In the variable power optical system ZL according to this embodiment, it is preferable that the third lens group G3 includes, in order from the object: a first sub-group G31 constituted by an object side group G3a and an intermediate group G3b; and a second sub-group G32 used as the vibration-isolating lens group, which move together upon zooming, and the intermediate group G3b is constituted by four lenses (positive, negative, negative, positive). The second sub-group G32 used as the vibration-isolating lens group may be designed as the fourth lens group G4, instead of being included in the third lens group G3. The object side group G3a disposed to the object side of the intermediate group G3b of the first sub-group G31 constituting the rear group GR may be omitted. In the four lenses (positive, negative, negative, positive) included in the intermediate group G3b, the positive lens and the negative lens may be cemented, or each lens thereof may be disposed as a single lens.

In the variable power optical system ZL according to this embodiment, it is preferable that the third lens group G3 includes at least two lens components disposed to the image side of the intermediate group G3b. By disposing at least two lens components to the image side of the intermediate group G3b, the focusing lens group and the vibration-isolating lens group G32 can be disposed in the third lens group G3. It is preferable that the third lens group G3 is constituted by, in order from the object: a first sub-group G31 constituted by an object side group G3a and an intermediate group G3b; a second sub-group G32 used as the vibration-isolating lens group; and a focusing lens group. The second sub-group G32 used as the vibration-isolating lens group is preferably constituted by one positive lens, but may be constituted by one cemented lens, or constituted by a plurality of lens components.

In the variable power optical system ZL according to this embodiment, the object side group G3a is constituted by one aspherical lens, but may be constituted by two spherical lenses.

By the above configuration, a variable power optical system ZL having high brightness and excellent optical performance can be provided.

A camera, which is an optical apparatus including the variable power optical system ZL according to this embodiment, will be described with reference to FIG. 30. This camera 1 is an interchangeable lens type mirrorless camera that includes the variable power optical system ZL according to this embodiment as an image capturing lens 2. In this camera 1, the light from an object (not illustrated) is collected by the image capturing lens 2, and forms an object image on an image plane of the imaging unit 3 via an OLPF (Optical Low-Pass Filter), which is not illustrated. Then the object image is photo-electric converted by a photo-electric conversion element disposed in the imaging unit 3, whereby the image of the object is generated. This image is displayed on an EVF (Electronic View Finder) 4 disposed in the camera 1. Thereby the user can view the object via the EVF 4.

If a release button (not illustrated) is pressed by the user, the photo-electric-converted image is stored in a memory (not illustrated) by the imaging unit 3. Thus the user can capture the image of the object using this camera 1. In this embodiment, an example of the mirrorless camera was described, but an effect similar to the case of this camera 1 can be demonstrated even when the variable power optical system ZL according to this embodiment may be included in a single lens reflex type camera, which has a quick return mirror in the camera main unit and views the object using a finder optical system.

The following content can be adopted within a range where the optical performance is not diminished.

In this example, the variable power optical system ZL constituted by four or five lens groups was shown, but the present invention can also be applied to a configuration using a different number of lens groups, such as six lens groups or seven lens groups. A lens or a lens group may be added to the configuration on the side closest to the object, or a lens or a lens group may be added to the configuration on the side closest to the image. In concrete terms, a lens group, of which position with respect to the image plane is fixed upon zooming, may be added to the configuration on the side closest to the image. "Lens group" refers to a portion having at least one lens isolated by an air space which changes upon zooming. In the variable power optical system ZL of this embodiment, the first lens group G1 to the fourth lens group G4 move along the optical axis respectively, such that each air space between the lens groups changes upon zooming. "Lens component" refers to a single lens or a cemented lens where a plurality of lenses are cemented.

A single or plurality of lens group(s) or a partial lens group may be designed to be a focusing lens group, which performs focusing from an object at infinity to an object at a close distance by moving in the optical axis direction. This focusing lens group can be applied to auto focus, and is also suitable for driving a motor for auto focusing (driving using an ultrasonic motor or the like). It is particularly preferable that a part of the rear group (third lens group G3) (e.g. negative lens component disposed to the image side of the second sub-group G32, or the fourth lens group G4 disposed at the image side of the third lens group G3) is designed to be the focusing lens group, and the positions of other lenses with respect to the image plane are preferably fixed upon focusing. Considering the load applied to the motor, it is preferable that the focusing lens group is constituted by single lenses.

A lens group or a partial lens group may be designed to be a vibration-isolating lens group, which corrects image blurs generated by camera shake, by moving the lens group or the partial lens group so as to have a component in a direction orthogonal to the optical axis or rotating (oscillating) the lens group or the partial lens group in an in-plane direction that includes the optical axis. It is particularly preferable that at least a part of the rear group GR (e.g. second sub-group G32 of the third lens group G3) is designed to be the vibration-isolating lens group, as mentioned above.

The lens surface may be formed to be a spherical surface or a plane, or an aspherical surface. If the lens surface is a spherical surface or plane, lens processing, assembly and adjustment are easy, and deterioration of optical performance, due to an error generated in processing, assembly and adjustment can be prevented. Even if the image plane is shifted, the drawing performance is not affected very much, which is desirable. If the lens surface is aspherical, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index-distributed lens (GRIN lens) or a plastic lens.

It is preferable that the aperture stop S is disposed near the third lens group G3, but the role of the aperture stop may be substituted by the frame of the lens, without disposing a separate member as the aperture stop.

Each lens surface may be coated with an anti-reflection film, which has high transmittance in a wide wavelength region, in order to decrease flares and ghosts, and implement high optical performance with high contrast.

The zoom ratio of the variable power optical system ZL of this embodiment is about 2.5 to 4. The F number of the variable power optical system ZL of this embodiment is smaller than 3.5 in the wide-angle end state to the telephoto end state.

Figure 34:
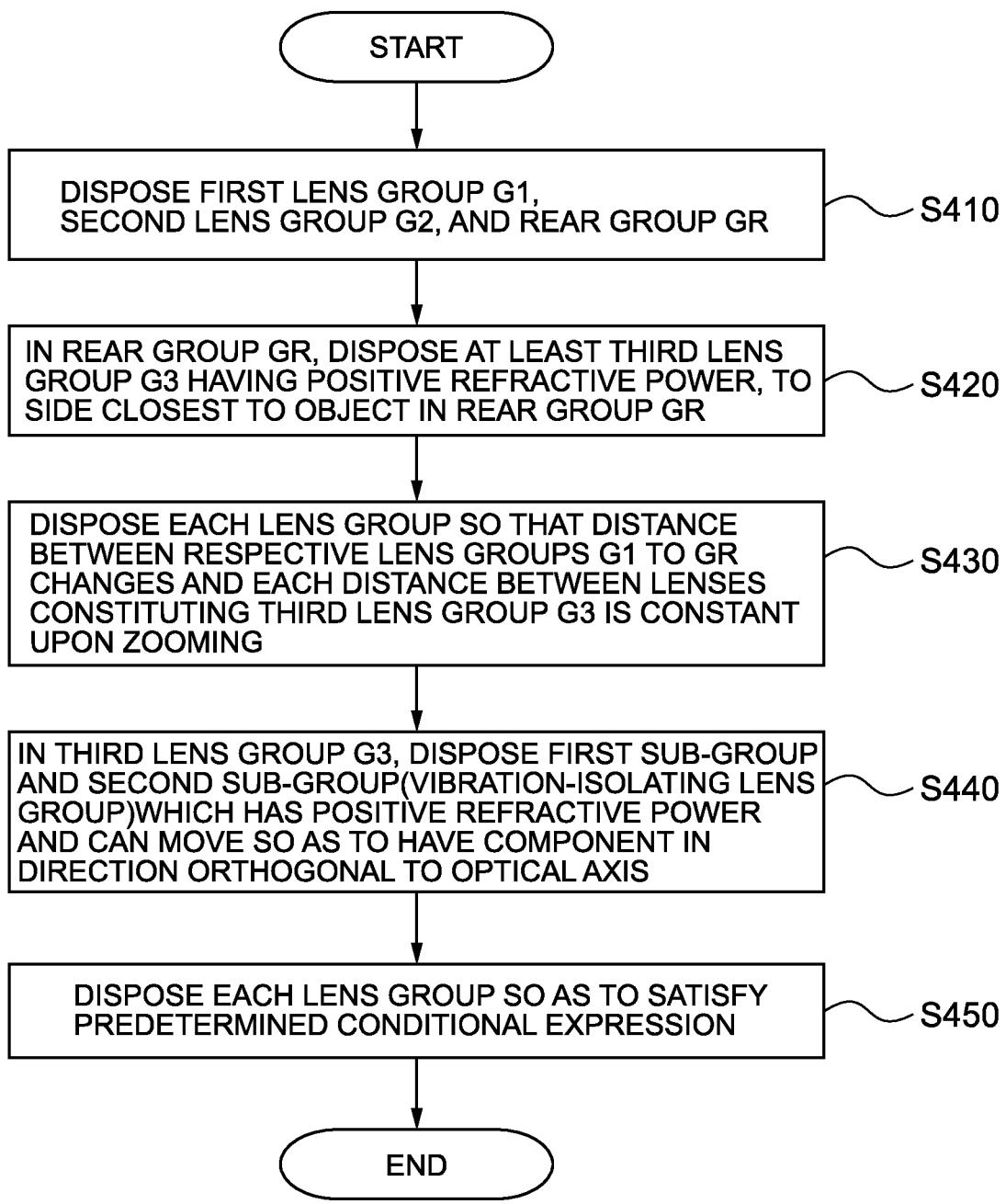
FIG. 34 is a flow chart depicting a manufacturing method for the variable power optical system according to Embodiment 4 represented by Example 1 to Example 6.

An outline of a manufacturing method for the variable power optical system ZL according to this embodiment will now be described with reference to FIG. 34. First each lens is disposed to prepare the first lens group G1, the second lens group G2 and the rear group GR respectively (step S410). In the rear group GR, at least the third lens group G3 having positive refractive power is disposed to the side closest to the object in the rear group GR (step S420). Each lens group is disposed so that the distance between the first lens group G1 and the second lens group G2 and the distance between the second lens group G2 and the rear group GR change respectively, and each distance of lenses constituting the third lens group G3 is constant upon zooming from the wide-angle end state to the telephoto end state (step S430). In the third lens group G3, the first sub-group G31 of which position with respect to the image plane is fixed upon correcting camera shake, and the second sub-group G32 used as the vibration-isolating lens which has positive refractive power and can move so as to have a component in a direction orthogonal to the optical axis upon correcting camera shake, are disposed (step S440). Each lens group is disposed so that the above mentioned conditional expression (6) is satisfied (step S450).

As shown in FIG. 1, according to a concrete example of this embodiment, the first lens group G1 is prepared by disposing a cemented lens, where a negative meniscus lens L11 having a convex surface facing the object and a positive meniscus lens L12 having a convex surface facing the object are cemented in order from the object. The second lens group G2 is prepared by disposing: a negative lens L21, of which aspherical shape is formed by creating a resin layer on the object side lens surface of a negative meniscus lens having a convex surface facing the object; a cemented lens where a biconcave lens L22 and a biconvex lens L23 are cemented; and a cemented lens, where a positive meniscus lens L24 having a concave surface facing the object, and a negative lens L25 which has a concave surface facing the object and of which image side lens surface is aspherical, are cemented. The third lens group G3 is prepared by disposing: a positive lens L31 of which object side and image side lens surfaces are aspherical; a cemented lens where a biconvex lens L32 and a biconcave lens L33 are cemented; a cemented lens where a biconcave lens L34 and a biconvex lens L35 are cemented; a positive lens L36 of which object side and image side lens surfaces are aspherical; and a negative meniscus lens L37 having a convex surface facing the object. The fourth lens group G4 is prepared by disposing a positive lens L41 of which object side lens surface is aspherical. The third lens group G3 and the fourth lens group G4 constitute the rear group GR. These lens groups are disposed according to the above mentioned procedure, whereby the variable power optical system ZL is manufactured.

EXAMPLES

Each example of the invention will now be described with reference to the drawings. Embodiment 1 corresponds to Example 1 to 5. Embodiment 2 corresponds to Examples 1 to 5. Embodiment 3 corresponds to Examples 1 to 6. Embodiment 4 corresponds to Examples 1 to 6. FIG. 1, FIG. 6, FIG. 11, FIG. 16, FIG. 21 and FIG. 26 are cross-sectional views depicting the configuration and refractive power allocation of the variable power optical system ZL (ZL1 to ZL6) according to each example. In the lower part of the cross-sectional views of the variable power optical systems ZL1 to ZL6, the moving direction of each lens group G1 to G4 (or G5) along the optical axis upon zooming from the wide-angle end state (W) to the telephoto end state (T) is indicated by an arrow mark.

In each example, an aspherical surface is expressed by the following expression (a), where y denotes a height in a direction orthogonal to the optical axis, S(y) denotes a distance (sag) along the optical axis from the tangential plane at the vertex of each aspherical surface to the position on the aspherical surface at height y, r denotes a radius of curvature (paraxial radius of curvature) of the reference spherical surface, K denotes a conical coefficient, and An denotes an aspherical coefficient at degree n. In the following example "E-n" indicates "×10$^{-n}$".

$$S(y)=(y^2/r)/\{1+(1-Ky^2/r^2)^{1/2}\}+A4\times y^4+A6\times y^6+A8\times y^8+A10\times y^{10}+A12\times y^{12} \quad (a)$$

In each example, the aspherical coefficient at degree 2 (A2) is 0. In the table of each example, * is attached to the right side of the surface number if the surface is aspherical.

Example 1

FIG. 1 shows a configuration of a variable power optical system ZL1 according to Example 1. The variable power optical system ZL1 shown in FIG. 1 includes, in order from an object: a first lens group G1 having positive refractive power; a second lens group G2 having negative refractive power; and a rear group GR, and the rear group GR is constituted by, in order from the object: a third lens group G3 having positive refractive power; and a fourth lens group G4 having positive refractive power.

In the variable power optical system ZL1, the first lens group G1 is constituted by a cemented lens where a negative meniscus lens L11 having a convex surface facing the object and a positive meniscus lens L12 having a convex surface facing the object are cemented in order from the object. The second lens group G2 is constituted by, in order from the object: a negative lens L21, of which aspherical shape is formed by creating a resin layer on the object side lens surface of a negative meniscus lens having a convex surface facing the object; a cemented lens where a biconcave lens L22 and a biconvex lens L23 are cemented; and a cemented lens where a positive meniscus lens L24 having a concave surface facing the object and a negative lens L25 which has a concave surface facing the object and of which image side lens surface is aspherical, are cemented. The third lens group G3 is constituted by, in order from the object: a positive lens L31 of which object side and image side lens surfaces are aspherical; a cemented lens where a biconvex lens L32 and a biconcave lens L33 are cemented; a cemented lens where a biconcave lens L34 and a biconvex lens L35 are cemented; a positive lens L36 of which object side and image side lens surfaces are aspherical; and a negative meniscus lens L37 having a convex surface facing the object. The fourth lens group G4 is constituted by a positive lens L41 of which object side lens surface is aspherical. An aperture stop S is disposed between the second lens group G2 and the third lens group G3. A filter group FL including a low-pass filter, an infrared filter or the like is disposed between the fourth lens group G4 and the image plane I. The negative lens L25, the positive lens L31, the positive lens L36 and the positive lens L41 are glass-molded aspherical lenses.

In this variable power optical system ZL1, upon zooming from the wide-angle end state to the telephoto end state, the first lens group G1 and the second lens group G2 move toward the image plane first and then move toward the object, the third lens group G3 moves toward the object, and the fourth lens group G4 moves toward the object first and then moves toward the image plane, so that the distance between the first lens group G1 and the second lens group G2 increases, the distance between the second lens group G2 and the third lens group G3 decreases, and the distance between the third lens group G3 and the fourth lens group G4 increases. The aperture stop S moves together with the third lens group G3.

In the variable power optical system ZL1, focusing from infinity to an object at a close distance is performed by moving an image side group G3c (negative meniscus lens L37), which is disposed to the image side of a vibration-isolating lens group G32 of the third lens group G3, toward the image plane.

In the variable power optical system ZL1, the positive lens L36 of the third lens group G3 is used as the vibration-isolating lens group G32, and image blur correction (vibration isolation) is performed by moving the vibration-isolating lens group G32 so as to have a component in a direction orthogonal to the optical axis. To correct a rotation blur at angle θ when the focal length of the variable power optical system is f and the vibration-isolation coefficient (ratio of the image moving distance on the image forming plane with respect to the moving distance of the vibration-isolating lens group G32 in the image blur correction) is K, the vibration-isolating lens group G32 for blur correction is moved in a direction orthogonal to the optical axis by (f·tan θ)/K. (This is the same for the other examples described later.) In the wide-angle end state of Example 1, the vibration-isolation coefficient is −0.62 and the focal length is 9.3 (mm), therefore the moving distance of the vibration-isolating lens group G32, to correct a 1.03° rotation blur is −0.170 (mm). In the intermediate focal length state of Example 1, the vibration-isolation coefficient is −0.831 and the focal length is 19.1 (mm), therefore the moving distance of the vibration-isolating lens group G32, to correct a 0.605° rotation blur, is −0.177 (mm). In the telephoto end state of Example 1, the vibration-isolation coefficient is −0.963 and the focal length is 29.1 (mm), therefore the moving distance of the vibration-isolating lens group G32, to correct a 0.500° rotation blur, is −0.264 (mm).

Table 1 shows the data values of the variable power optical system ZL1. In [General Data] in Table 1, f indicates a focal length of the variable power optical system, FNO indicates an F number, 2ω indicates an angle of view, Y indicates the maximum image height, TL indicates a total length, and BF indicates a value of back focus in the wide-angle end state, the intermediate focal length state, and the telephoto end state respectively. The total length TL here indicates a distance (air conversion length) on the optical axis from the lens surface closest to the object (Surface 1 in FIG. 1) to the image plane I upon focusing on infinity. BF indicates a distance (air conversion length) on the optical axis from the lens surface closest to the image plane (Surface 27 in FIG. 1) to the image plane I upon focusing on infinity. The first column m in [Lens Data] indicates the sequential number assigned to the lens surface (surface number) counted from the object side along the light traveling direction, the second column r indicates a radius of curvature of each lens surface, the third column d indicates a distance from each optical surface to the next optical surface on the optical axis (surface distance), the fourth column vd and the fifth column nd indicate an Abbe number and a refractive index at d-line (λ=587.6 nm). The radius of curvature 0.000 indicates a plane, and the refractive index of air 1.00000 is omitted. The surface numbers 1 to 33 in Table 1 correspond to the numbers 1 to 33 in FIG. 1. The [Lens Group Focal Length] indicates the first surface and focal length of the first to fourth lens groups G1 to G4 respectively.

For all the data values, "mm" is normally used as the unit of focal length f, radius of curvature r, surface distance d and other lengths, but the unit is not limited to "mm", since an equivalent optical performance is acquired even if the optical system is proportionally expanded or proportionally reduced. The description on the symbols and the description on the data table are the same for the other examples herein below.

TABLE 1

Example 1

[General Data]
Zoom ratio = 3.14

|   | Wide-angle end state |   | Intermediate focal length state |   | Telephoto end state |
|---|---|---|---|---|---|
| f = | 9.3 | ~ | 19.1 | ~ | 29.1 |
| FNO = | 1.8 | ~ | 2.5 | ~ | 2.9 |
| 2ω = | 85.1 | ~ | 44.7 | ~ | 29.8 |
| Y = = | 8.0 | ~ | 8.0 | ~ | 8.0 |
| TL (air = conversion length) | 95.9 | ~ | 101.1 | ~ | 114.1 |
| BF (air = conversion length) | 13.8 | ~ | 18.9 | ~ | 18.4 |

[Lens Data]

| m | r | d | vd | nd |
|---|---|---|---|---|
| Object plane | ∞ | | | |
| 1 | 52.520 | 1.60 | 17.98 | 1.94595 |
| 2 | 38.097 | 6.31 | 46.60 | 1.80400 |

TABLE 1-continued

Example 1

| | | | | | |
|---|---|---|---|---|---|
| 3 | 299.948 | D3 | | | |
| 4* | 4632.762 | 0.20 | 36.64 | 1.56093 | |
| 5 | 105.387 | 1.51 | 40.66 | 1.88300 | |
| 6 | 11.700 | 6.42 | | | |
| 7 | −78.778 | 4.04 | 54.61 | 1.72916 | |
| 8 | 44.775 | 3.44 | 23.78 | 1.84666 | |
| 9 | −31.132 | 1.04 | | | |
| 10 | −18.713 | 2.38 | 30.13 | 1.69895 | |
| 11 | −13.113 | 0.90 | 40.10 | 1.85135 | |
| 12* | −35.882 | D12 | | | |
| 13 | 0.000 | 0.80 | | | Aperture stop S |
| 14 | 21.574 | 3.26 | 71.67 | 1.55332 | |
| 15* | −59.840 | 0.30 | | | |
| 16 | 35.781 | 4.78 | 23.78 | 1.84666 | |
| 17 | −14.139 | 0.80 | 28.38 | 1.72825 | |
| 18 | 24.505 | 2.16 | | | |
| 19 | −28.756 | 1.50 | 22.74 | 1.80809 | |
| 20 | 24.289 | 4.30 | 82.57 | 1.49782 | |
| 21 | −14.921 | 0.50 | | | |
| 22* | 24.289 | 2.68 | 81.49 | 1.49710 | |
| 23* | −70.000 | D23 | | | |
| 24 | 34.328 | 0.80 | 82.57 | 1.49782 | |
| 25 | 16.185 | D25 | | | |
| 26* | 28.150 | 2.21 | 81.49 | 1.49710 | |
| 27 | 254.991 | D27 | | | |
| 28 | 0.000 | 0.50 | 63.88 | 1.51680 | |
| 29 | 0.000 | 1.11 | | | |
| 30 | 0.000 | 1.59 | 63.88 | 1.51680 | |
| 31 | 0.000 | 0.30 | | | |
| 32 | 0.000 | 0.70 | 63.88 | 1.51680 | |
| 33 | 0.000 | 0.70 | | | |

[Lens Group Focal Length]

| Lens group | First surface | Focal length |
|---|---|---|
| First lens group | 1 | 84.50 |
| Second lens group | 4 | −13.26 |
| Third lens group | 14 | 22.97 |
| Fourth lens group | 26 | 63.45 |

In this variable power optical system ZL1, surface 4, surface 12, surface 14, surface 15, surface 22, surface 23 and surface 26 are aspherical. Table 2 shows aspherical data, that is, the values of the conical coefficient K and each aspherical coefficient A4 to A10.

TABLE 2

[Aspherical Data]

| | K | A4 | A6 | A8 | A10 |
|---|---|---|---|---|---|
| Surface 4 | 0 | 4.41073E−05 | −1.57931E−07 | 4.69697E−10 | −7.44801E−13 |
| Surface 12 | 0 | −1.20350E−05 | −8.15569E−08 | 3.91594E−10 | −3.58987E−12 |
| Surface 14 | 0 | −3.13883E−06 | −1.57686E−08 | −1.08799E−09 | 0.00000E+00 |
| Surface 15 | 0 | 5.63460E−05 | 4.70520E−09 | 0.00000E+00 | 0.00000E+00 |
| Surface 22 | 0 | −1.41390E−05 | −4.37524E−07 | 0.00000E+00 | 0.00000E+00 |
| Surface 23 | 0 | −5.50201E−07 | −4.06545E−07 | −1.23018E−09 | 1.33941E−11 |
| Surface 26 | 0 | 4.04787E−06 | −4.49391E−08 | 2.97650E−10 | 0.00000E+00 |

In the variable power optical system ZL1, the axial air distance D3 between the first lens group G1 and the second lens group G2, the axial air distance D12 between the second lens group G2 and the third lens group G3 (aperture stop S), the axial air distance D25 between the third lens group G3 and the fourth lens group G4 and the axial air distance D27 between the fourth lens group G4 and the filter group FL change upon zooming, as mentioned above. The axial air distance D23 to the object side and the axial air distance D25 to the image side of the image side group G3c of the third lens group G3 change upon focusing. Table 3 shows the variable distance in each focal length state of the wide-angle end state, intermediate focal length state and telephoto end state upon focusing on infinity and upon focusing on a close point. Upon focusing on a close point, only the values of D23 and D25 are shown, and the omitted values are the same as the respective values obtained upon focusing on infinity.

TABLE 3

[Variable Distance Data]

| | Focusing on infinity | | | Focusing on close point | | |
|---|---|---|---|---|---|---|
| | Wide-angle end | Inter-mediate | Telephoto end | Wide-angle end | Inter-mediate | Telephoto end |
| f | 9.3 | 19.1 | 29.1 | 9.3 | 19.1 | 29.1 |
| D3 | 1.2 | 13.4 | 23.6 | | | |
| D12 | 21.4 | 5.4 | 1.5 | | | |
| D23 | 1.50 | 1.50 | 1.50 | 2.42 | 3.64 | 5.44 |
| D25 | 5.20 | 8.94 | 16.23 | 4.28 | 6.80 | 12.30 |
| D27 | 9.8 | 15.0 | 14.5 | | | |

Table 4 shows each conditional expression correspondence value of the variable power optical system ZL1. In Table 4, f2 denotes a focal length of the second lens group G2, fw denotes the focal length of the variable power optical system in the wide-angle end state, ft denotes a focal length of the variable power optical system in the telephoto end state, ndF denotes a refractive index of a medium of a negative lens included in the image side group G3c of the third lens group G3 at d-line, vdF denotes an Abbe number of the medium of the negative lens included in the image side group G3c of the third lens group G3, vdO denotes an Abbe number of a positive lens included in the object side group G3a of the rear group (third lens group G3), f4 denotes a focal length of the fourth lens group G4, fv denotes a focal length of the vibration-isolating lens group G32, FNOw denotes an F number in the wide-angle end state, f3 denotes the focal length of the third lens group G3, R2a and R1b denote a radius of curvature of the image side lens surface and that of the object side lens surface of the first negative lens and the second negative lens included in the intermediate group G3b of the third lens group G3 respectively, ΔT denotes a moving distance of the rear group (third lens group G3) upon zooming from the wide-angle end state to the telephoto end state, ndVR denotes a refractive index of a medium of the positive lens included in the vibration-isolating lens group G32 at d-line, vdVR denotes an Abbe number of the medium of the positive lens included in the vibration-isolating lens group G32, and fr denotes a focal length of the final lens group. This description on the reference symbols is the same for the other examples herein below. In Example 1, the negative lens included in the image side group G3c of the third lens group G3 is the negative meniscus lens L37, the positive lens included in the object side group G3a of the third lens group G3 is the positive lens L31, the positive lens included in the vibration-isolating lens group G32 is the positive lens L36, and the final lens group is the fourth lens group G4. R2a indicates a radial distance of Surface 18, and R1b indicates a radius of curvature of Surface 19.

TABLE 4

[Conditional Expression Correspondence Value]

(1) $(-f2)/(fw \times ft)^{1/2} = 0.807$
(2) $ndF - 0.0052 \times vdF - 1.965 = -0.038$
(3) $vdF = 82.6$
(4) $vdO = 71.7$
(5) $f4/fw = 6.85$
(6) $fv \times FNOw/f3 = 2.92$
(7) $(R2a + R1b)/(R2a - R1b) = -0.080$
(8) $f3/\Delta T3 = 1.46$
(9) $ndVR - 0.0052 \times vdVR - 1.965 = -0.044$
(10) $vdVR = 81.5$
(11) $fr/fw = 6.85$
(12) $f3/(fw \times ft)^{1/2} = 1.40$ Thus the variable power optical system ZL1 satisfies all the conditional expressions (1) to (12).

Figure 2B:
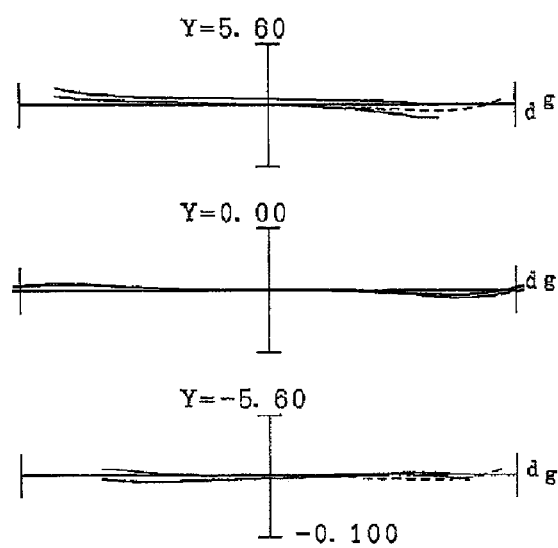
Figure 3A:
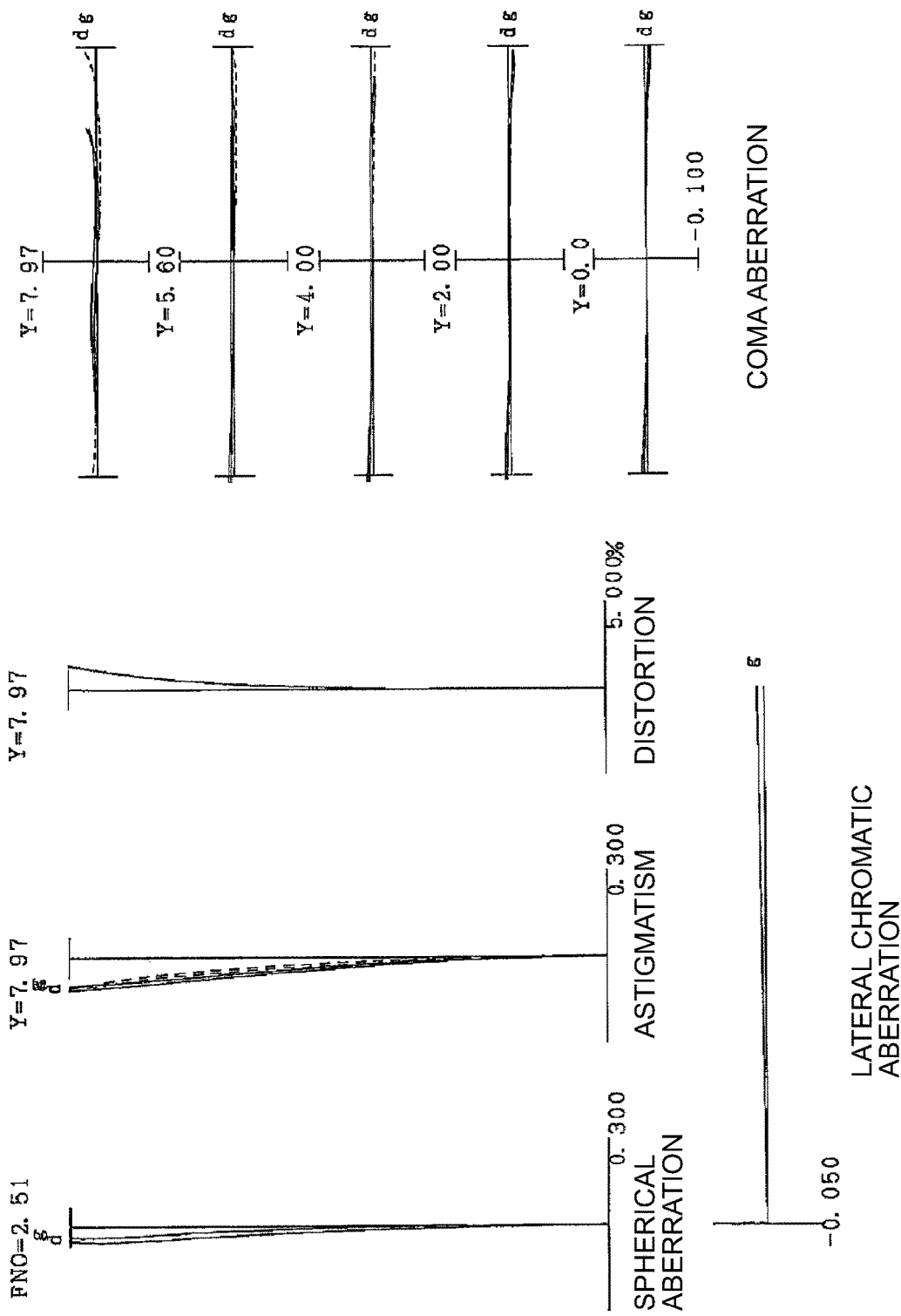
FIGS. 3A and 3B are graphs showing various aberrations of the variable power optical system according to Example 1 upon focusing on infinity, where FIG. 3A are graphs showing various aberrations in the intermediate focal length state, and FIG. 3B are graphs showing coma aberrations when image blur is corrected in the intermediate focal length state.
Figure 3B:
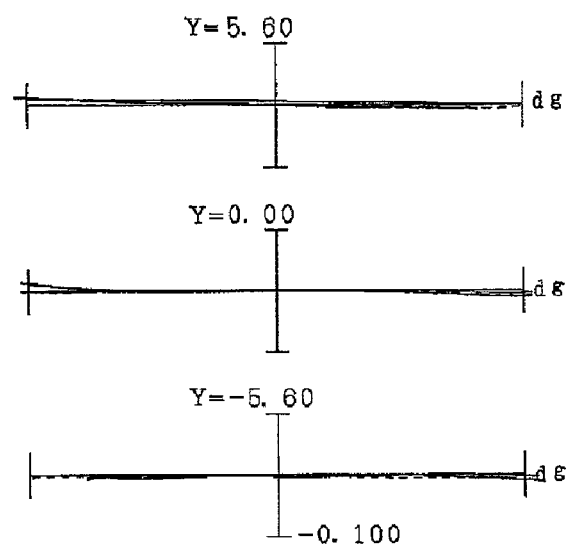
Figure 4A:
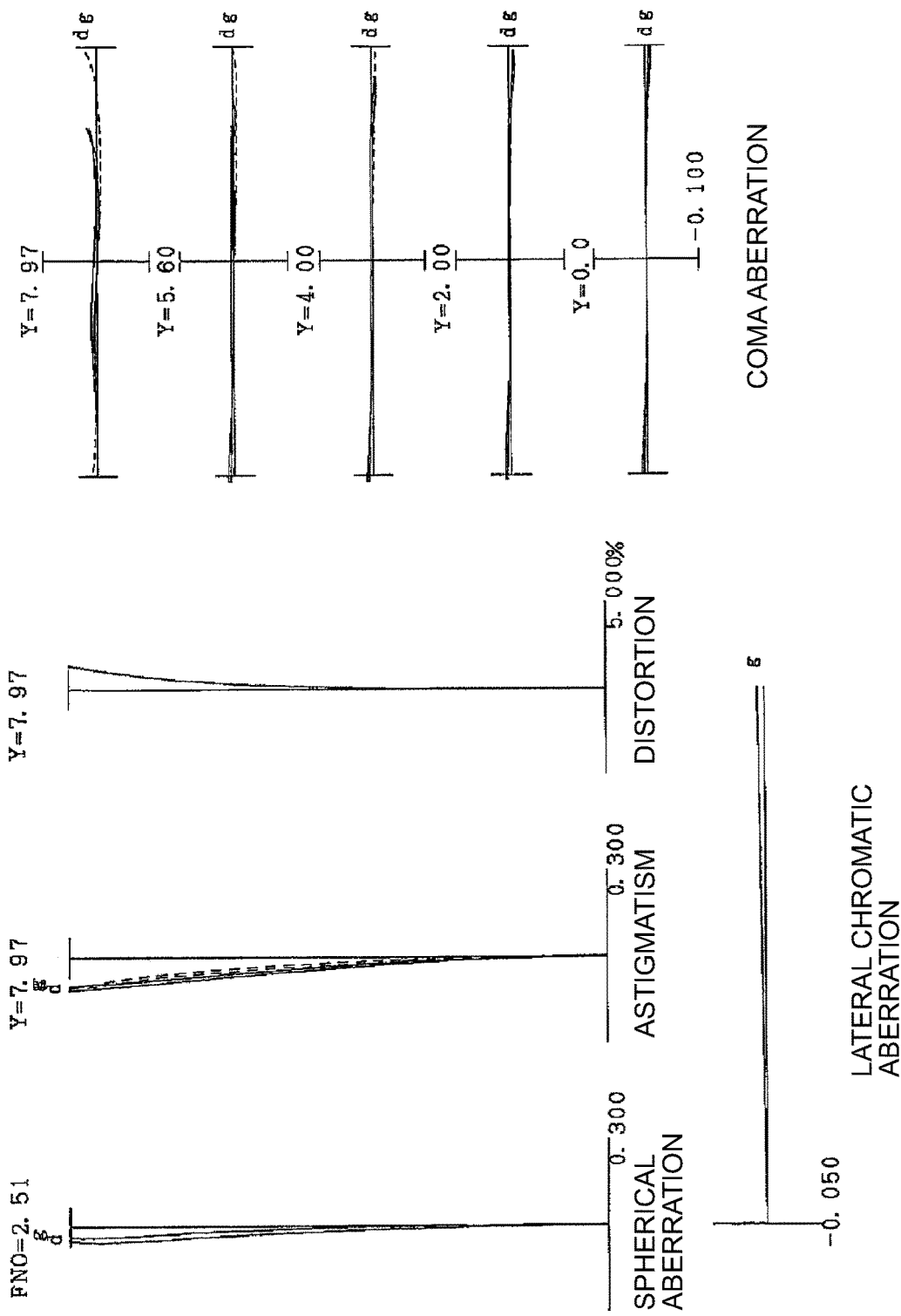
FIGS. 4A and 4B are graphs showing various aberrations of the variable power optical system according to Example 1 upon focusing on infinity, where FIG. 4A are graphs showing various aberrations in the telephoto end state, and FIG. 4B are graphs showing coma aberrations when image blur is corrected in the telephoto end state.
Figure 4B:
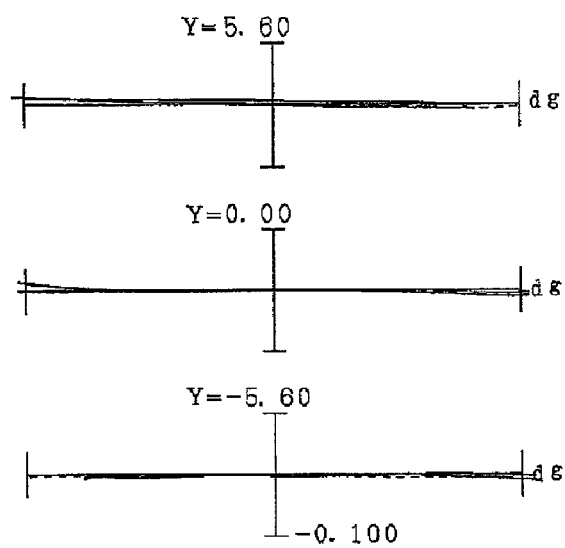
Figure 5B:
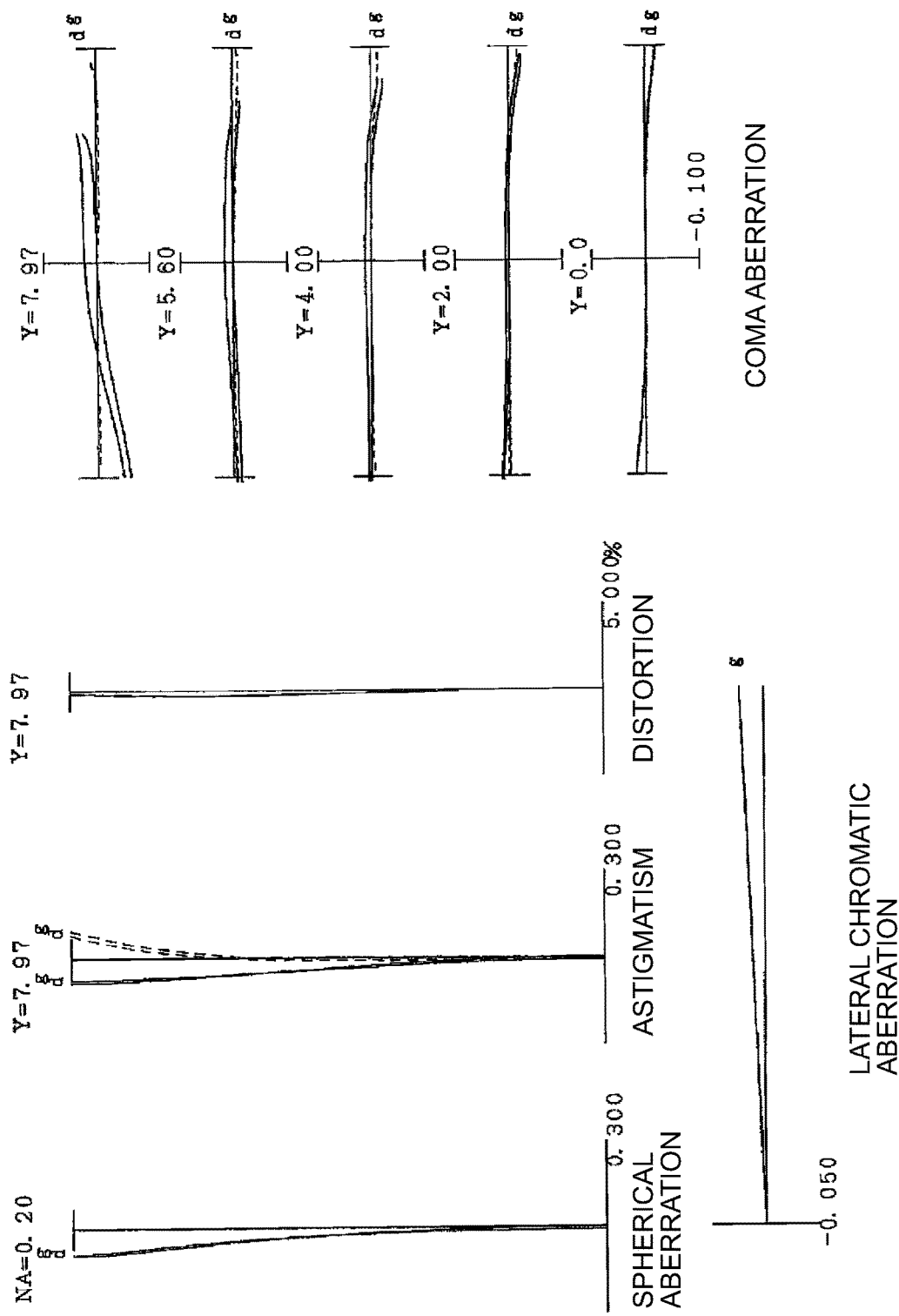
Figure 5C:
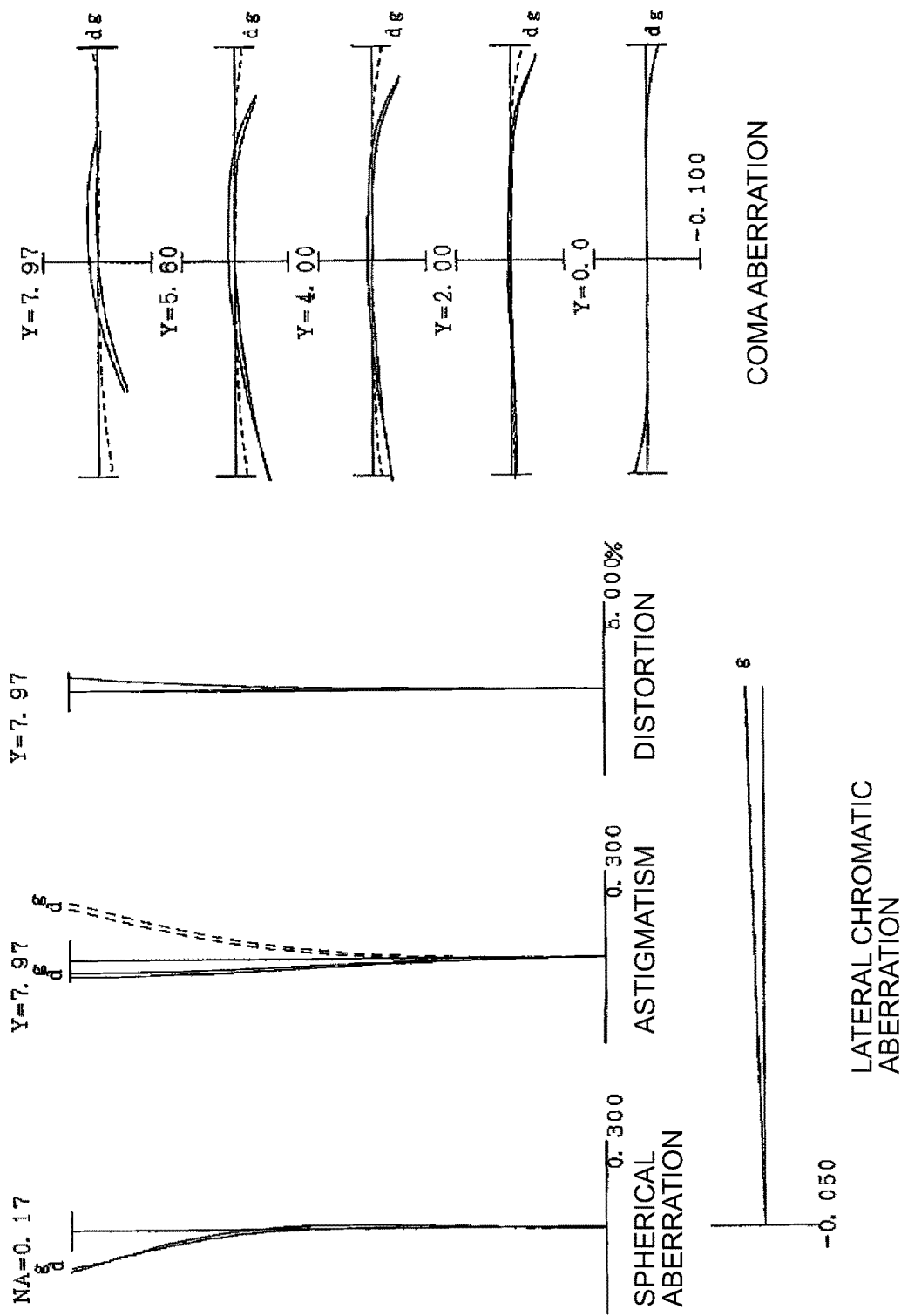

FIG. 2A, FIG. 3A and FIG. 4A are graphs showing spherical aberration, astigmatism, distortion, lateral chromatic aberration and coma aberration of the variable power optical system ZL1 upon focusing on infinity in the wide-angle end state, intermediate focal length state, and telephoto end state, and FIG. 2B, FIG. 3B and FIG. 4B are graphs showing coma aberration when image blur is corrected upon focusing on infinity in the wide-angle end state, intermediate focal length state and telephoto end state. FIG. 5 are graphs showing spherical aberration, astigmatism, distortion, lateral chromatic aberration and coma aberration upon focusing on a close point in the wide-angle end state, intermediate focal length state and telephoto end state. In each graph showing aberration, FNO indicates an F number, and Y indicates an image height. In the graphs showing spherical aberration upon focusing on infinity, a value of an F number corresponding to the maximum aperture is shown; in the graphs showing spherical aberration upon focusing on a close point, a value of numerical aperture corresponding to the maximum aperture is shown; and in the graphs showing astigmatism and distortion, a maximum value of image height is shown respectively. d indicates d-line (λ=587.6 nm), and g indicates g-line (λ=435.8 nm) respectively. In each graph showing astigmatism, the sold line indicates the sagittal image plane, and the broken line indicates the meridional image plane. The same reference symbols as this example are also used for the graphs showing aberrations of the other examples herein below. As each graph showing aberrations clarifies, various aberrations are corrected well in the variable power optical system ZL1 from the wide-angle end state to the telephoto end state.

Example 2

Figure 6:
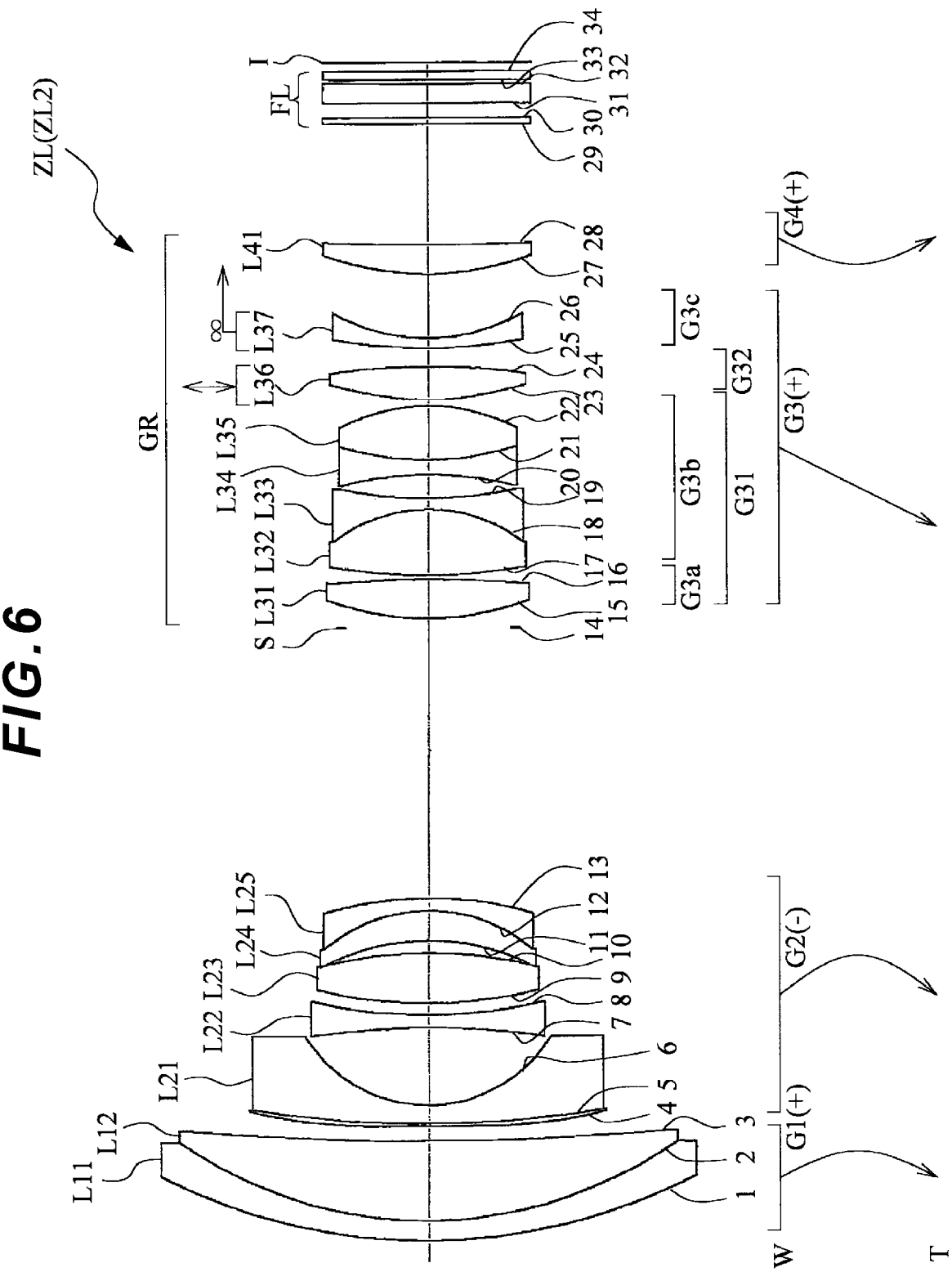
FIG. 6 is a cross-sectional view depicting a lens configuration of a variable power optical system according to Example 2.

FIG. 6 shows a configuration of a variable power optical system ZL2 according to Example 2. The variable power optical system ZL2 shown in FIG. 6 includes, in order from an object: a first lens group G1 having positive refractive power; a second lens group G2 having negative refractive power; and a rear group GR, and the rear group GR is constituted by, in order from the object: a third lens group G3 having positive refractive power; and a fourth lens group G4 having positive refractive power.

In the variable power optical system ZL2, the first lens group G1 is constituted by a cemented lens where a negative meniscus lens L11 having a convex surface facing the object and a positive meniscus lens L12 having a convex surface facing the object are cemented in order from the object. The second lens group G2 is constituted by, in order from the object: a negative lens L21, of which aspherical shape is formed by creating a resin layer on the object side lens surface of a negative meniscus lens having a convex surface facing the object; a biconcave lens L22; a biconvex lens L23; and a cemented lens where a positive meniscus lens L24 having a concave surface facing the object and a negative lens L25 which has a concave surface facing the object and of which image side lens surface is aspherical, are cemented. The third lens group G3 is constituted by, in order from the object: a positive lens L31 of which object side and image side lens surfaces are aspherical; a cemented lens where a biconvex lens L32 and a biconcave lens L33 are cemented; a cemented lens where a biconcave lens L34 and a biconvex lens L35 are cemented, a positive lens of which object side and image side lens surfaces are aspherical, and a negative meniscus lens L37 having a convex surface facing the object. The fourth lens group G4 is constituted by a positive lens L41 of which object side lens surface is aspherical. An aperture stop S is disposed between the second lens group G2 and the third lens group G3. A filter group FL including a low-pass filter, an infrared filter or the like is disposed between the fourth lens group G4 and the image plane I. The negative lens L25, the positive lens L31, the positive lens L36 and the positive lens L41 are glass-molded aspherical lenses.

In this variable power optical system ZL2, upon zooming from the wide-angle end state to the telephoto end state, the first lens group G1 and the second lens group G2 move toward the image plane first and then move toward the object, the third lens group G3 moves toward the object, and the fourth lens group G4 moves toward the object first and then moves toward the image plane, so that the distance between the first lens group G1 and the second lens group G2 increases, the distance between the second lens group G2 and the third lens group G3 decreases, and the distance between the third lens group G3 and the fourth lens group G4 increases. The aperture stop S moves together with the third lens group G3.

In the variable power optical system ZL2, focusing from infinity to an object at a close distance is performed by moving an image side group G3c (negative meniscus lens L37), which is disposed to the image side of a vibration-isolating lens group G32 of the third lens group G3, toward the image plane.

In the variable power optical system ZL2, the positive lens L36 of the third lens group G3 is used as the vibration-isolating lens group G32, and image blur correction (vibration isolation) is performed by moving the vibration-isolating lens group G32 so as to have a component in a direction orthogonal to the optical axis. In the wide-angle end state of Example 2, the vibration-isolation coefficient is −0.625 and the focal length is 9.3 (mm), therefore the moving distance of the vibration-isolating lens group G32, to correct a 1.03° rotation blur is −0.170 (mm). In the intermediate focal length state, the vibration-isolation coefficient is −0.814 and the focal length is 19.1 (mm), therefore the moving distance of the vibration-isolating lens group G32, to correct a 0.615° rotation blur, is −0.205 (mm). In the telephoto end state, the vibration-isolation coefficient is −0.939 and the focal length is 29.1 (mm), therefore the moving distance of the vibration-isolating lens group G32, to correct a 0.534° rotation blur, is −0.271 (mm).

Table 5 shows the data values of the variable power optical system ZL2. The surface numbers 1 to 34 in Table 5 corresponds to the numbers 1 to 34 in FIG. 6.

TABLE 5

Example 2

[General Data]
Zoom ratio = 3.13

|  | Wide-angle end state |  | Intermediate focal length state |  | Telephoto end state |
|---|---|---|---|---|---|
| f = | 9.3 | ~ | 19.1 | ~ | 29.1 |
| FNO = | 1.8 | ~ | 2.5 | ~ | 2.9 |
| 2ω = | 85.2 | ~ | 44.9 | ~ | 30.1 |
| Y = | 8.0 | ~ | 8.0 | ~ | 8.0 |
| TL (air = conversion length) | 95.4 | ~ | 100.7 | ~ | 112.1 |
| BF (air = conversion length) | 13.8 | ~ | 18.7 | ~ | 19.8 |

[Lens Data]

| m | r | d | νd | nd |  |
|---|---|---|---|---|---|
| Object plane | ∞ |  |  |  |  |
| 1 | 49.101 | 1.60 | 17.98 | 1.94595 |  |
| 2 | 35.955 | 6.34 | 46.60 | 1.80400 |  |
| 3 | 238.109 | D3 |  |  |  |
| 4* | 32230.587 | 0.20 | 36.64 | 1.56093 |  |
| 5 | 92.951 | 1.51 | 40.66 | 1.88300 |  |
| 6 | 11.709 | 6.33 |  |  |  |
| 7 | −61.701 | 1.00 | 54.61 | 1.72916 |  |
| 8 | 40.995 | 0.94 |  |  |  |
| 9 | 38.612 | 4.05 | 23.78 | 1.84666 |  |
| 10 | −35.701 | 1.00 |  |  |  |
| 11 | −18.790 | 2.40 | 31.16 | 1.68893 |  |
| 12 | −13.145 | 1.00 | 40.10 | 1.85135 |  |
| 13* | −31.982 | D13 |  |  |  |
| 14 | 0.000 | 0.80 |  |  | Aperture stop S |
| 15* | 22.706 | 3.20 | 71.68 | 1.55332 |  |
| 16* | −58.429 | 0.30 |  |  |  |
| 17 | 46.573 | 5.34 | 23.78 | 1.84666 |  |
| 18 | −12.743 | 0.90 | 28.38 | 1.72825 |  |
| 19 | 35.112 | 1.91 |  |  |  |
| 20 | −28.666 | 1.21 | 22.74 | 1.80809 |  |
| 21 | 24.685 | 4.43 | 82.57 | 1.49782 |  |
| 22 | −15.272 | 0.50 |  |  |  |
| 23* | 24.333 | 2.63 | 81.56 | 1.49710 |  |
| 24* | −70.000 | D24 |  |  |  |
| 25 | 43.446 | 0.80 | 63.88 | 1.51680 |  |
| 26 | 15.925 | D26 |  |  |  |
| 27* | 24.203 | 2.37 | 81.56 | 1.49710 |  |
| 28 | 220.780 | D28 |  |  |  |
| 29 | 0.000 | 0.50 | 63.88 | 1.51680 |  |
| 30 | 0.000 | 1.11 |  |  |  |
| 31 | 0.000 | 1.59 | 63.88 | 1.51680 |  |
| 32 | 0.000 | 0.30 |  |  |  |
| 33 | 0.000 | 0.70 | 63.88 | 1.51680 |  |
| 34 | 0.000 | 0.70 |  |  |  |

[Lens Group Focal Length]

| Lens group | First surface | Focal length |
|---|---|---|
| First lens group | 1 | 81.70 |
| Second lens group | 4 | −13.37 |
| Third lens group | 15 | 23.47 |
| Fourth lens group | 27 | 54.46 |

In this variable power optical system ZL2, surface 4, Surface 13, Surface 15, Surface 16, Surface 23, Surface 24 and Surface 27 are aspherical. Table 6 shows aspherical data, that is, the values of the conical coefficient K and each aspherical coefficient A4 to A10.

TABLE 6

[Aspherical Data]

|  | K | A4 | A6 | A8 | A10 |
|---|---|---|---|---|---|
| Surface 4 | 0 | 4.81180E−05 | −1.64047E−07 | 4.26213E−10 | −5.47014E−13 |
| Surface 13 | 0 | −8.45829E−06 | 2.53106E−08 | −1.62200E−09 | 1.06953E−11 |
| Surface 15 | 0 | −8.35604E−06 | 3.00666E−08 | −1.56105E−09 | 0.00000E+00 |
| Surface 16 | 0 | 4.98849E−05 | 4.71546E−08 | 0.00000E+00 | 0.00000E+00 |
| Surface 23 | 0 | −1.46890E−05 | −3.34594E−07 | 0.00000E+00 | 0.00000E+00 |
| Surface 24 | 0 | 3.77210E−07 | −3.15609E−07 | −1.42238E−09 | 1.85664E−11 |
| Surface 27 | 0 | −9.43792E−07 | −4.37993E−08 | 2.66683E−10 | 0.00000E+00 |

In the variable power optical system ZL2, the axial air distance D3 between the first lens group G1 and the second lens group G2, the axial air distance D13 between the second lens group G2 and the third lens group G3 (aperture stop S), the axial air distance D26 between the third lens group G3 and the fourth lens group G4 and the axial air distance D28 between the fourth lens group G4 and the filter group FL change upon zooming, as mentioned above. The axial air distance D24 to the object side and the axial air distance D26 to the image side of the image side group G3c of the third lens group G3 Change upon focusing. Table 7 shows the variable distance in each focal length state of the wide-angle end state, intermediate focal length state and telephoto end state upon focusing on infinity and upon focusing on a close point. Upon focusing on a close point, only the values of D24 and D26 are shown, and the omitted values are the same as the respective values obtained upon focusing on infinity.

TABLE 7

[Variable Distance Data]

| | Focusing on infinity | | | Focusing on close point | | |
|---|---|---|---|---|---|---|
| | Wide-angle end | Intermediate | Telephoto end | Wide-angle end | Intermediate | Telephoto end |
| f | 9.3 | 19.1 | 29.1 | 9.3 | 19.1 | 29.1 |
| D3 | 1.2 | 13.9 | 23.2 | | | |
| D13 | 22.0 | 6.1 | 1.5 | | | |
| D24 | 1.50 | 1.50 | 1.50 | 2.21 | 3.19 | 4.68 |
| D26 | 5.20 | 8.78 | 14.40 | 4.48 | 7.10 | 11.22 |
| D28 | 9.8 | 14.8 | 15.9 | | | |

Table 8 shows the conditional expression correspondence value of the variable power optical system ZL2. In Example 2, the negative lens included in the image side group G3c of the third lens group G3 is the negative meniscus lens L37, the positive lens included in the object side group G3a of the third lens group G3 is the positive lens L31, the positive lens included in the vibration-isolating lens group G32 is the positive lens L36, and the final lens group is the fourth lens group G4. R2a indicates the radial distance of Surface 19, and R1b indicates a radial of curvature of Surface 20.

TABLE 8

[Conditional Expression Correspondence Value]

(1) $(-f2)/(fw \times ft)^{1/2} = 0.814$
(2) $ndF - 0.0052 \times vdF - 1.965 = -0.116$
(3) $vdF = 63.9$
(4) $vdO = 71.7$
(5) $f4/fw = 5.88$
(6) $fv \times FNOw/f3 = 2.86$
(7) $(R2a + R1b)/(R2a - R1b) = 0.101$
(8) $f3/\Delta T3 = 1.54$ TABLE 8-continued

[Conditional Expression Correspondence Value]

(9) $ndVR - 0.0052 \times vdVR - 1.965 = -0.044$
(10) $vdVR = 81.5$
(11) $fr/fw = 5.88$
(12) $f3/(fw \times ft)^{1/2} = 1.43$ Thus the variable power optical system ZL2 satisfies all the conditional expressions (1) to (12).

Figure 7B:
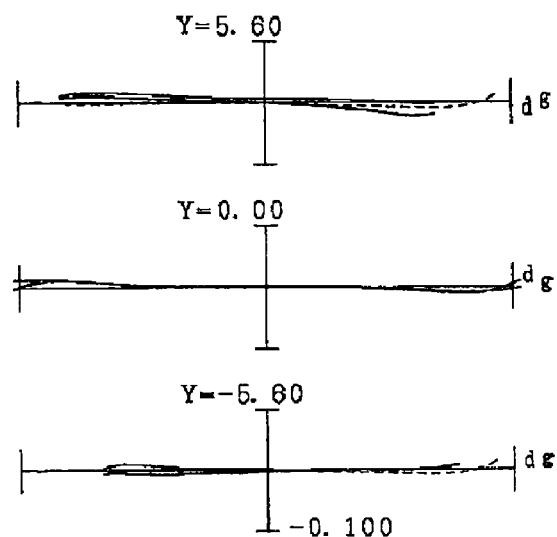
Figure 8A:
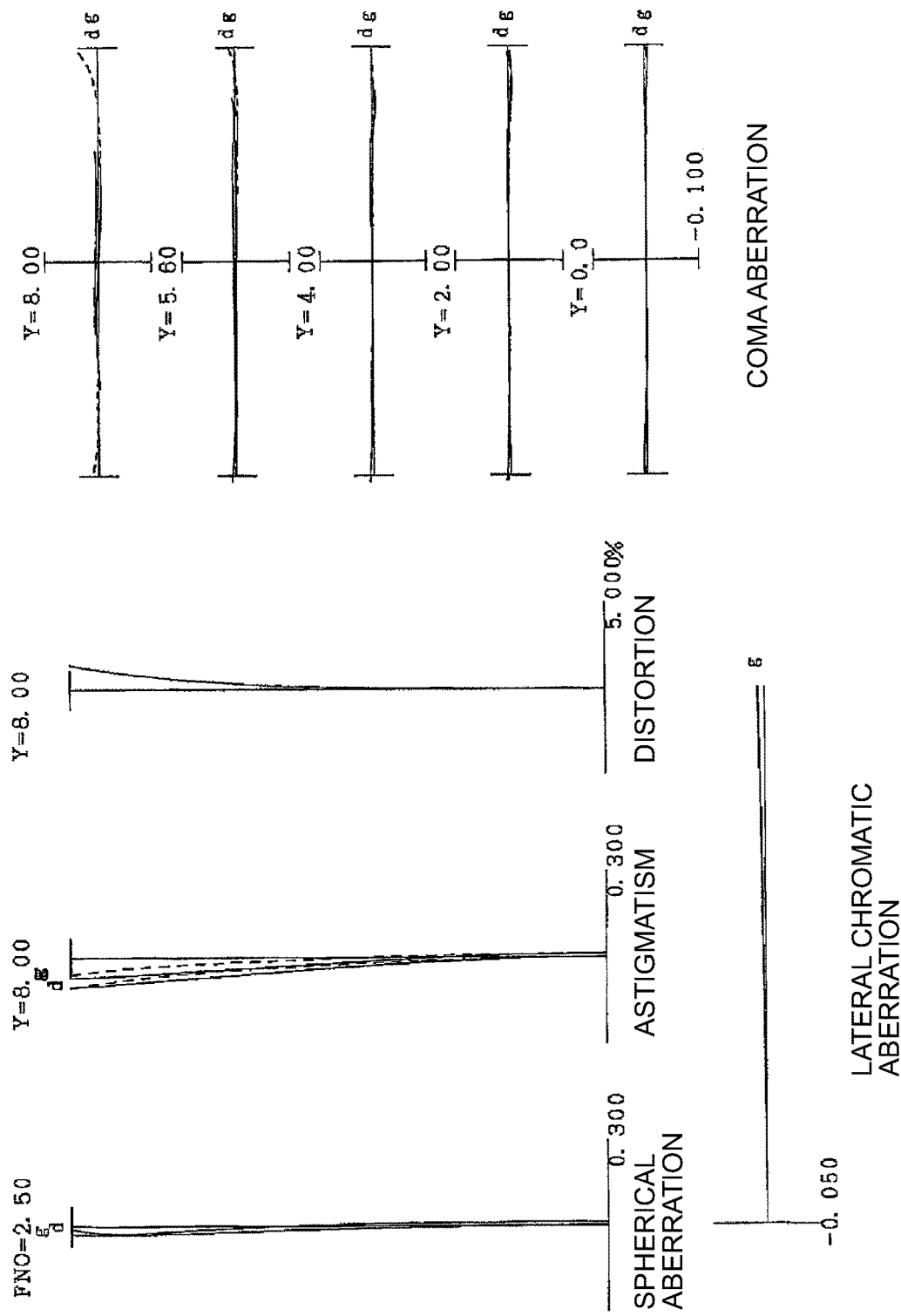
FIGS. 8A and 8B are graphs showing various aberrations of the variable power optical system according to Example 2 upon focusing on infinity, where FIG. 8A are graphs showing various aberrations in the intermediate focal length state, and FIG. 8B are graphs showing coma aberrations when image blur is corrected in the intermediate focal length state.
Figure 8B:
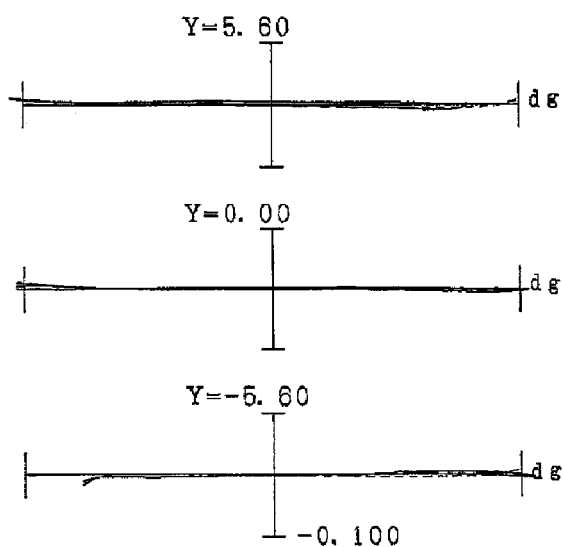
Figure 9A:
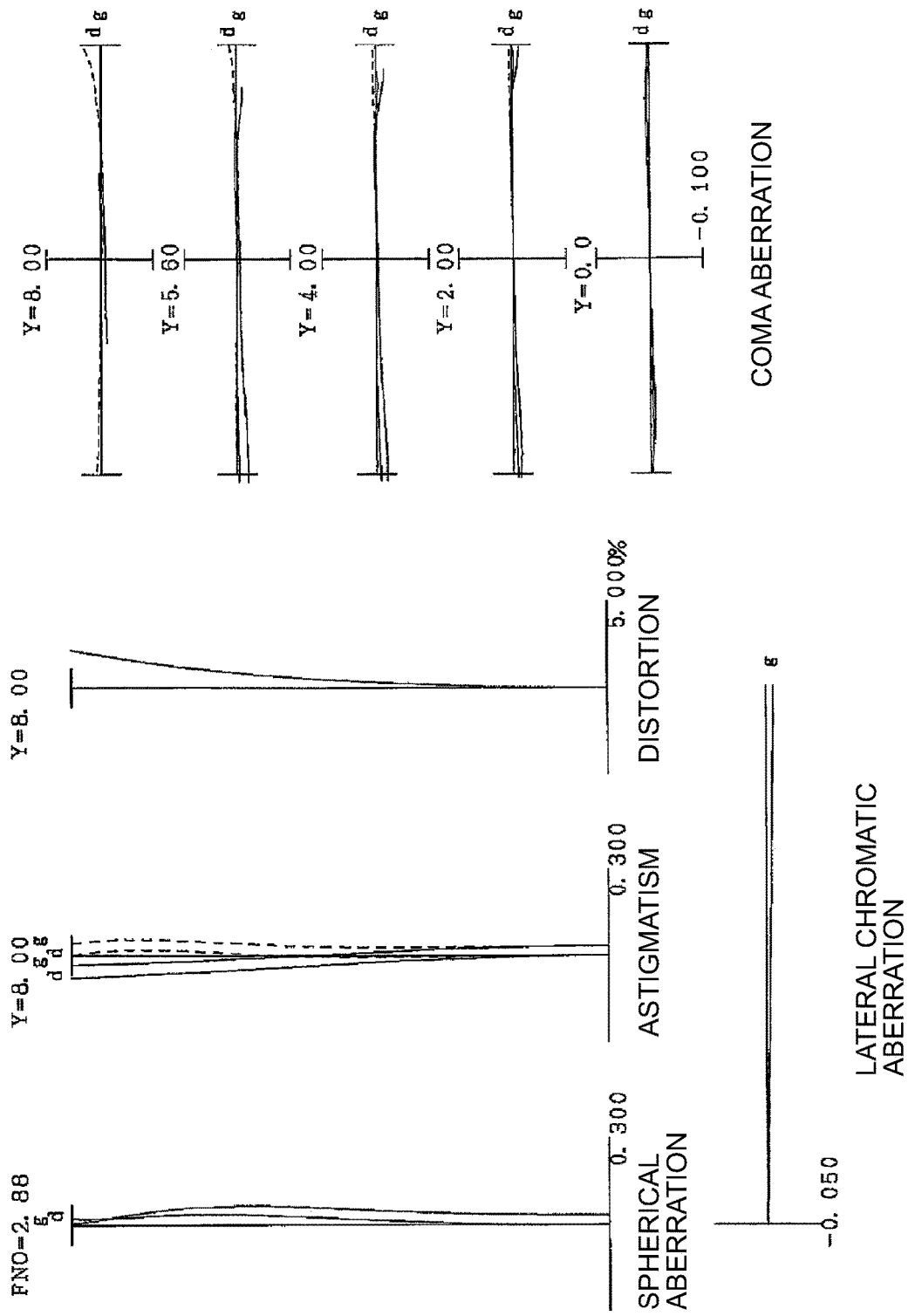
FIGS. 9A and 9B are graphs showing various aberrations of the variable power optical system according to Example 2 upon focusing on infinity, where FIG. 9A are graphs showing various aberrations in the telephoto end state, and FIG. 9B are graphs showing coma aberrations when image blur is corrected in the telephoto end state.
Figure 9B:
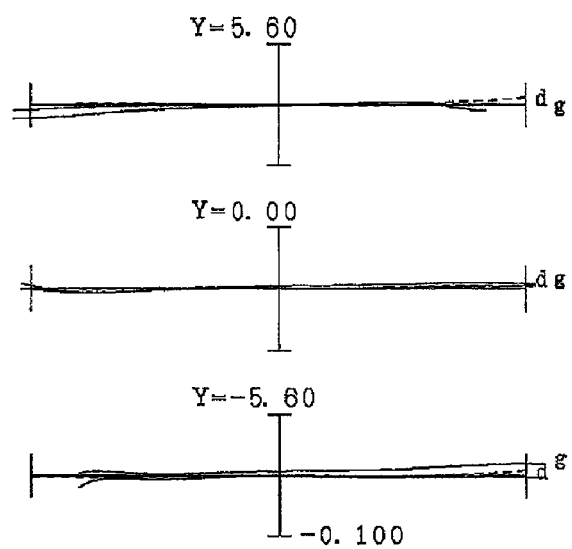
Figure 10A:
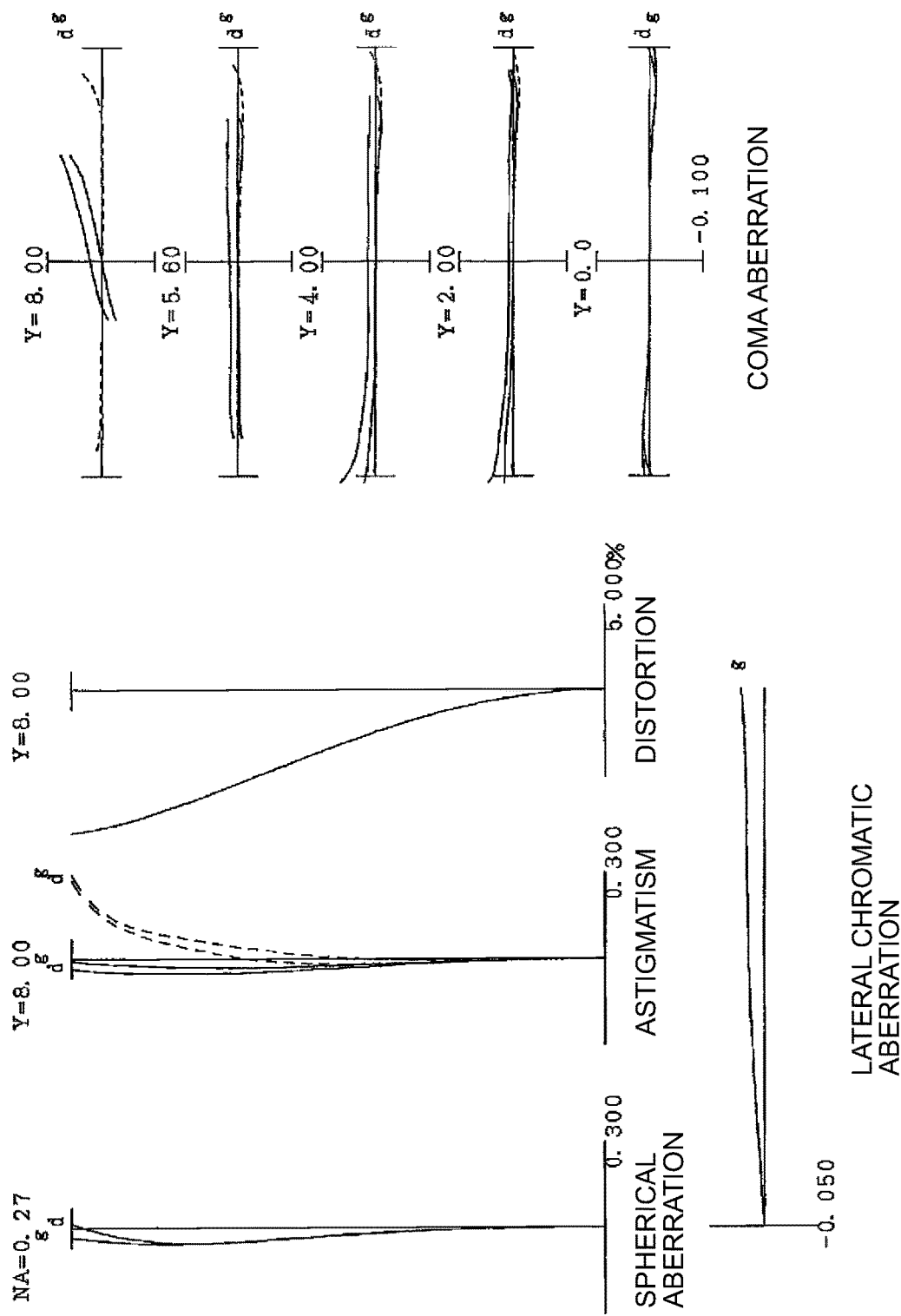
Figure 10B:
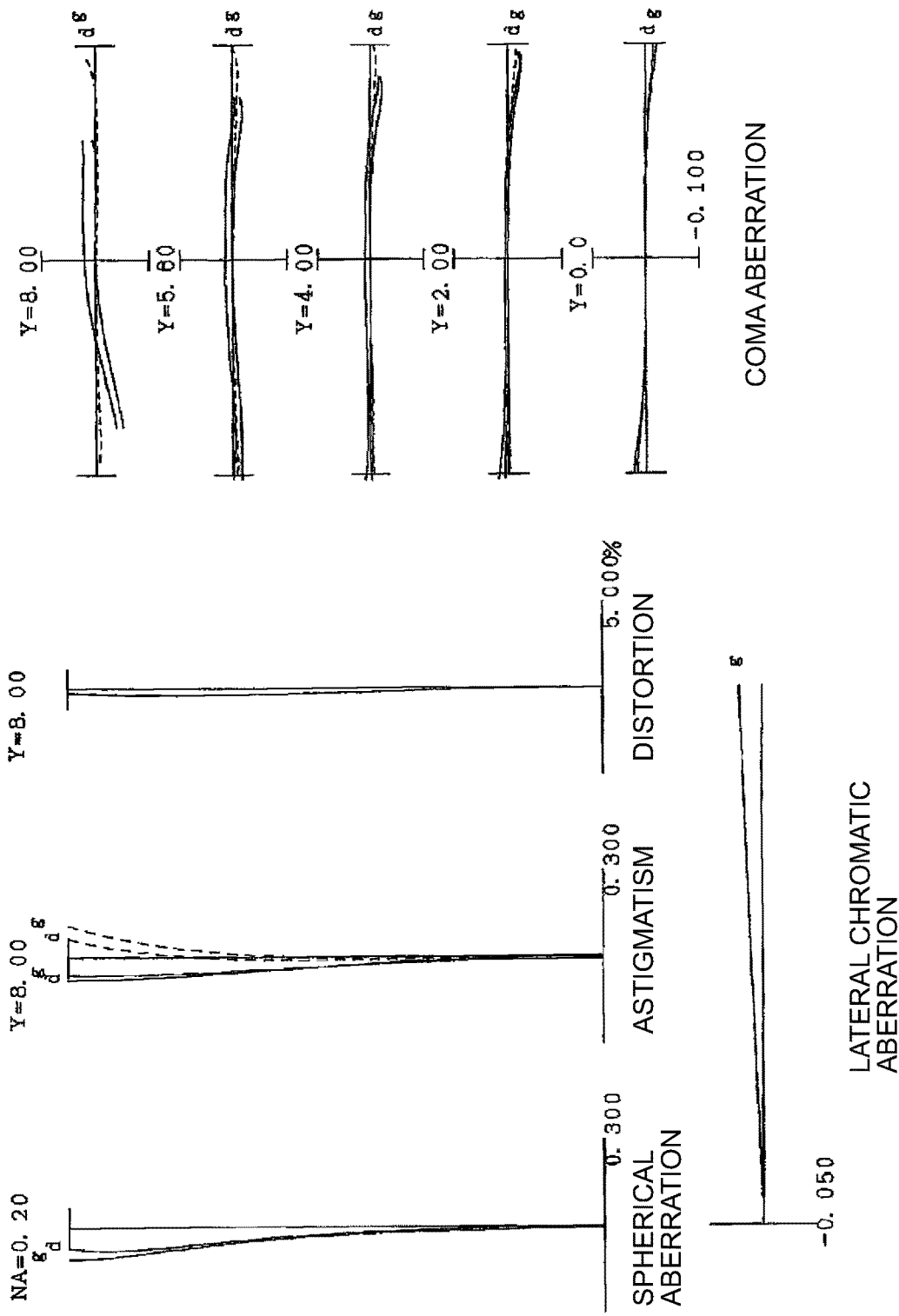

FIG. 7A, FIG. 8A and FIG. 9A are graphs showing spherical aberration, astigmatism, distortion, lateral chromatic aberration and coma aberration of the variable power optical system ZL2 upon focusing on infinity in the wide-angle end state, intermediate focal length state, and telephoto end state, and FIG. 7B, FIG. 8B and FIG. 9B are graphs showing coma aberration when image blur is corrected upon focusing on infinity in the wide-angle end state, intermediate focal length state and telephoto end state. FIG. 10 are graphs showing spherical aberration, astigmatism, distortion, lateral chromatic aberration and coma aberration upon focusing on a close point in the wide-angle end state, intermediate focal length state and telephoto end state. As each graph showing aberration clarifies, various aberrations are corrected well in the variable power optical system ZL2, from the wide-angle end state to the telephoto end state.

Example 3

Figure 11:
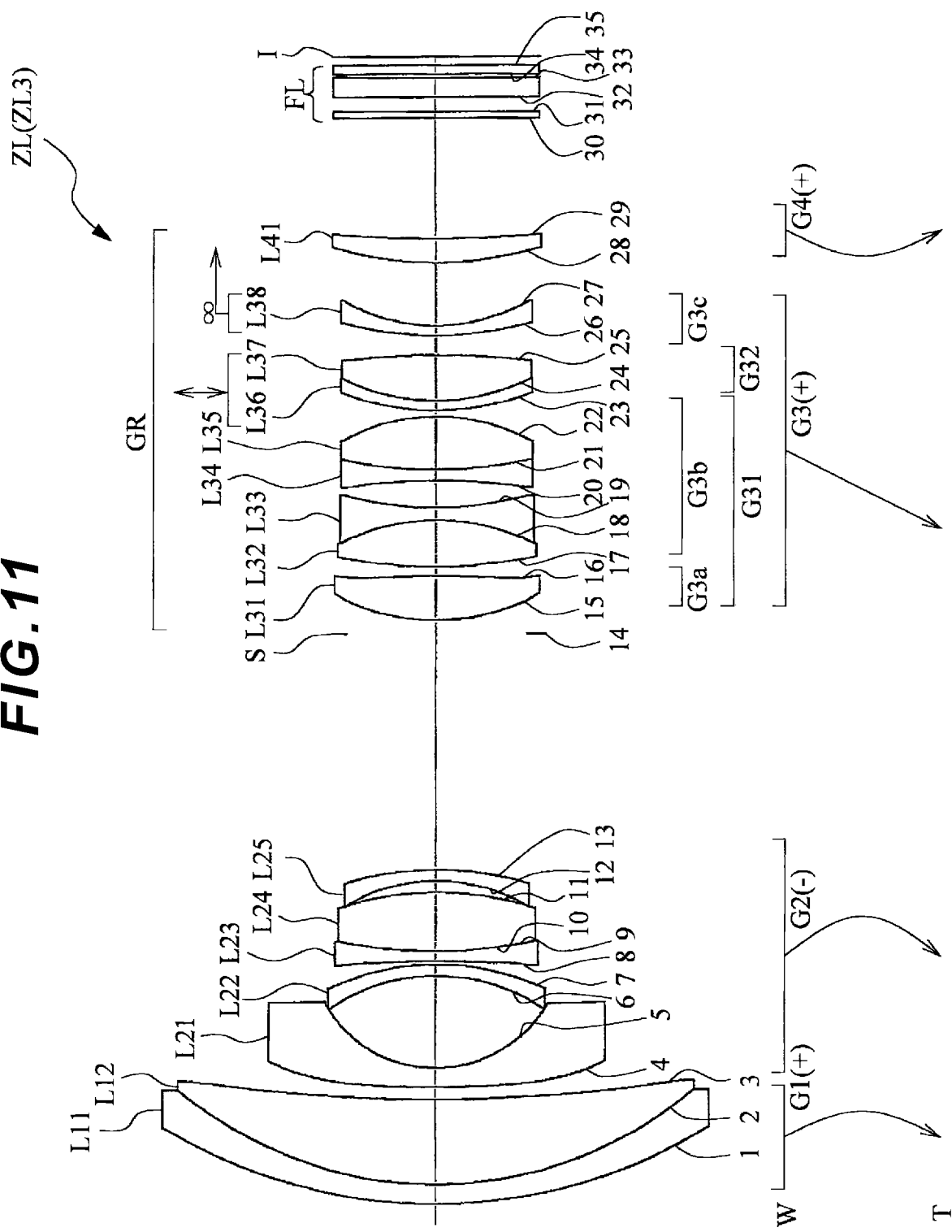
FIG. 11 is a cross-sectional view depicting a lens configuration of a variable power optical system according to Example 3.

FIG. 11 shows a configuration of a variable power optical system ZL3 according to Example 3. The variable power optical system ZL3 shown in FIG. 11 includes, in order from an object: a first lens group G1 having positive refractive power; a second lens group G2 having negative refractive power; and a rear group GR, and the rear group GR is constituted by, in order from the object: a third lens group G3 having positive refractive power; and a fourth lens group G4 having positive refractive power.

In the variable power optical system ZL3, the first lens group G1 is constituted by a cemented lens where a negative meniscus lens L11 having a convex surface facing the object and a positive meniscus lens L12 having a convex surface facing the object are cemented in order from the object. The second lens group G2 is constituted by, in order from the object: a negative lens L21 which has a convex surface facing the object and of which object image side lens surfaces are aspherical; a negative meniscus lens L22 having a concave surface facing the object; a cemented lens where a biconcave lens L23 and a biconvex lens L24 are cemented; and a negative lens L25 which has a concave surface facing the object and of which object side and image side lens surface is aspherical. The third lens group G3 is constituted by, in order from the object: a positive lens L31 of which object side and image side lens surfaces are aspherical; a cemented lens where a biconvex lens L32 and a biconcave lens L33 are cemented; a cemented lens where a biconcave lens L34 and a biconvex lens L35 are cemented; a cemented positive lens where a negative meniscus lens L36 having a convex surface facing the object and a positive lens L37 of which image side lens surface is aspherical are cemented; and a negative lens L38 which has a convex surface facing the object and of which image side lens surface is aspherical. The fourth lens group G4 is constituted by a positive meniscus lens L41 having a convex surface facing the object. An aperture stop S is disposed between the second lens group G2 and the third lens group G3. A filter group FL including a low-pass filter, an infrared filter or the like is disposed between the fourth lens group G4 and the image plane I. The negative lens L21, the negative lens L25, the positive lens L31, the negative lens L36 and the positive lens L37 are glass-molded aspherical lenses.

In this variable power optical system ZL3, upon zooming from the wide-angle end state to the telephoto end state, the first lens group G1 and the second lens group G2 move toward the image plane first and then move toward the object, the third lens group G3 moves toward the object, and the fourth lens group G4 moves toward the object first and then moves toward the image plane, so that the distance between the first lens group G1 and the second lens group G2 increases, the distance between the second lens group G2 and the third lens group G3 decreases, and the distance between the third lens group G3 and the fourth lens group G4 increases. The aperture stop S moves together with the third lens group G3.

In the variable power optical system ZL3, focusing from infinity to an object at a close distance is performed by moving an image side group G3c (negative meniscus lens L38), which is disposed to the image side of a vibration-isolating lens group G32 of the third lens group G3, toward the image plane.

In the variable power optical system ZL3, the cemented positive lens constituted by the negative lens L36 and the positive lens L37 of the third lens group G3 is used as the vibration-isolating lens group G32, and image blur correction (vibration isolation) is performed by moving this vibration-isolating lens group G32 so as to have a component in a direction orthogonal to the optical axis. In the wide-angle end state of Example 3, the vibration-isolation coefficient is −0.723, and the focal length is 9.3 (mm), therefore the moving distance of the vibration-isolating lens group G32, to correct a 0.911° rotation blur, is −0.147 (mm). In the intermediate focal length state, the vibration-isolation coefficient is −0.934 and the focal length is 19.1 (mm), therefore the moving distance of the vibration-isolating lens group G32, to correct a 0.534° rotation blur, is −0.177 (mm). In the telephoto end state, the vibration-isolation coefficient is −1.06 and the focal length is 29.1 (mm), therefore the moving distance of the vibration-isolating lens group G32, to correct a 0.474° rotation blur, is −0.236 (mm).

Table 9 shows the data values of the variable power optical system ZL3. The surface numbers 1 to 35 in Table 9 correspond to the numbers 1 to 35 in FIG. 11.

TABLE 9

Example 3

[General Data]
Zoom ratio = 3.12

| | Wide-angle end state | | Intermediate focal length state | | Telephoto end state |
|---|---|---|---|---|---|
| f = | 9.3 | ~ | 19.1 | ~ | 29.1 |
| FNO = | 1.8 | ~ | 2.3 | ~ | 2.6 |
| 2ω = | 84.3 | ~ | 45.3 | ~ | 30.7 |
| Y = | 8.0 | ~ | 8.0 | ~ | 8.0 |
| TL (air conversion length) | 93.4 | ~ | 99.2 | ~ | 110.9 |
| BF (air conversion length) | 13.7 | ~ | 21.1 | ~ | 21.5 |

[Lens Data]

| m | r | d | νd | nd | |
|---|---|---|---|---|---|
| Object plane | ∞ | | | | |
| 1 | 43.371 | 1.60 | 17.98 | 1.94595 | |
| 2 | 32.926 | 6.90 | 45.31 | 1.79500 | |
| 3 | 140.257 | D3 | | | |
| 4* | 175.520 | 1.50 | 42.65 | 1.82080 | |
| 5* | 10.809 | 7.48 | | | |
| 6 | −15.455 | 0.92 | 29.14 | 2.00100 | |
| 7 | −20.858 | 0.28 | | | |
| 8 | −101.287 | 0.80 | 46.60 | 1.80400 | |
| 9 | 38.949 | 0.00 | | | |
| 10 | 36.831 | 4.78 | 23.78 | 1.84666 | |
| 11 | −25.842 | 0.94 | | | |
| 12 | −14.557 | 0.92 | 45.46 | 1.80139 | |
| 13* | −25.880 | D13 | | | |
| 14 | 0.000 | 1.20 | | | Aperture stop S |
| 15* | 18.690 | 3.57 | 81.56 | 1.497103 | |
| 16* | −63.173 | 0.78 | | | |
| 17 | 42.863 | 3.79 | 22.74 | 1.80809 | |
| 18 | −17.820 | 1.00 | 28.69 | 1.79504 | |
| 19 | 28.455 | 2.21 | | | |
| 20 | −54.464 | 0.90 | 22.74 | 1.80809 | |
| 21 | 34.705 | 4.33 | 82.57 | 1.49782 | |
| 22 | −16.135 | 0.50 | | | |
| 23 | 21.394 | 0.80 | 29.14 | 2.00100 | |
| 24 | 17.003 | 3.74 | 71.67 | 1.55332 | |
| 25* | −60.926 | D25 | | | |
| 26 | 29.947 | 0.80 | 81.49 | 1.49710 | |
| 27* | 14.925 | D27 | | | |
| 28 | 29.674 | 1.90 | 82.57 | 1.49782 | |
| 29 | 96.000 | D29 | | | |
| 30 | 0.000 | 0.50 | 63.88 | 1.51680 | |
| 31 | 0.000 | 1.11 | | | |
| 32 | 0.000 | 1.59 | 63.88 | 1.51680 | |
| 33 | 0.000 | 0.30 | | | |
| 34 | 0.000 | 0.70 | 63.88 | 1.51680 | |
| 35 | 0.000 | 0.70 | | | |

[Lens Group Focal Length]

| Lens group | First surface | Focal length |
|---|---|---|
| First lens group | 1 | 82.51 |
| Second lens group | 4 | −11.97 |
| Third lens group | 15 | 21.69 |
| Fourth lens group | 28 | 85.46 |

In this variable power optical system ZL3, Surface 4, Surface 5, Surface 13, Surface 15, Surface 16, Surface 25 and Surface 27 are aspherical. Table 10 shows aspherical data, that is, the values of the conical coefficient K and each aspherical coefficient A4 to A12.

TABLE 10

[Aspherical Data]

| | K | A4 | A6 | A8 | A10 | A12 |
|---|---|---|---|---|---|---|
| Surface 4 | 0 | 6.79E−05 | −4.38E−07 | 3.57E−09 | −1.72E−11 | 3.66E−14 |
| Surface 5 | 0 | 3.02E−05 | −1.77E−07 | 2.51E−09 | 2.36E−11 | 0.00E+00 |
| Surface 13 | 0 | −1.03E−05 | −1.42E−07 | 2.00E−09 | −1.18E−11 | 0.00E+00 |
| Surface 15 | 0 | 1.60E−05 | 1.53E−08 | 4.77E−09 | 0.00E+00 | 0.00E+00 |
| Surface 16 | 0 | 9.01E−05 | 4.44E−09 | 5.55E−09 | 0.00E+00 | 0.00E+00 |
| Surface 25 | 0 | 2.01E−05 | −2.52E−07 | 4.90E−09 | −3.50E−11 | 0.00E+00 |
| Surface 27 | 0 | −1.52E−05 | 2.25E−07 | −5.15E−09 | 4.70E−11 | 0.00E+00 |

In the variable power optical system ZL3, the axial air distance D3 between the first lens group G1 and the second lens group G2, the axial air distance D13 between the second lens group G2 and the third lens group G3 (aperture stop S), the axial air distance D27 between the third lens group G3 and the fourth lens group G4, and the axial air distance D29 between the fourth lens group G4 and the filter group FL change upon zooming, as mentioned above. The axial air distance D25 to the object side and the axial air distance D27 to the image side of the image side group G3c of the third lens group G3 Change upon focusing. Table 11 shows the variable distance in each focal length state of the wide-angle end state, intermediate focal length state and telephoto end state upon focusing on infinity and upon focusing on a close point. Upon focusing on a close point, only the values of D25 and D27 are shown, and omitted values are the same as the respective values obtained upon focusing on infinity.

TABLE 11

[Variable Distance Data]

| | Focusing on infinity | | | Focusing on close point | | |
|---|---|---|---|---|---|---|
| | Wide-angle end | Inter-mediate | Telephoto end | Wide-angle end | Inter-mediate | Telephoto end |
| f | 9.3 | 19.0 | 29.1 | 9.3 | 19.0 | 29.1 |
| D3 | 1.0 | 13.9 | 23.9 | | | |
| D13 | 19.2 | 4.9 | 1.2 | | | |
| D25 | 1.60 | 1.60 | 1.60 | 2.52 | 4.05 | 5.19 |
| D27 | 5.20 | 5.20 | 10.08 | 4.38 | 2.75 | 6.49 |
| D29 | 9.8 | 17.2 | 17.5 | | | |

Table 12 shows each conditional expression correspondence value of the variable power optical system ZL3. In Example 3, the negative lens included in the image side group G3c of the third lens group G3 is the negative lens L38, the positive lens included in the object side group G3a of the third lens group G3 is the positive lens L31, the positive lens included in the vibration-isolating lens group G32 is the positive lens L37, and the final lens group is the fourth lens group G4. R2a indicates a radial distance of the Surface 19, and R1b indicates a radius of curvature of Surface 20.

TABLE 12

[Conditional Expression Correspondence Value]

(1) $(-f2)/(fw \times ft)^{1/2} = 0.736$
(2) $ndF - 0.0052 \times vdF - 1.965 = -0.044$
(3) $vdF = 81.5$
(4) $vdO = 81.6$
(5) $f4/fw = 9.22$
(6) $fv \times FNOw/f3 = 2.87$
(7) $(R2a + R1b)/(R2a - R1b) = -0.314$ TABLE 12-continued

[Conditional Expression Correspondence Value]

(8) $f3/\Delta T3 = 1.72$
(9) $ndVR - 0.0052 \times vdVR - 1.965 = -0.044$
(10) $vdVR = 71.7$
(11) $fr/fw = 9.22$
(12) $f3/(fw \times ft)^{1/2} = 1.33$ Thus the variable power optical system ZL3 satisfies all the conditional expressions (1) to (12).

Figure 12A:
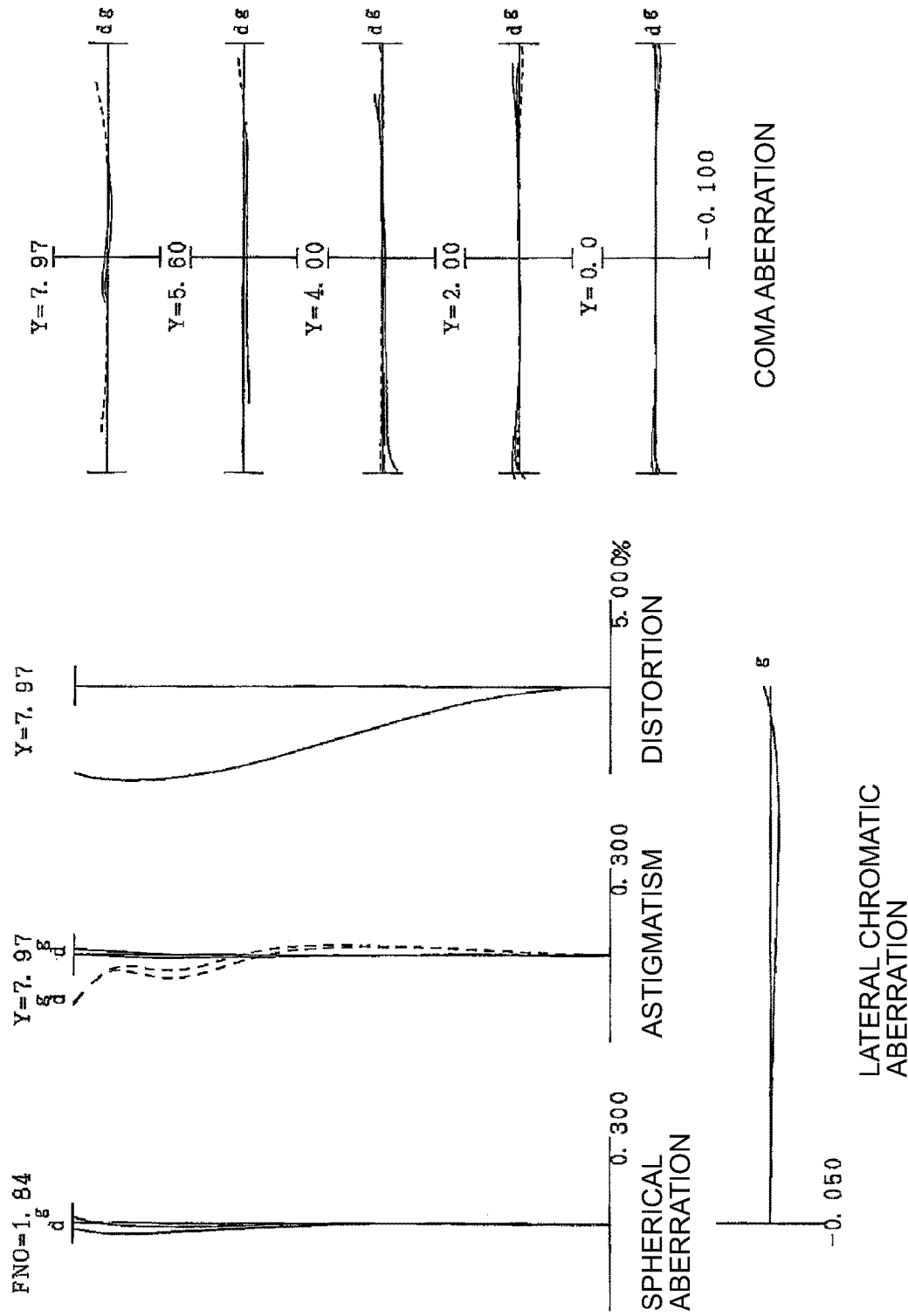
FIGS. 12A and 12B are graphs showing various aberrations of the variable power optical system according to Example 3 upon focusing on infinity, where FIG. 12A are graphs showing various aberrations in the wide-angle end state, and FIG. 12B are graphs showing coma aberrations when image blur is corrected in the wide-angle end state.
Figure 12B:
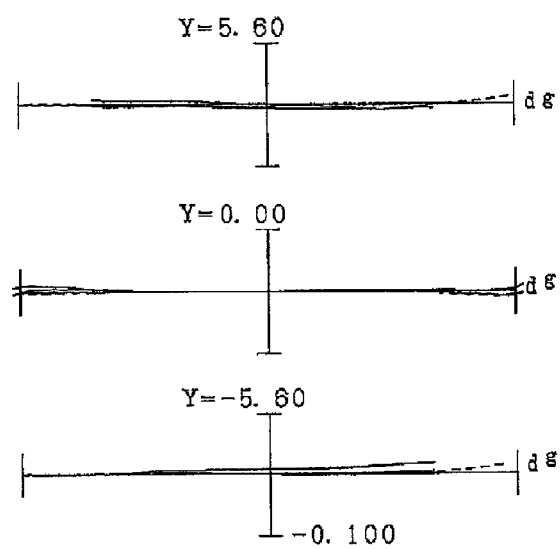
Figure 13A:
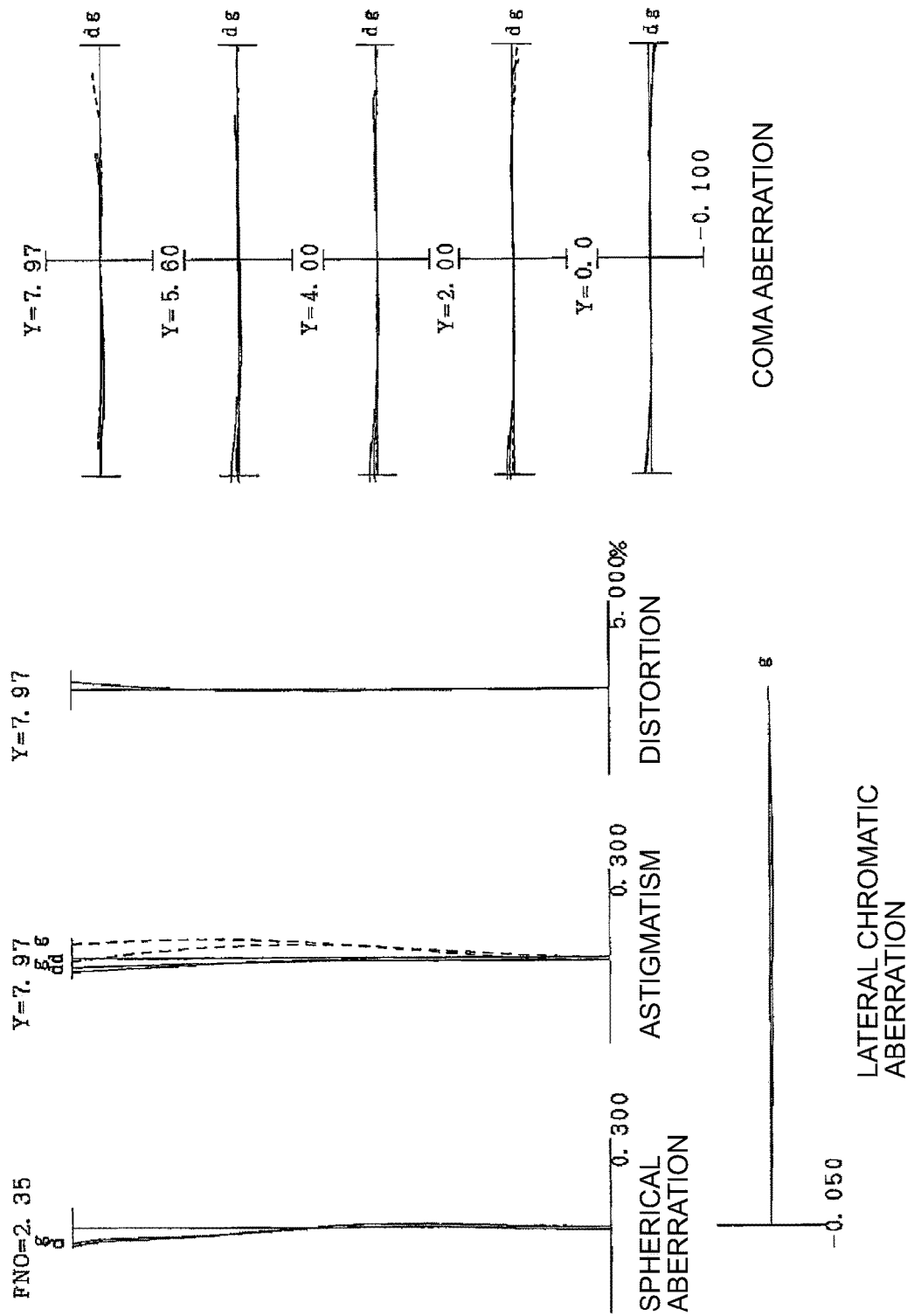
FIGS. 13A and 13B are graphs showing various aberrations of the variable power optical system according to Example 3 upon focusing on infinity, where FIG. 13A are graphs showing various aberrations in the intermediate focal length state, and FIG. 13B are graphs showing coma aberrations when image blur is corrected in the intermediate focal length state.
Figure 13B:
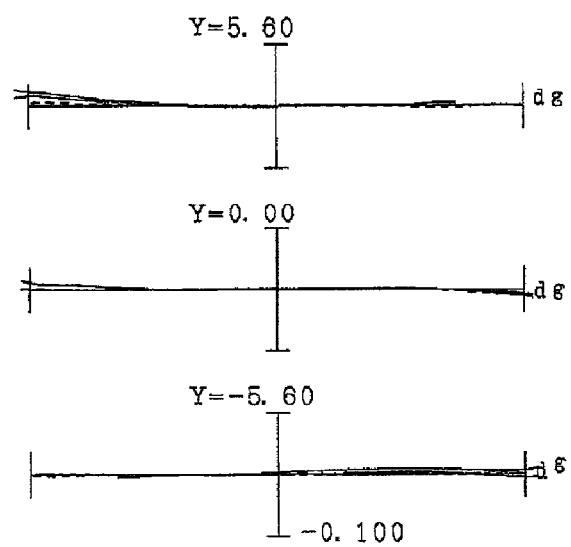
Figure 14B:
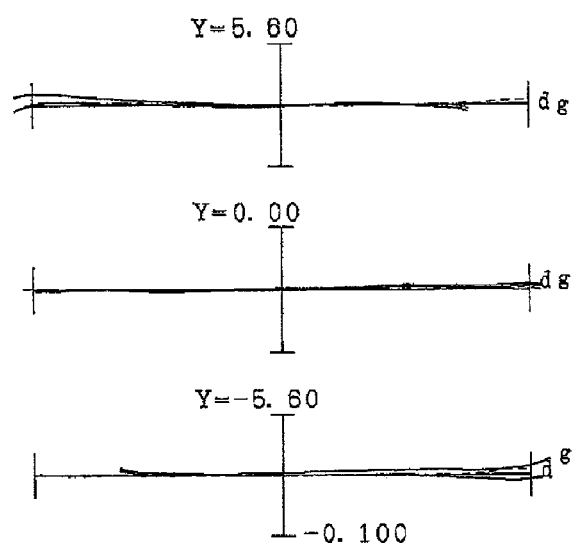
Figure 15A:
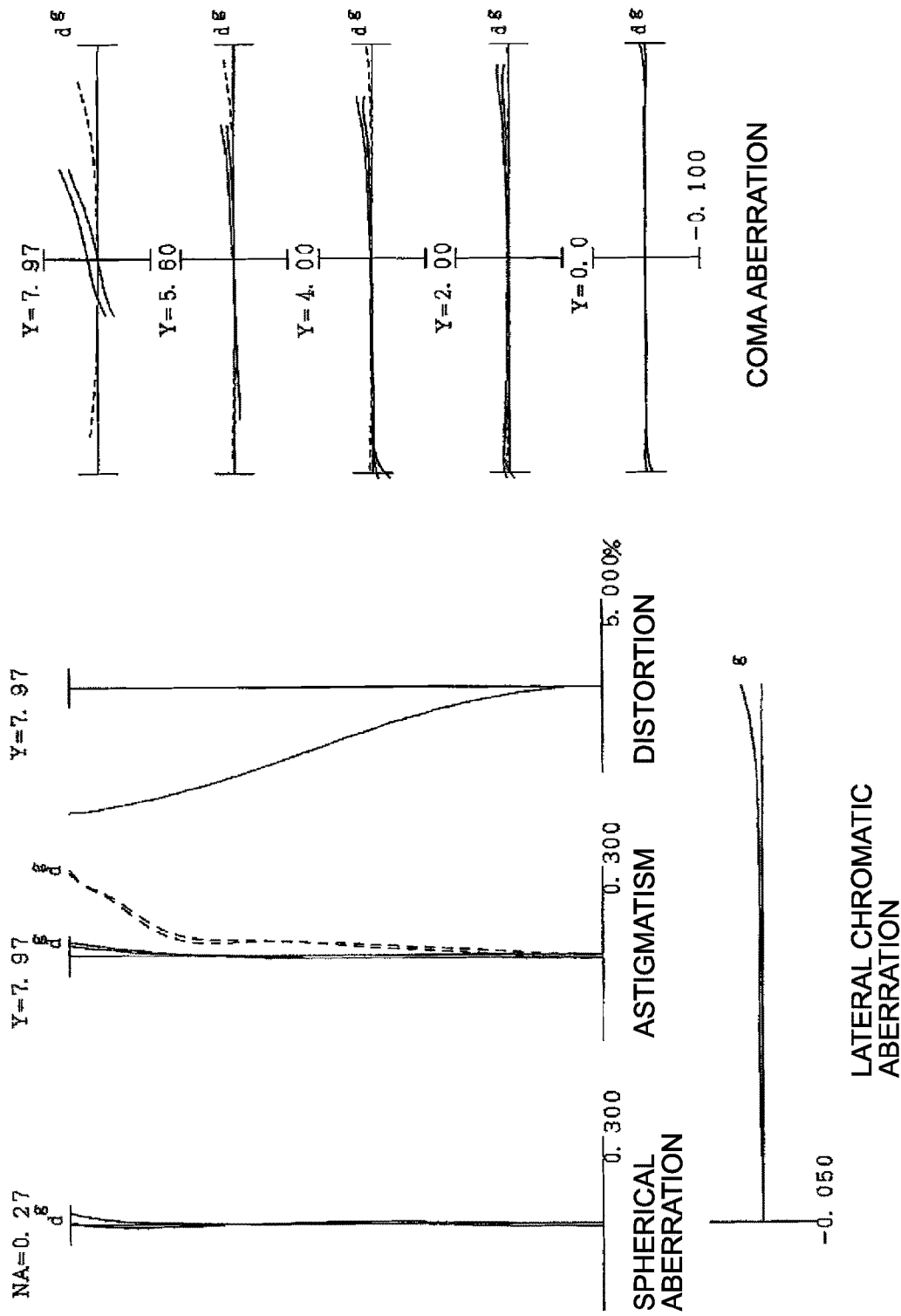
Figure 15B:
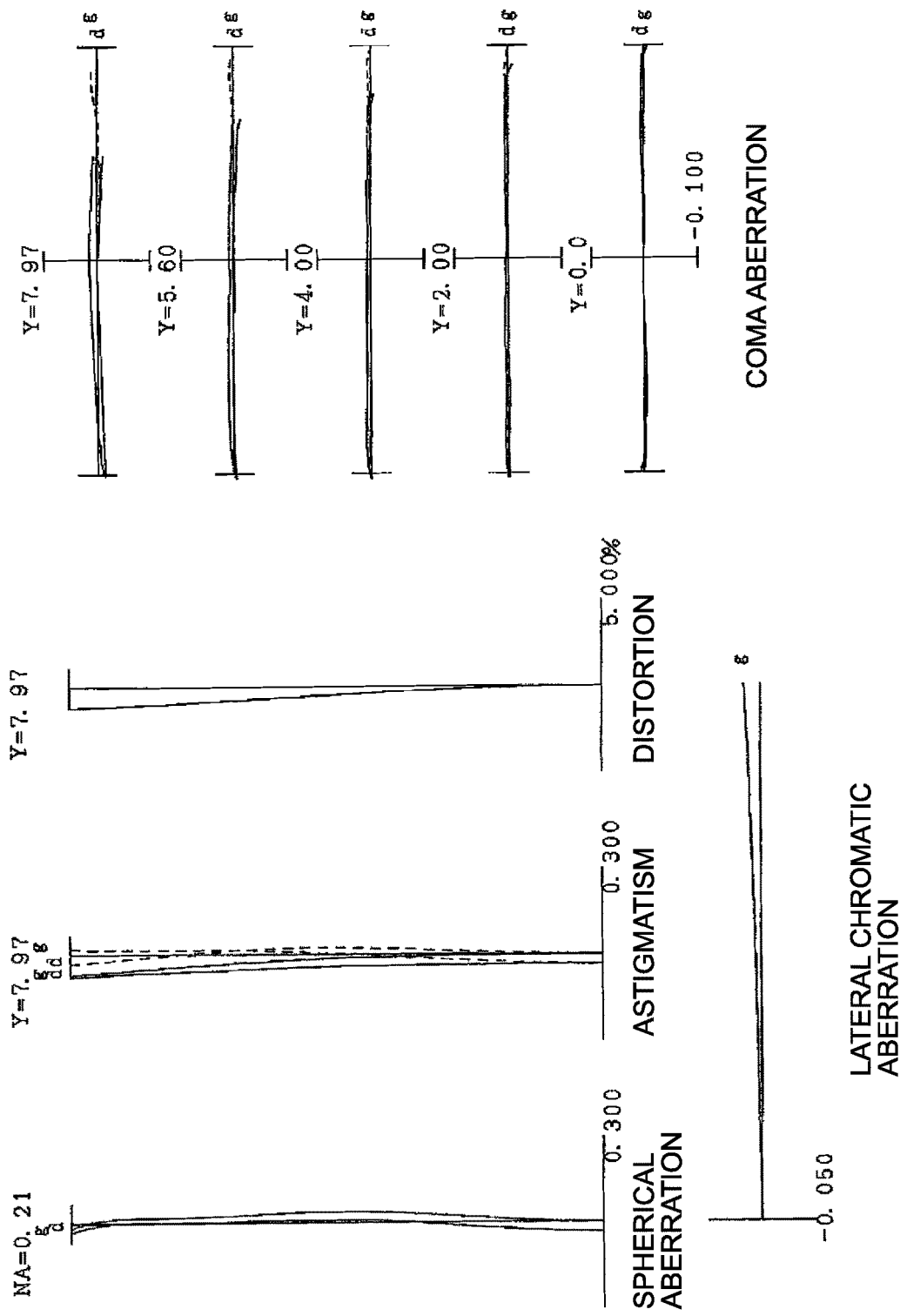

FIG. 12A, FIG. 13A and FIG. 14A are graphs showing spherical aberration, astigmatism, distortion, lateral chromatic aberration and coma aberration of the variable power optical system ZL3 upon focusing on infinity in the wide-angle end state, intermediate focal length state, and telephoto end state, and FIG. 12B, FIG. 13B and FIG. 14B are graphs showing coma aberration when image blur is corrected upon focusing on infinity in the wide-angle end state, intermediate focal length state and telephoto end state. FIG. 15 are graphs showing spherical aberration, astigmatism, distortion, lateral chromatic aberration and coma aberration upon focusing on a close point in the wide-angle end state, intermediate focal length state and telephoto end state. As each graph showing aberration clarifies, various aberrations are corrected well in the variable power optical system ZL3, from the wide-angle end state to the telephoto end state.

Example 4

FIG. 16 shows a configuration of a variable power optical system ZL4 according to Example 4. The variable power optical system ZL4 shown in FIG. 16 includes, in order from an object: a first lens group G1 having positive refractive power; a second lens group G2 having negative refractive power; and a rear group GR, and the rear group GR is constituted by, in order from the object: a third lens group G3 having positive refractive power; and a fourth lens group G4 having positive refractive power.

In the variable power optical system ZL4, the first lens group G1 is constituted by a cemented lens where a negative meniscus lens L11 having a convex surface facing the object and a positive meniscus lens L12 having a convex surface facing the object are cemented in order from the object. The second lens group G2 is constituted by, in order from the object: a negative lens L21, which has a convex surface facing the object and of which object side lens surface is aspherical; a cemented lens where biconcave lens L22 and a biconvex lens L23 are cemented; and a cemented lens where a positive meniscus lens L24 having a concave surface facing the object and a negative lens L25 of which image side lens surface is aspherical are cemented. The third lens group G3 is constituted by, in order from the object: a positive lens L31 of which object side and image side lens surface are aspherical; a cemented lens where a biconvex lens L32 and a biconcave lens L33 are cemented; a cemented lens where a biconcave lens L34 and a biconvex lens L35 are cemented; a positive lens L36 of which image side lens surface is aspherical; and a negative meniscus lens L37 having a convex surface facing the object. The fourth lens group G4 is constituted by a positive lens L41 which has a convex surface facing the object and of which object side lens surface is aspherical. An aperture stop S is disposed between the second lens group G2 and the third lens group G3. A filter group FL including a low-pass filter, an infrared filter or the like is disposed between the fourth lens group G4 and the image plane I. The negative lens L21, the negative lens L25, the positive lens L31, the positive lens L36 and the positive lens L41 are glass-molded aspherical lenses.

In this variable power optical system ZL4, upon zooming from the wide-angle end state to the telephoto end state, the first lens group G1 and the second lens group G2 move toward the image plane first and then move toward the object, the third lens group G3 moves toward the object, and the fourth lens group G4 moves toward the object first and then moves toward the image plane, so that the distance between the first lens group G1 and the second lens group G2 increases, the distance between the second lens group G2 and the third lens group G3 decreases, and the distance between the third lens group G3 and the fourth lens group G4 increases. The aperture stop S moves together with the third lens group G3.

In the variable power optical system ZL4, focusing from infinity to an object at a close distance is performed by moving an image side group G3c (negative meniscus lens L37), which is disposed to the image side of a vibration-isolating lens group G32 of the third lens group G3, toward the image plane.

In the variable power optical system ZL4, the positive lens L36 of the third lens group G3 is used as the vibration-isolating lens group G32, and image blur correction (vibration isolation) is performed by moving the vibration-isolating lens group G32 so as to have a component in a direction orthogonal to the optical axis. In the wide-angle end state of Example 4, the vibration-isolation coefficient is −0.701 and the focal length is 9.26 (mm), therefore the moving distance of the vibration-isolating lens group G32, to correct a 0.940° rotation blur, is −0.152 (mm). In the intermediate focal length state, the vibration-isolation coefficient is −0.929 and the focal length is 19.1 (mm), therefore the moving distance of the vibration-isolating lens group G32, to correct a 0.537° rotation blur, is −0.179 (mm). In the telephoto end state, the vibration-isolation coefficient is −1.05 and the focal length is 29.1 (mm), therefore the moving distance of the vibration-isolating lens group G32, to correct a 0.475° rotation blur, is −0.241 (mm).

Table 13 shows the data values of the variable power optical system ZL4. The surface numbers 1 to 32 in Table 13 correspond to the numbers 1 to 32 in FIG. 16.

TABLE 13

Example 4

[General Data]
Zoom ratio = 3.13

| | Wide-angle end state | | Intermediate focal length state | | Telephoto end state |
|---|---|---|---|---|---|
| f = | 9.26 | ~ | 19.1 | ~ | 29.1 |
| FNO = | 1.8 | ~ | 2.3 | ~ | 2.6 |
| 2ω = | 85.1 | ~ | 45.0 | ~ | 29.9 |
| Y = | 8.0 | ~ | 8.0 | ~ | 8.0 |
| TL (air conversion length) = | 93.2 | ~ | 98.8 | ~ | 110.7 |
| BF (air conversion length) = | 13.71 | ~ | 19.12 | ~ | 20.67 |

[Lens Data]

| m | r | d | νd | nd | |
|---|---|---|---|---|---|
| Object plane | ∞ | | | | |
| 1 | 47.558 | 1.60 | 17.98 | 1.94595 | |
| 2 | 35.327 | 6.23 | 46.60 | 1.80400 | |
| 3 | 222.036 | D3 | | | |
| 4* | 5814.989 | 1.61 | 40.10 | 1.85135 | |
| 5 | 11.700 | 6.30 | | | |
| 6 | −90.767 | 1.94 | 49.62 | 1.77250 | |
| 7 | 47.951 | 3.78 | 23.78 | 1.84666 | |
| 8 | −36.068 | 1.81 | | | |
| 9 | −14.307 | 2.06 | 22.74 | 1.80809 | |
| 10 | −12.194 | 0.90 | 45.46 | 1.80139 | |
| 11* | −25.687 | D11 | | | |
| 12 | 0.000 | 0.80 | | | Aperture stop S |
| 13* | 16.293 | 3.67 | 67.05 | 1.59201 | |
| 14* | −77.139 | 0.30 | | | |
| 15 | 70.431 | 3.48 | 25.45 | 1.80518 | |
| 16 | −16.780 | 0.80 | 33.73 | 1.64769 | |
| 17 | 24.325 | 2.59 | | | |
| 18 | −33.946 | 1.09 | 25.45 | 1.80518 | |
| 19 | 18.705 | 4.24 | 82.57 | 1.49782 | |
| 20 | −16.422 | 0.50 | | | |
| 21 | 21.829 | 2.84 | 81.49 | 1.49710 | |
| 22* | −60.000 | D22 | | | |
| 23 | 113.472 | 0.80 | 82.57 | 1.49782 | |
| 24 | 22.646 | D24 | | | |
| 25* | 26.180 | 2.35 | 81.49 | 1.49710 | |
| 26 | 607.278 | D26 | | | |
| 27 | 0.000 | 0.50 | 63.88 | 1.51680 | |
| 28 | 0.000 | 1.11 | | | |
| 29 | 0.000 | 1.59 | 63.88 | 1.51680 | |
| 30 | 0.000 | 0.30 | | | |
| 31 | 0.000 | 0.70 | 63.88 | 1.51680 | |
| 32 | 0.000 | 0.70 | | | |

[Lens Group Focal Length]

| Lens group | First surface | Focal length |
|---|---|---|
| First lens group | 1 | 79.52 |
| Second lens group | 4 | −12.62 |
| Third lens group | 13 | 22.96 |
| Fourth lens group | 25 | 54.96 |

In this variable power optical system ZL4, Surface 4, Surface 11, Surface 13, Surface 14, Surface 22 and Surface 25 are aspherical. Table 14 shows aspherical data, that is, the values of the conical coefficient K and each aspherical coefficient A4 to A10.

TABLE 14

[Aspherical Data]

|  | K | A4 | A6 | A8 | A10 |
|---|---|---|---|---|---|
| Surface 4 | 0 | 3.94307E−05 | −1.29628E−07 | 3.43564E−10 | −3.78498E−13 |
| Surface 11 | 0 | −1.30254E−05 | −1.98133E−08 | −6.57557E−10 | 4.01106E−12 |
| Surface 13 | 0 | −3.22653E−06 | 1.73408E−07 | −7.04126E−11 | 0.00000E+00 |
| Surface 14 | 0 | 7.18116E−05 | 1.79256E−07 | 0.00000E+00 | 0.00000E+00 |
| Surface 22 | 0 | 1.05439E−05 | 2.55453E−08 | 8.37397E−10 | −1.64088E−12 |
| Surface 25 | 0 | −1.35591E−05 | 1.71835E−07 | −3.32810E−09 | 2.04907E−11 |

In the variable power optical system ZL4, the axial air distance D3 between the first lens group G1 and the second lens group G2, the axial air distance D11 between the second lens group G2 and the third lens group G3 (aperture stop S), the axial air distance D24 between the third lens group G3 and the fourth lens group G4, and the axial air distance D26 between the fourth lens group G4 and the filter group FL change upon zooming, as mentioned above. The axial air distance D22 to the object side and the axial air distance D24 to the image side of the image side group G3c of the third lens group G3 Change upon focusing. Table 15 shows the variable distance in each focal length state of the wide-angle end state, intermediate focal length state and telephoto end state upon focusing on infinity and upon focusing on a close point. Upon focusing on a close point, only the values of D22 and D24 are shown, and omitted values are the same as the respective values obtained upon focusing on infinity.

TABLE 15

[Variable Distance Data]

| | Focusing on infinity | | | Focusing on close point | | |
|---|---|---|---|---|---|---|
| | Wide-angle end | Inter-mediate | Telephoto end | Wide-angle end | Inter-mediate | Telephoto end |
| f | 9.3 | 19.1 | 29.1 | 9.3 | 19.1 | 29.1 |
| D3 | 1.0 | 13.9 | 23.9 | | | |
| D11 | 19.2 | 4.9 | 1.2 | | | |
| D22 | 1.60 | 1.60 | 1.60 | 2.44 | 3.60 | 5.50 |
| D24 | 5.20 | 9.06 | 13.43 | 4.36 | 7.06 | 9.53 |
| D26 | 9.8 | 17.2 | 17.5 | | | |

Table 16 shows each conditional expression correspondence value of the variable power optical system ZL4. In Example 4, the negative lens included in the image side group G3c of the third lens group G3 is the negative meniscus lens L37, the positive lens included in the object side group G3a of the third lens group G3 is the positive lens L31, the positive lens included in the vibration-isolating lens group G32 is the positive lens L36, and the final lens group is the fourth lens group G4. R2a indicates a radial distance of the Surface 17, and R1b indicates a radius of curvature of Surface 18.

TABLE 16

[Conditional Expression Correspondence Value]

(1) $(-f2)/(fw \times ft)^{1/2} = 0.769$
(2) $ndF - 0.0052 \times vdF - 1.965 = -0.038$
(3) $vdF = 82.6$
(4) $vdO = 67.1$
(5) $f4/fw = 5.94$
(6) $fv \times FNOw/f3 = 2.60$
(7) $(R2a + R1b)/(R2a - R1b) = -0.165$
(8) $f3/\Delta T3 = 1.51$ TABLE 16-continued

[Conditional Expression Correspondence Value]

(9) $ndVR - 0.0052 \times vdVR - 1.965 = -0.044$
(10) $vdVR = 81.49$
(11) $fr/fw = 5.94$
(12) $f3/(fw \times ft)^{1/2} = 1.40$ Thus the variable power optical system ZL4 satisfies all the conditional expressions (1) to (12).

Figure 17B:
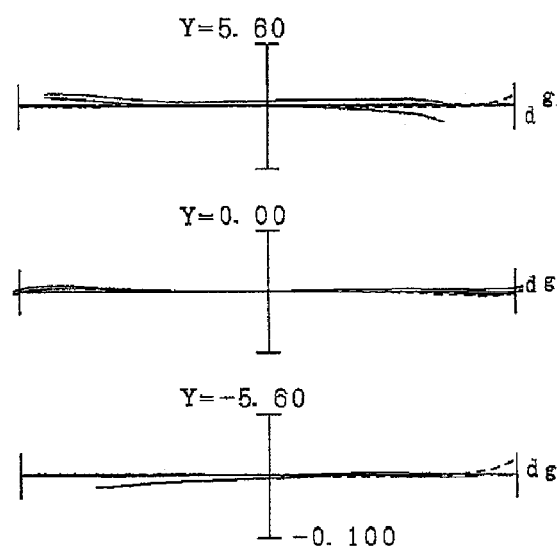
Figure 18A:
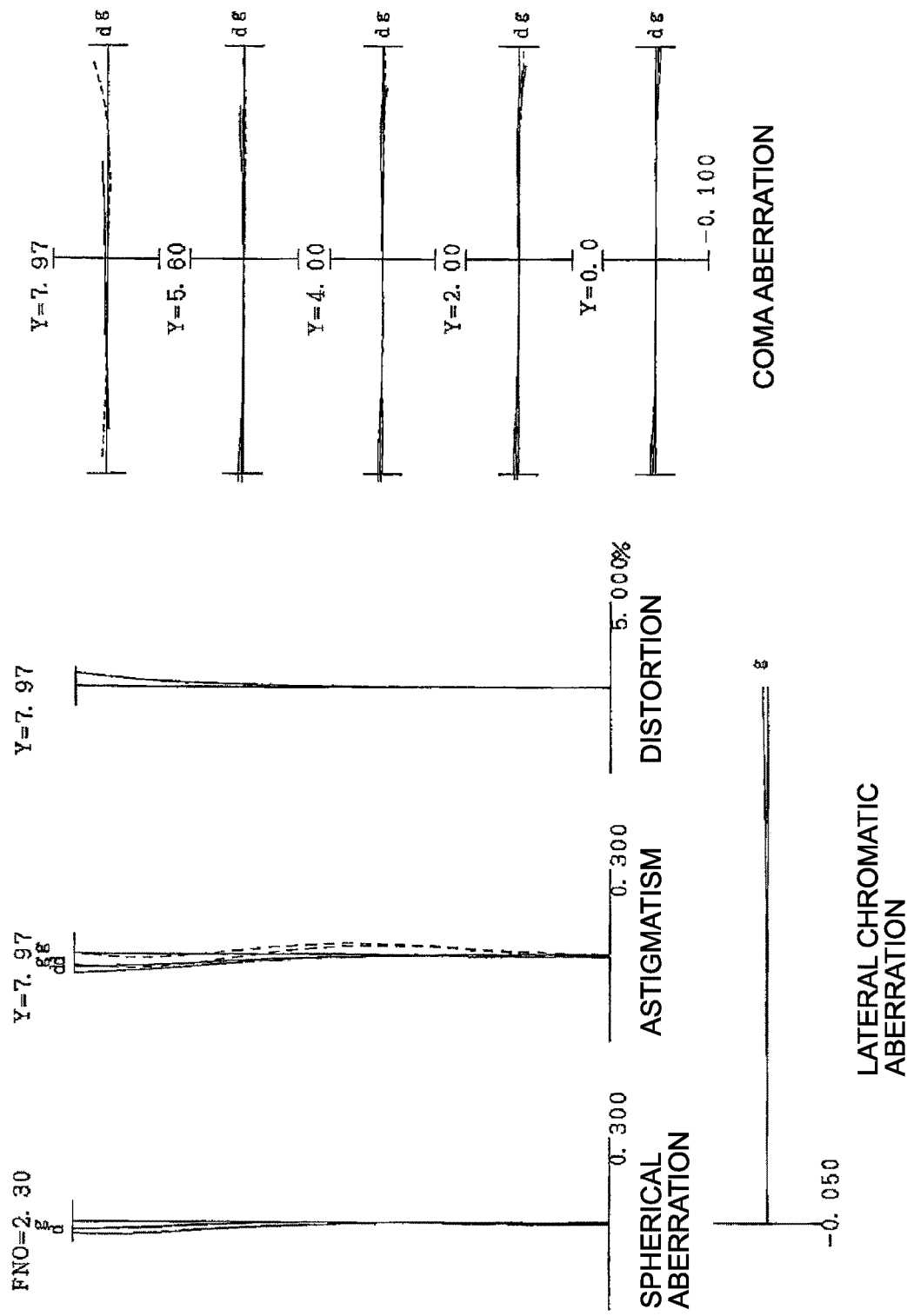
FIGS. 18A and 18B are graphs showing various aberrations of the variable power optical system according to Example 4 upon focusing on infinity, where FIG. 18A are graphs showing various aberrations in the intermediate focal length state, and FIG. 18B are graphs showing coma aberrations when image blur is corrected in the intermediate focal length state.
Figure 18B:
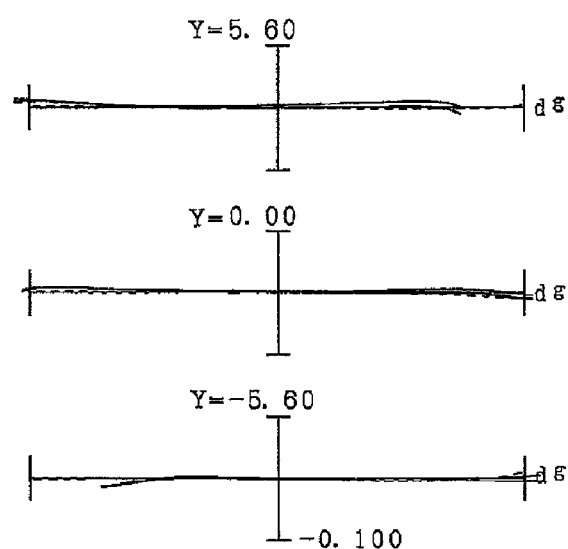
Figure 19B:
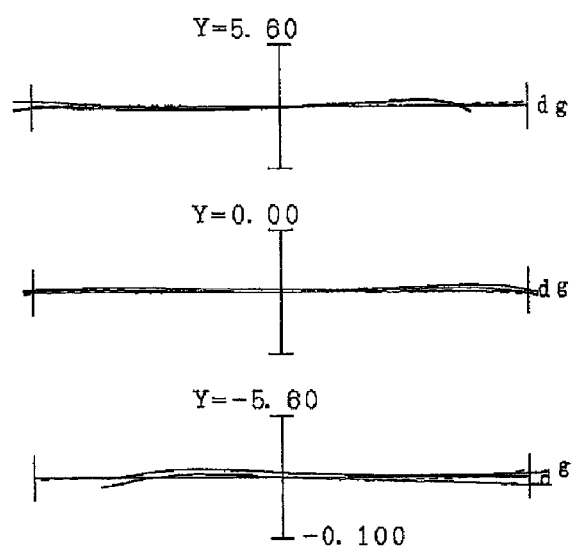
Figure 20A:
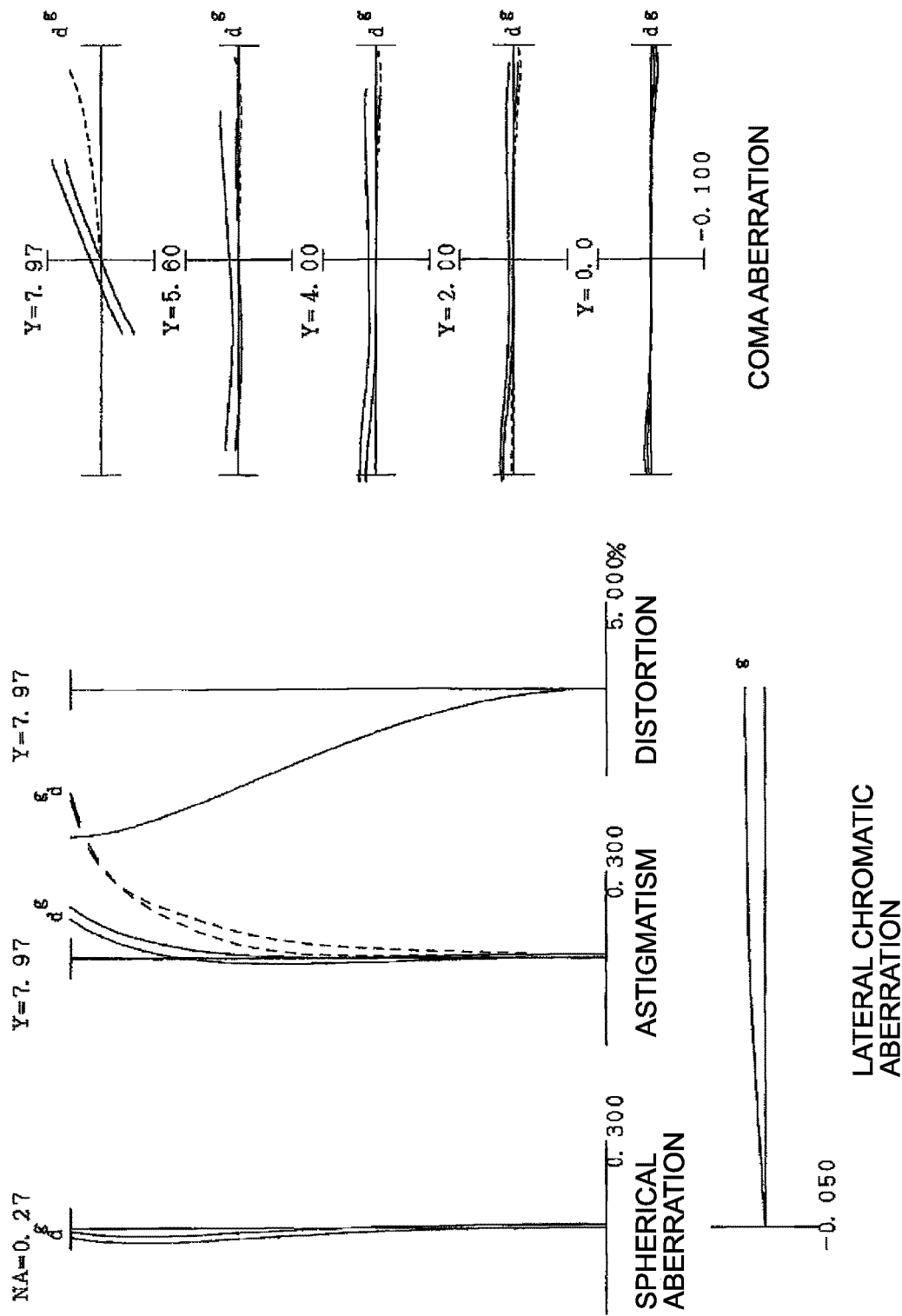
Figure 20C:
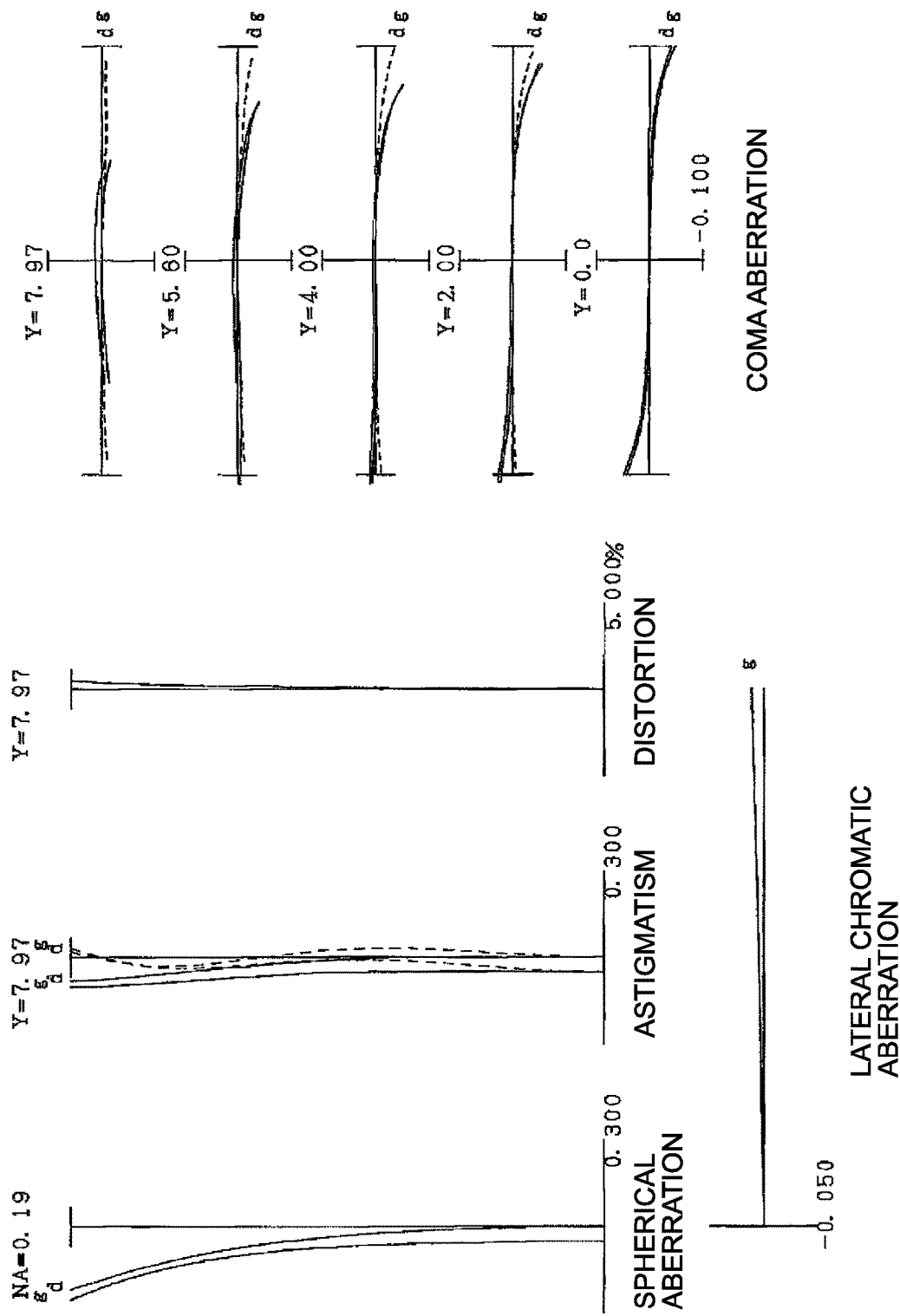

FIG. 17A, FIG. 18A and FIG. 19A are graphs showing spherical aberration, astigmatism, distortion, lateral chromatic aberration and coma aberration of the variable power optical system ZL4 upon focusing on infinity in the wide-angle end state, intermediate focal length state, and telephoto end state, and FIG. 17B, FIG. 18B and FIG. 19B are graphs showing coma aberration when image blur is corrected upon focusing on infinity in the wide-angle end state, intermediate focal length state and telephoto end state. FIG. 20 are graphs showing spherical aberration, astigmatism, distortion, lateral chromatic aberration and coma aberration upon focusing on a close point in the wide-angle end state, intermediate focal length state and telephoto end state. As each graph showing aberration clarifies, various aberrations are corrected well in the variable power optical system ZL4, from the wide-angle end state to the telephoto end state.

Example 5

Figure 21:
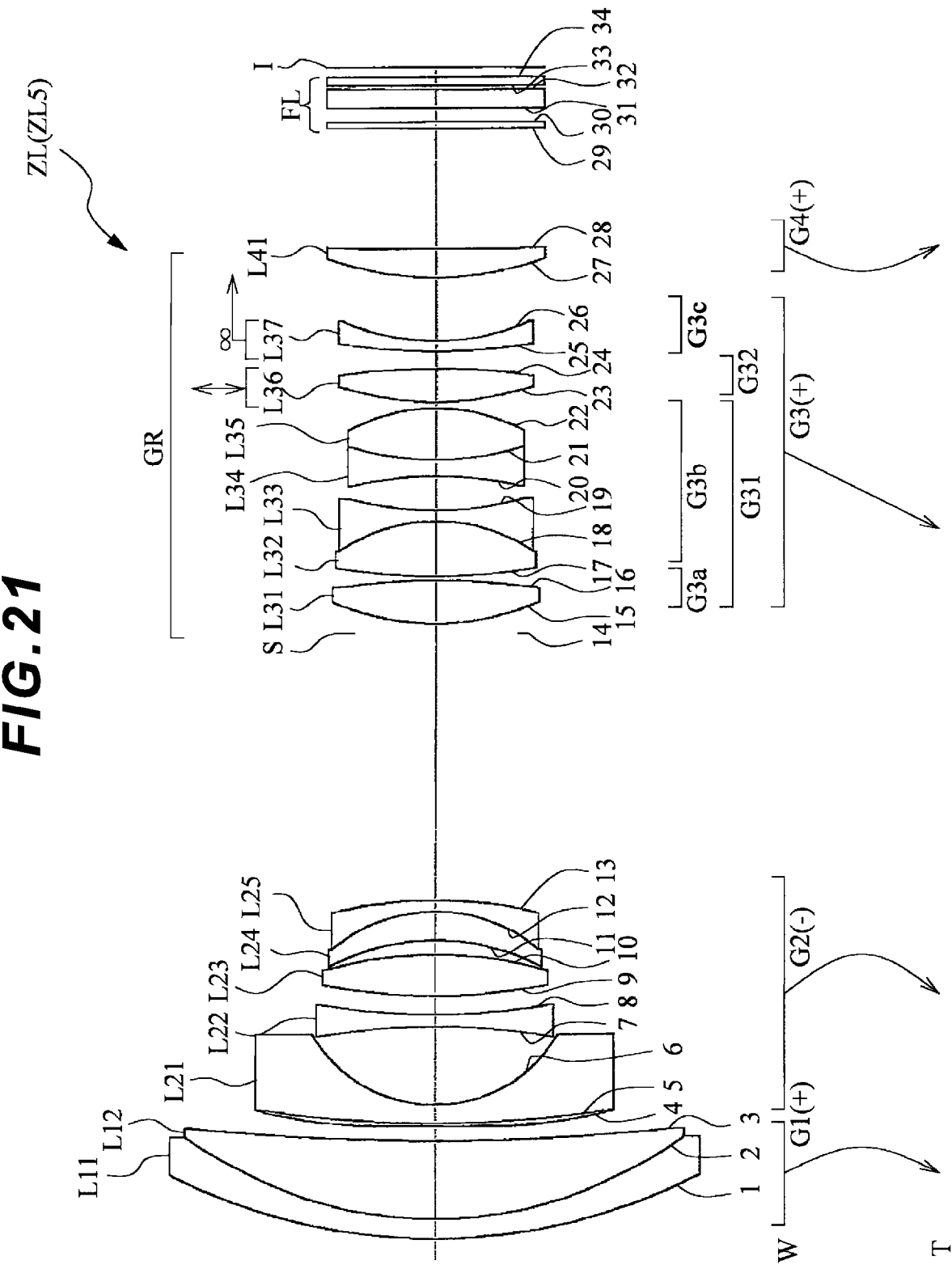
FIG. 21 is a cross-sectional view depicting a lens configuration of a variable power optical system according to Example 5.

FIG. 21 shows a configuration of a variable power optical system ZL5 according to Example 5. The variable power optical system ZL5 shown in FIG. 21 includes, in order from an object: a first lens group G1 having positive refractive power; a second lens group G2 having negative refractive power; and a rear group GR, and the rear group GR is constituted by, in order from the object: a third lens group G3 having positive refractive power; and a fourth lens group G4 having positive refractive power.

In the variable power optical system ZL5, the first lens group G1 is constituted by a cemented lens where a negative meniscus lens L11 having a convex surface facing the object and a positive meniscus lens L12 having a convex surface facing the object are cemented in order from the object. The second lens group G2 is constituted by, in order from the object: a negative lens L21 of which aspherical shape is formed by creating a resin layer on the object side lens surface of a negative meniscus lens having a convex surface facing the object; a biconcave lens L22; a biconvex lens L23; and a cemented lens where a positive meniscus lens L24 having a concave surface facing the object and a negative lens L25 which has a concave surface facing the object and of which image side lens surface is aspherical are cemented. The third lens group G3 is constituted by, in order from the object: a positive lens L31 of which object side and image side lens surfaces are aspherical; a cemented lens where a biconvex lens L32 and a biconcave lens L33 are cemented; a cemented lens where a biconcave lens L34 and a biconvex lens L35 are cemented; a positive lens L36 of which object side and image side lens surfaces are aspherical; and negative meniscus lens L37 having a convex surface facing the object. The fourth lens group G4 is constituted by a positive lens L41 of which object side lens surface is aspherical. An aperture stop S is disposed between the second lens group G2 and the third lens group G3. A filter group FL including a low-pass filter, an infrared filter or the like is disposed between the fourth lens group G4 and the image plane I. The negative lens L25, the positive lens L31, the positive lens L36 and the positive lens L41 are glass-molded aspherical lenses.

In this variable power optical system ZL5, upon zooming from the wide-angle end state to the telephoto end state, the first lens group G1 and the second lens group G2 move toward the image plane first and then move toward the object, the third lens group G3 moves toward the object, and the fourth lens group G4 moves toward the object first and then moves toward the image plane, so that the distance between the first lens group G1 and the second lens group G2 increases, the distance between the second lens group G2 and the third lens group G3 decreases, and the distance between the third lens group G3 and the fourth lens group G4 increases. The aperture stop S moves together with the third lens group G3.

In the variable power optical system ZL5, focusing from infinity to an object at a close distance is performed by moving an image side group G3c (negative meniscus lens L37), which is disposed to the image side of a vibration-isolating lens group G32 of the third lens group G3, toward the image plane.

In the variable power optical system ZL5, the positive lens L36 of the third lens group G3 is used as the vibration-isolating lens group G32, and image blur correction (vibration isolation) is performed by moving the vibration-isolating lens group G32 so as to have a component in a direction orthogonal to the optical axis. In the wide-angle end state of Example 5, the vibration-isolation coefficient is −0.636 and the focal length is 9.3 (mm), therefore the moving distance of the vibration-isolating lens group G32, to correct a 1.03° rotation blur, is −0.167 (mm). In the intermediate focal length state, the vibration-isolation coefficient is −0.859 and the focal length is 19.1 (mm), therefore the moving distance of the vibration-isolating lens group G32, to correct a 0.574° rotation blur, is −0.194 (mm). In the telephoto end state, the vibration-isolation coefficient is −0.963 and the focal length is 29.1 (mm), therefore the moving distance of the vibration-isolating lens group G32, to correct a 0.519° rotation blur, is −0.271 (mm).

Table 17 shows the data values of the variable power optical system ZL5. The surface numbers 1 to 34 in Table 17 correspond to the numbers 1 to 34 in FIG. 21.

TABLE 17

Example 5

[General Data]
Zoom ratio = 3.14

| | Wide-angle end state | | Intermediate focal length state | | Telephoto end state |
|---|---|---|---|---|---|
| f = | 9.3 | ~ | 19.1 | ~ | 29.1 |
| FNO = | 1.8 | ~ | 2.6 | ~ | 2.9 |
| 2ω = | 85.0 | ~ | 45.2 | ~ | 30.1 |
| Y = | 8.0 | ~ | 8.0 | ~ | 8.0 |
| TL (air conversion length) = | 95.9 | ~ | 98.8 | ~ | 112.6 |
| BF (air conversion length) = | 13.79 | ~ | 20.56 | ~ | 21.34 |

[Lens Data]

| m | r | d | νd | nd | |
|---|---|---|---|---|---|
| Object plane | ∞ | | | | |
| 1 | 48.703 | 1.60 | 17.98 | 1.94595 | |
| 2 | 34.692 | 6.38 | 42.73 | 1.83481 | |
| 3 | 197.349 | D3 | | | |
| 4* | 5896.385 | 0.20 | 36.64 | 1.56093 | |
| 5 | 93.609 | 1.51 | 40.66 | 1.88300 | |
| 6 | 11.700 | 6.47 | | | |
| 7 | −54.231 | 1.00 | 54.61 | 1.72916 | |
| 8 | 54.855 | 1.56 | | | |
| 9 | 49.676 | 3.34 | 23.78 | 1.84666 | |
| 10 | −32.621 | 1.12 | | | |
| 11 | −18.908 | 2.35 | 33.73 | 1.64769 | |
| 12 | −13.263 | 0.90 | 44.98 | 1.79050 | |
| 13* | −37.964 | D13 | | | |
| 14 | 0.000 | 0.80 | | | Aperture stop S |
| 15* | 20.379 | 3.57 | 71.67 | 1.55332 | |
| 16* | −42.773 | 0.30 | | | |
| 17 | 46.219 | 4.49 | 23.78 | 1.84666 | |
| 18 | −14.503 | 0.90 | 27.57 | 1.75520 | |
| 19 | 27.482 | 2.80 | | | |
| 20 | −29.885 | 1.34 | 25.45 | 1.80518 | |
| 21 | 23.770 | 4.30 | 82.57 | 1.49782 | |
| 22 | −15.009 | 0.50 | | | |
| 23* | 23.770 | 2.70 | 81.49 | 1.49710 | |
| 24* | −70.000 | D24 | | | |
| 25 | 54.480 | 0.80 | 67.90 | 1.59319 | |
| 26 | 19.345 | D26 | | | |
| 27* | 26.011 | 2.37 | 81.49 | 1.49710 | |
| 28 | 500.000 | D28 | | | |
| 29 | 0.000 | 0.50 | 63.88 | 1.51680 | |
| 30 | 0.000 | 1.11 | | | |
| 31 | 0.000 | 1.59 | 63.88 | 1.51680 | |
| 32 | 0.000 | 0.30 | | | |
| 33 | 0.000 | 0.70 | 63.88 | 1.51680 | |
| 34 | 0.000 | 0.70 | | | |

[Lens Group Focal Length]

| Lens group | First surface | Focal length |
|---|---|---|
| First lens group | 1 | 80.99 |
| Second lens group | 4 | −12.86 |
| Third lens group | 15 | 23.62 |
| Fourth lens group | 27 | 55.11 |

In this variable power optical system ZL5, Surface 4, Surface 13, Surface 15, Surface 16, Surface 23, Surface 24 and Surface 27 are aspherical. Table 18 shows aspherical data, that is, the values of the conical coefficient K and each aspherical coefficient A4 to A10.

TABLE 18

[Aspherical Data]

|  | K | A4 | A6 | A8 | A10 |
|---|---|---|---|---|---|
| Surface 4 | 0 | 4.87287E−05 | −1.73017E−07 | 4.92743E−10 | −6.73284E−13 |
| XSurface 13 | 0 | −8.09198E−06 | −3.28390E−08 | −3.69807E−10 | 1.91943E−12 |
| Surface 15 | 0 | −1.61042E−05 | 3.65268E−08 | −5.12033E−10 | 0.00000E+00 |
| Surface 16 | 0 | 4.30711E−05 | 5.71263E−08 | 0.00000E+00 | 0.00000E+00 |
| Surface 23 | 0 | −1.46815E−05 | −3.11565E−07 | 0.00000E+00 | 0.00000E+00 |
| Surface 24 | 0 | −7.08073E−07 | −3.08275E−07 | −7.09313E−10 | 1.17051E−11 |
| Surface 27 | 0 | −2.64761E−06 | −4.55080E−08 | 2.47961E−10 | 0.00000E+00 |

In the variable power optical system ZL5, the axial air distance D3 between the first lens group G1 and the second lens group G2, the axial air distance D13 between the second lens group G2 and the third lens group G3 (aperture stop S), the axial air distance D26 between the third lens group G3 and the fourth lens group G4, and the axial air distance D28 between the fourth lens group G4 and the filter group FL change upon zooming, as mentioned above. The axial air distance D24 to the object side and the axial air distance D26 to the image side of the image side group G3c of the third lens group G3 Change upon focusing. Table 19 shows the variable distance in each focal length state of the wide-angle end state, intermediate focal length state, and telephoto end state upon focusing on infinity and upon focusing on a close point. Upon focusing on a close point, only the values of D24 and D26 are shown, and the omitted values are the same as the respective values obtained upon focusing on infinity.

TABLE 19

[Variable Distance Data]

| | Focusing on infinity | | | Focusing on close point | | |
|---|---|---|---|---|---|---|
| | Wide-angle end | Inter-mediate | Telephoto end | Wide-angle end | Inter-mediate | Telephoto end |
| f | 9.3 | 19.1 | 29.1 | 9.3 | 19.1 | 29.1 |
| D3 | 1.2 | 11.3 | 22.9 | | | |
| D13 | 22.0 | 5.0 | 1.5 | | | |
| D24 | 1.50 | 1.50 | 1.50 | 2.24 | 3.25 | 4.86 |
| D26 | 5.20 | 8.12 | 13.07 | 4.46 | 6.37 | 9.70 |
| D28 | 9.8 | 16.6 | 16.9 | | | |

Table 20 shows each conditional expression correspondence value of the variable power optical system ZL5. In Example 5, the negative lens included in the image side group G3c of the third lens group G3 is a negative meniscus lens L37, the positive lens included in the object side group G3a of the third lens group G3 is the positive lens L31, the positive lens included in the vibration-isolating lens group G32 is the positive lens L36, and the final lens group is the fourth lens group G4. R2a indicates a radial distance of Surface 19, and R1b indicates a radius of curvature of Surface 20.

TABLE 20

[Conditional Expression Correspondence Value]

(1) $(-f2)/(fw \times ft)^{1/2} = 0.782$
(2) $ndF - 0.0052 \times vdF - 1.965 = -0.019$
(3) $vdF = 67.9$
(4) $vdO = 71.7$
(5) $f4/fw = 5.93$
(6) $fv \times FNOw/f3 = 2.81$
(7) $(R2a + R1b)/(R2a - R1b) = -0.042$ TABLE 20-continued

[Conditional Expression Correspondence Value]

(8) $f3/\Delta T3 = 1.53$
(9) $ndVR - 0.0052 \times vdVR - 1.965 = -0.044$
(10) $vdVR = 81.49$
(11) $fr/fw = 5.94$
(12) $f3/(fw \times ft)^{1/2} = 1.44$ Thus the variable power optical system ZL5 satisfies all the conditional expressions (1) to (12).

Figure 22A:
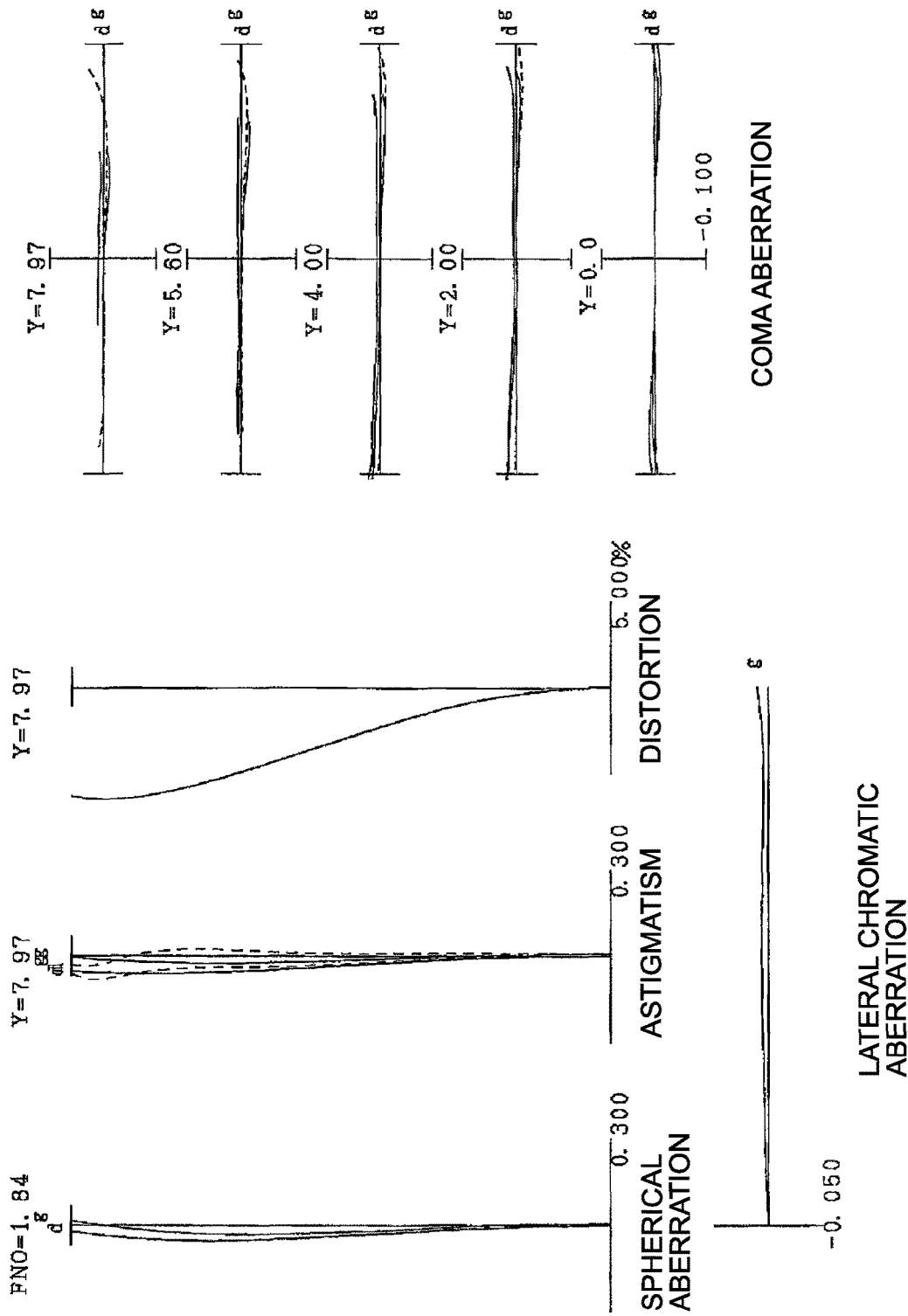
FIGS. 22A and 22B are graphs showing various aberrations of the variable power optical system according to Example 5 upon focusing on infinity, where FIG. 22A are graphs showing various aberrations in the wide-angle end state, and FIG. 22B are graphs showing coma aberrations when image blur is corrected in the wide-angle end state.
Figure 22B:
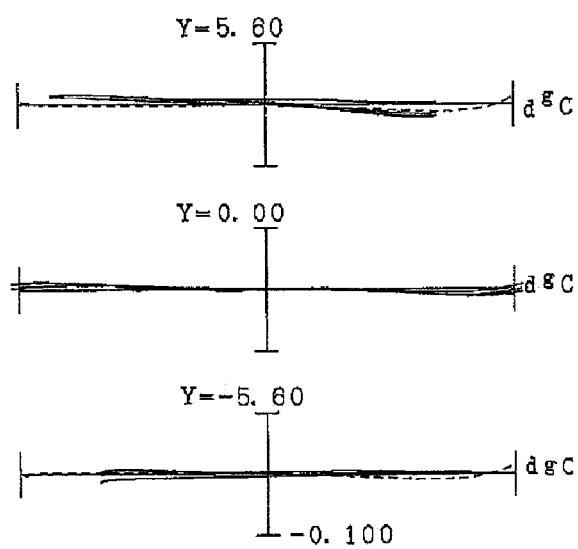
Figure 23A:
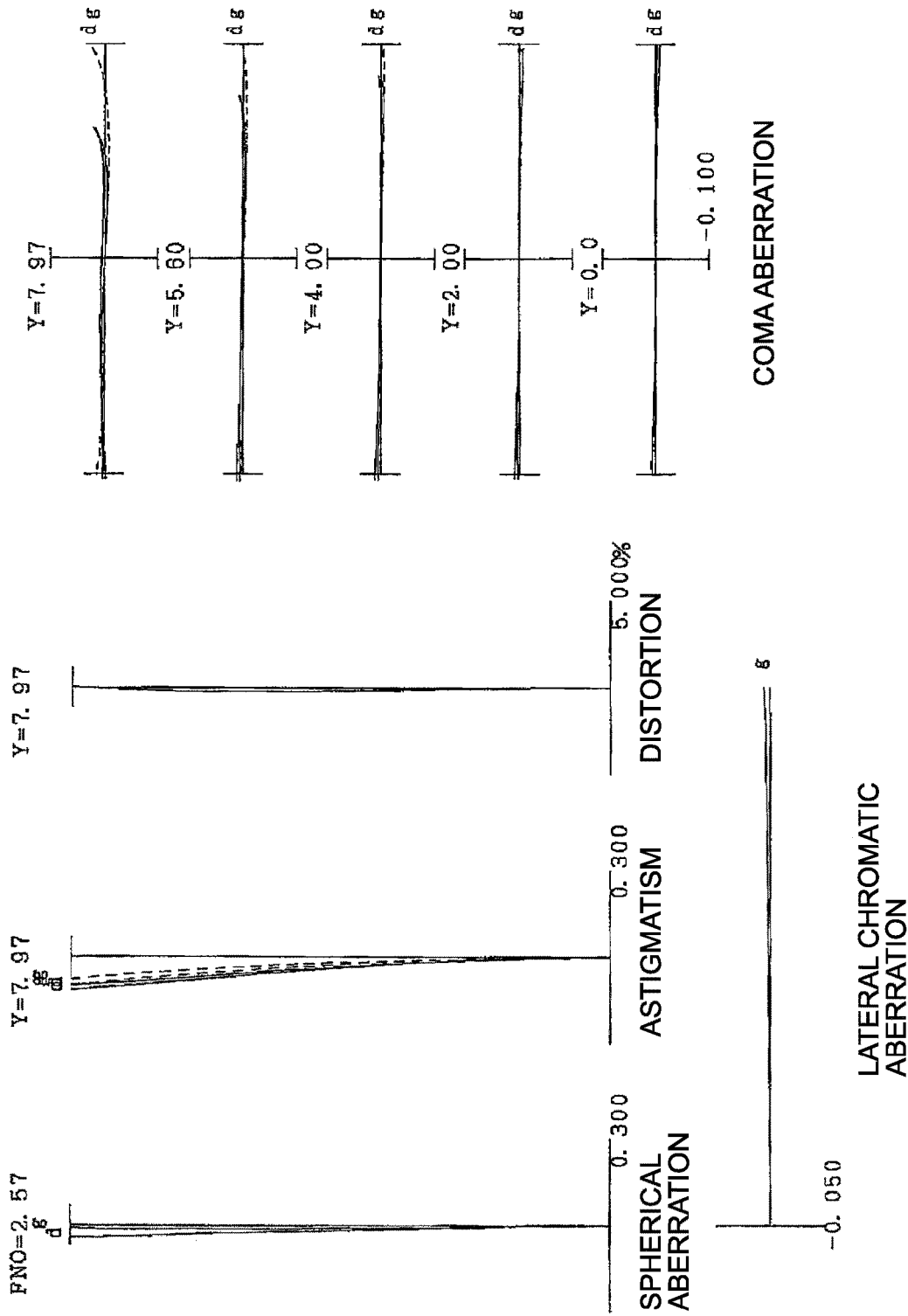
FIGS. 23A and 23B are graphs showing various aberrations of the variable power optical system according to Example 5 upon focusing on infinity, where FIG. 23A are graphs showing various aberrations in the intermediate focal length state, and FIG. 23B are graphs showing coma aberrations when image blur is corrected in the intermediate focal length state.
Figure 23B:
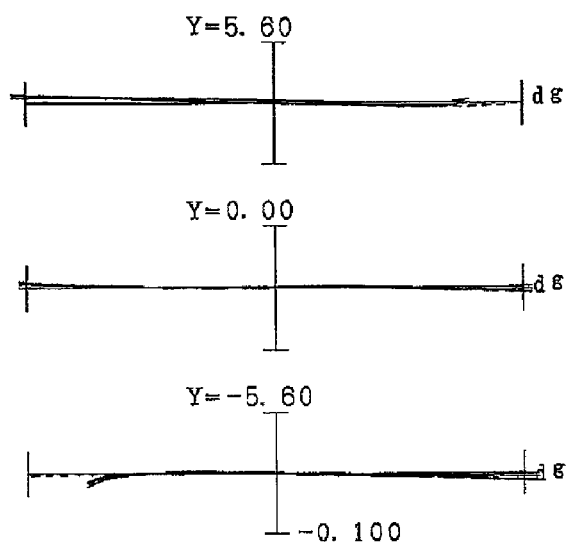
Figure 24A:
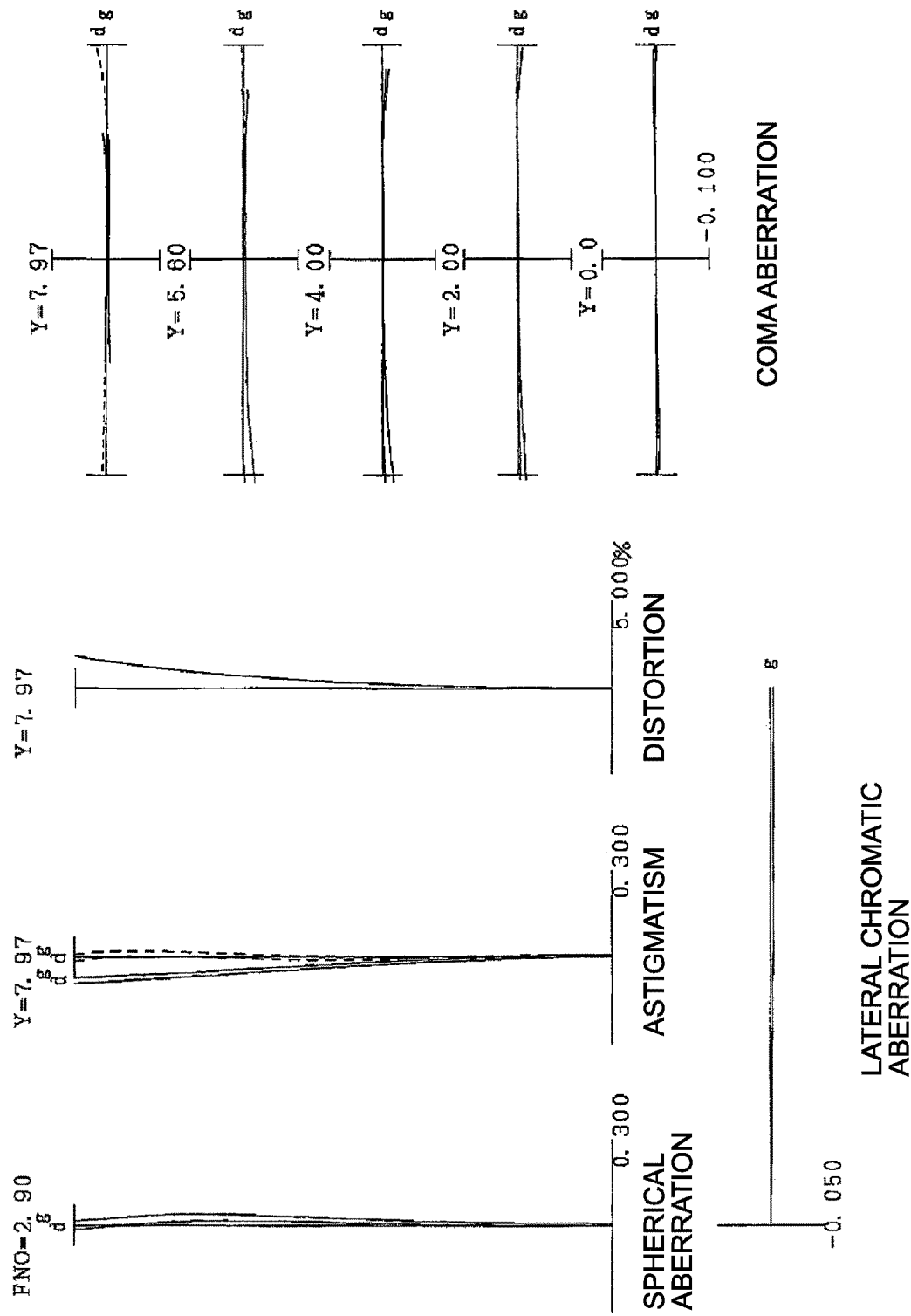
FIGS. 24A and 24B are graphs showing various aberrations of the variable power optical system according to Example 5 upon focusing on infinity, where FIG. 24A are graphs showing various aberrations in the telephoto end state, and FIG. 24B are graphs showing coma aberrations when image blur is corrected in the telephoto end state.
Figure 24B:
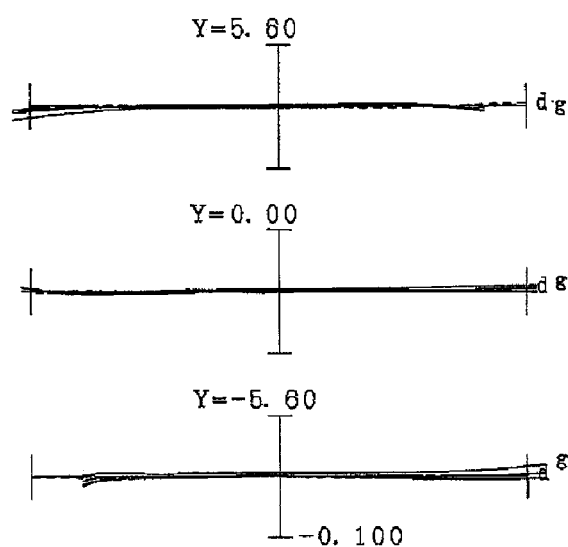
Figure 25A:
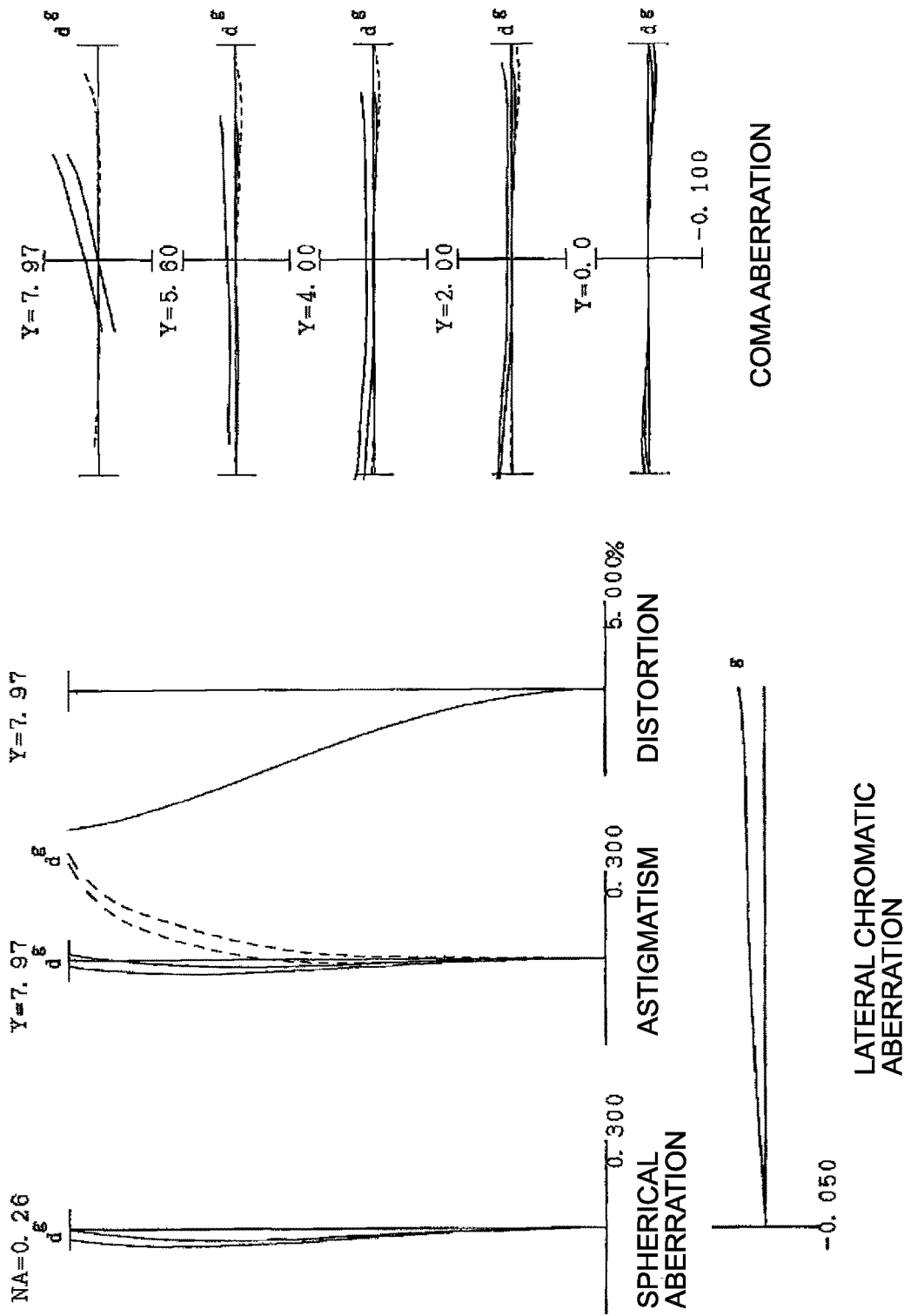
Figure 25C:
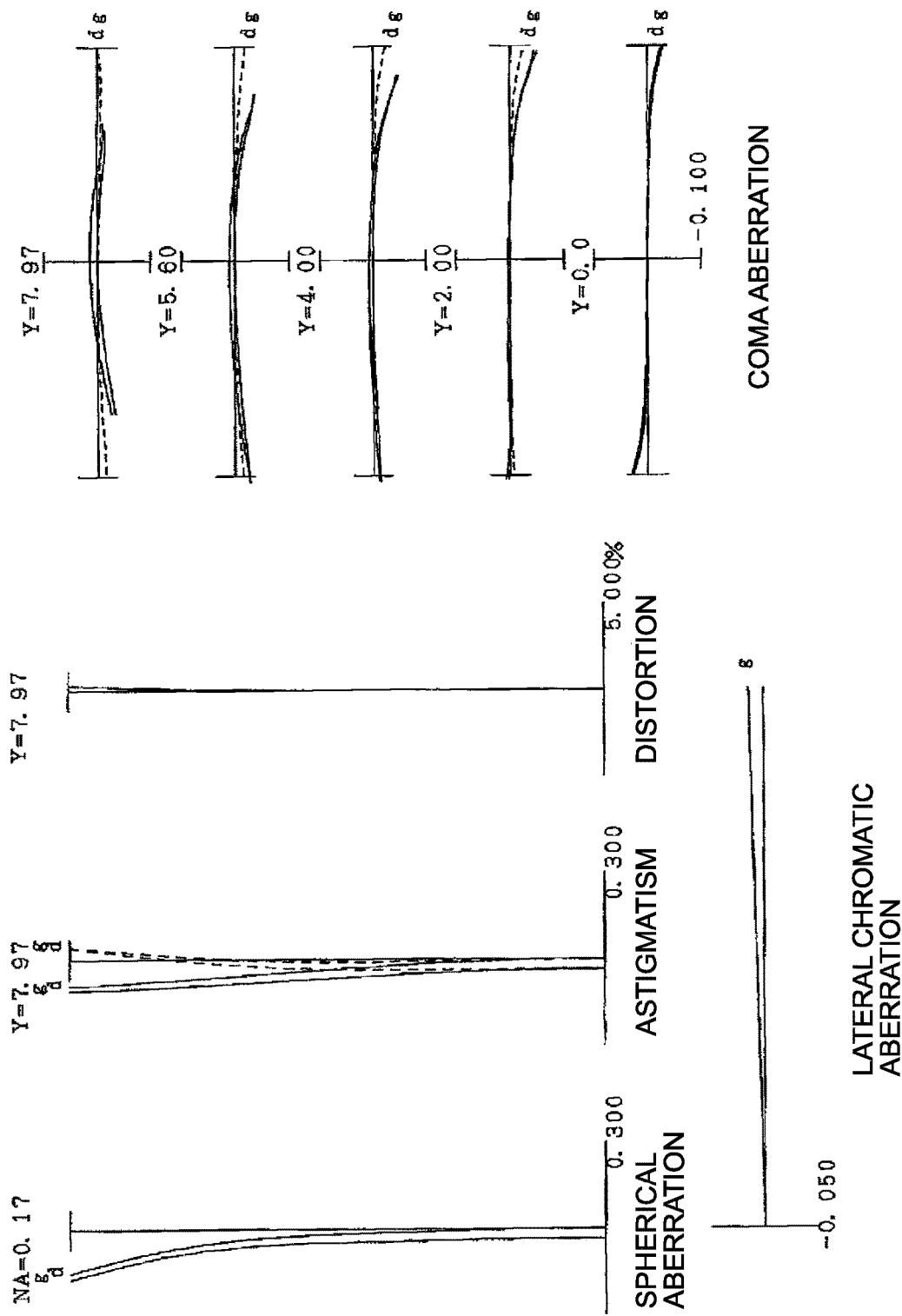

FIG. 22A, FIG. 23A and FIG. 24A are graphs showing spherical aberration, astigmatism, distortion, lateral chromatic aberration and coma aberration of the variable power optical system ZL5 upon focusing on infinity in the wide-angle end state, intermediate focal length state, and telephoto end state, and FIG. 22B, FIG. 23B and FIG. 24B are graphs showing coma aberration when image blur is corrected upon focusing on infinity in the wide-angle end state, intermediate focal length state and telephoto end state. FIG. 25 are graphs showing spherical aberration, astigmatism, distortion, lateral chromatic aberration and coma aberration upon focusing on a close point in the wide-angle end state, intermediate focal length state and telephoto end state. As each graph showing aberration clarifies, various aberrations are corrected well in the variable power optical system ZL5, from the wide-angle end state to the telephoto end state.

Example 6

Figure 26:
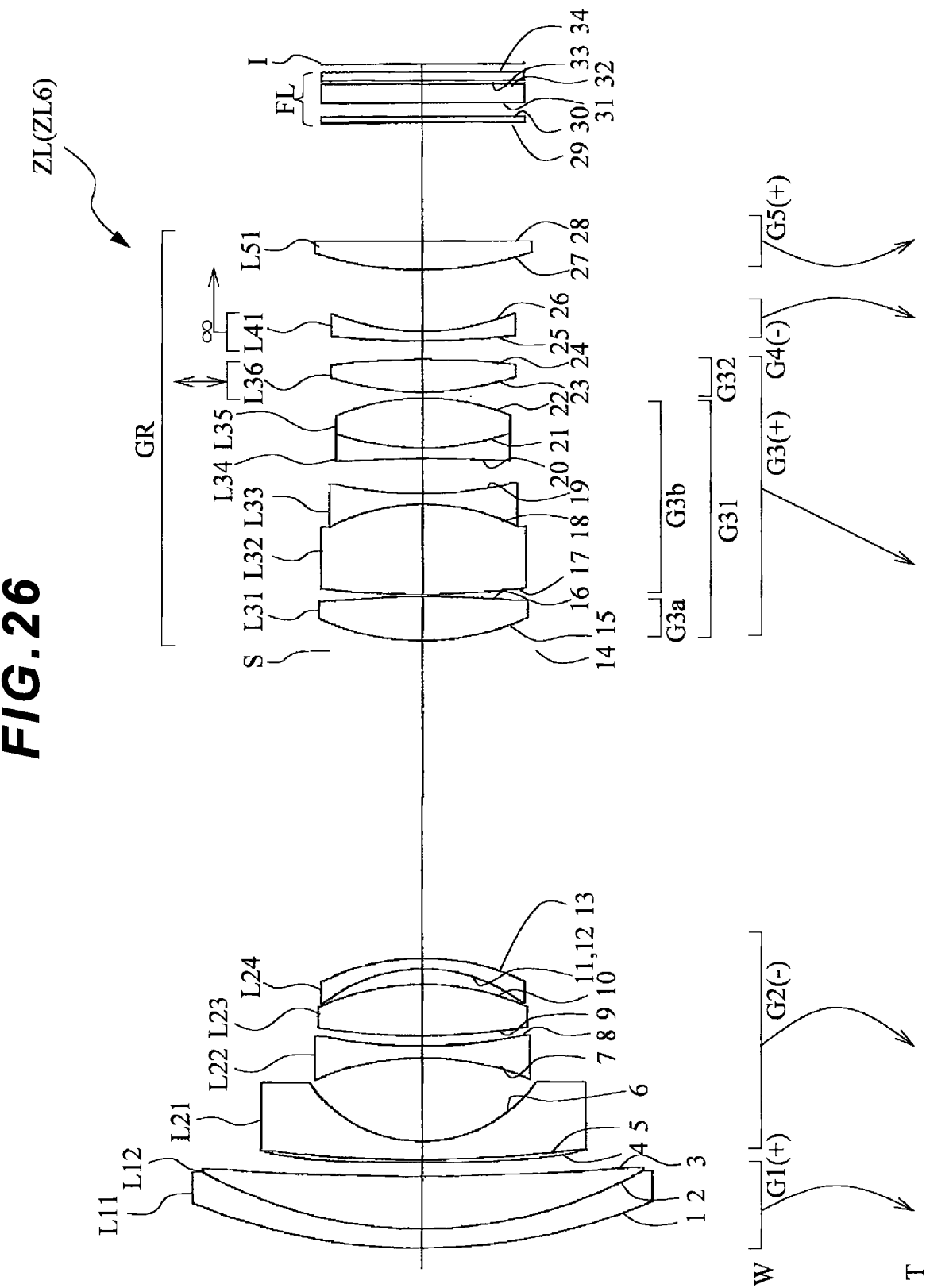
FIG. 26 is a cross-sectional view depicting a lens configuration of a variable power optical system according to Example 6.

FIG. 26 shows a configuration of a variable power optical system ZL6 according to Example 6. The variable power optical system ZL6 shown in FIG. 26 includes, in order from an object: a first lens group G1 having positive refractive power; a second lens group G2 having negative refractive power; and a rear group GR, and the rear group GR is constituted by, in order from the object: a third lens group G3 having positive refractive power; a fourth lens group G4 having negative refractive power; and a fifth lens group G5 having positive refractive power.

In the variable power optical system ZL6, the first lens group G1 is constituted by a cemented lens where a negative meniscus lens L11 having a convex surface facing the object and a positive meniscus lens L12 having a convex surface facing the object are cemented in order from the object. The second lens group G2 is constituted by, in order from the object: a negative lens L21 of which aspherical shape is formed by creating a resin layer on the object side lens surface of a negative meniscus lens having a convex surface facing the object; a biconcave lens L22; a biconvex lens L23; and a negative lens L24 of which image side lens surface is aspherical. The third lens group G3 is constituted by, in order from the object: a positive lens L31 of which object side and image side lens surfaces are aspherical; a cemented lens where a biconvex lens L32 and a biconcave lens L33 are cemented; a cemented lens where a biconcave lens L34 and a biconvex lens L35 are cemented; a positive lens L36 of which object side and image side lens surfaces are aspherical. The fourth lens group G4 is constituted by a negative meniscus lens L41 having a convex surface facing the object. The fifth lens group G5 is constituted by a positive lens L51 of which object side lens surface is aspherical. An aperture stop S is disposed between the second lens group G2 and the third lens group G3. A filter group FL including a low-pass filter, an infrared filter or the like is disposed between the fourth lens group G4 and the image plane I. The negative lens L25, the positive lens L31, the positive lens L41 and the positive lens L51 are glass-molded aspherical lenses.

In this variable power optical system ZL6, upon zooming from the wide-angle end state to the telephoto end state, the first lens group G1 and the second lens group G2 move toward the image plane first and then move toward the object, the third lens group G3 moves toward the object, the fourth lens group G4 moves toward the image plane first and then moves toward the object, and the fifth lens group G5 moves toward the object first, and then moves toward the image plane, so that the distance between the first lens group G1 and the second lens group G2 increases, the distance between the second lens group G2 and the third lens group G3 decreases, and the distance between the third lens group G3 and the fourth lens group G4 increases first and then decreases. The aperture stop S moves together with the third lens group G3.

In the variable power optical system ZL6, focusing from infinity to an object at a close distance is performed by moving the fourth lens group G4 toward the image plane.

In the variable power optical system ZL6, the positive lens L36 of the third lens group G3 is used as the vibration-isolating lens group G32, and image blur correction (vibration isolation) is performed by moving the vibration-isolating lens group G32 so as to have a component in a direction orthogonal to the optical axis. In the wide-angle end state of Example 6, the vibration-isolation coefficient is −0.647 and the focal length is 9.3 (mm), therefore the moving distance of the vibration-isolating lens group G32, to correct a 1.02° rotation blur, is −0.165 (mm). In the intermediate focal length state, the vibration-isolation coefficient is −0.897 and the focal length is 19.1 (mm), therefore the moving distance of the vibration-isolating lens group G32, to correct a 0.559° rotation blur, is −0.187 (mm). In the telephoto end state, the vibration-isolation coefficient is −1.02 and the focal length is 29.1 (mm), therefore the moving distance of the vibration-isolating lens group G32, to correct a 0.493° rotation blur, is −0.250 (mm).

Table 21 shows the data values of the variable power optical system ZL6. The surface numbers 1 to 34 in Table 21 correspond to the numbers 1 to 34 in FIG. 26.

TABLE 21

Example 6

[General Data]
Zoom ratio = 3.14

| | Wide-angle end state | | Intermediate focal length state | | Telephoto end state |
|---|---|---|---|---|---|
| f = | 9.3 | ~ | 19.1 | ~ | 29.1 |
| FNO = | 1.8 | ~ | 2.5 | ~ | 2.9 |

TABLE 21-continued

Example 6

| | Wide-angle | | Intermediate | | Telephoto |
|---|---|---|---|---|---|
| 2ω = | 81.8 | ~ | 45.4 | ~ | 30.3 |
| Y = | 7.3 | ~ | 8.0 | ~ | 8.0 |
| TL (air = conversion length) | 97.6 | ~ | 97.9 | ~ | 111.2 |
| BF (air = conversion length) | 13.77 | ~ | 20.21 | ~ | 22.17 |

[Lens Data]

| m | r | d | vd | nd | |
|---|---|---|---|---|---|
| Object plane | ∞ | | | | |
| 1 | 50.656 | 1.60 | 17.98 | 1.94595 | |
| 2 | 37.840 | 4.41 | 46.60 | 1.80400 | |
| 3 | 233.428 | D3 | | | |
| 4* | 4632.762 | 0.20 | 36.64 | 1.56093 | |
| 5 | 109.440 | 1.50 | 42.73 | 1.83481 | |
| 6 | 11.704 | 6.92 | | | |
| 7 | −23.983 | 1.00 | 55.52 | 1.69680 | |
| 8 | 45.374 | 0.84 | | | |
| 9 | 52.381 | 4.25 | 28.69 | 1.79504 | |
| 10 | −21.378 | 1.30 | | | |
| 11 | −13.669 | 0.00 | | | |
| 12 | −13.669 | 0.90 | 49.26 | 1.74330 | |
| 13* | −20.257 | D13 | | | |
| 14 | 0.000 | 0.80 | | | Aperture stop S |
| 15* | 20.620 | 3.77 | 71.67 | 1.55332 | |
| 16* | −59.068 | 0.15 | | | |
| 17 | 73.847 | 7.46 | 22.74 | 1.80809 | |
| 18 | −17.447 | 0.90 | 27.57 | 1.75520 | |
| 19 | 32.860 | 2.95 | | | |
| 20 | −133.340 | 0.90 | 23.78 | 1.84666 | |
| 21 | 22.909 | 4.14 | 82.57 | 1.49782 | |
| 22 | −18.768 | 0.50 | | | |
| 23* | 23.489 | 2.71 | 81.49 | 1.49710 | |
| 24* | −70.000 | D24 | | | |
| 25 | 75.360 | 0.80 | 67.90 | 1.59319 | |
| 26 | 20.437 | D26 | | | |
| 27* | 29.723 | 2.36 | 81.49 | 1.49710 | |
| 28 | 2125.803 | D28 | | | |
| 29 | 0.000 | 0.50 | 63.88 | 1.51680 | |
| 30 | 0.000 | 1.11 | | | |
| 31 | 0.000 | 1.59 | 63.88 | 1.51680 | |
| 32 | 0.000 | 0.30 | | | |
| 33 | 0.000 | 0.70 | 63.88 | 1.51680 | |
| 34 | 0.000 | 0.70 | | | |

[Lens Group Focal Length]

| Lens group | First surface | Focal length |
|---|---|---|
| First lens group | 1 | 85.36 |
| Second lens group | 4 | −14.13 |
| Third lens group | 15 | 20.88 |
| Fourth lens group | 25 | −47.53 |
| Fifth lens group | 27 | 60.62 |

In this variable power optical system ZL6, Surface 4, Surface 13, Surface 15, Surface 16, Surface 23, Surface 24 and Surface 27 are aspherical. Table 22 shows aspherical data, that is, the values of the conical coefficient K and each aspherical coefficient A4 to A10.

TABLE 22

[Aspherical Data]

|  | K | A4 | A6 | A8 | A10 |
|---|---|---|---|---|---|
| Surface 4 | 0 | 4.14925E−05 | −1.40193E−07 | 3.89689E−10 | −2.54524E−13 |
| Surface 13 | 0 | −1.53196E−05 | −7.94859E−08 | −1.88545E−11 | −1.26565E−12 |
| Surface 15 | 0 | −9.91269E−06 | 7.57161E−08 | 3.07024E−11 | 0.00000E+00 |
| Surface 16 | 0 | 3.48959E−05 | 8.65483E−08 | 0.00000E+00 | 0.00000E+00 |
| Surface 23 | 0 | −1.31286E−05 | −1.33696E−07 | 0.00000E+00 | 0.00000E+00 |
| Surface 24 | 0 | −2.92174E−06 | −1.15116E−07 | 6.91626E−11 | 8.78230E−13 |
| Surface 27 | 0 | −1.97816E−06 | −1.62889E−08 | 1.79202E−10 | 0.00000E+00 |

In the variable power optical system ZL6, the axial air distance D3 between the first lens group G1 and the second lens group G2, the axial air distance D13 between the second lens group G2 and the third lens group G3 (aperture stop S), the axial air distance D24 between the third lens group G3 and the fourth lens group G4, the axial air distance D26 between the fourth lens group G4 and the fifth lens group G5 and the axial air distance D28 between the fifth lens group G5 and the filter group FL change upon zooming, as mentioned above. Table 23 shows the variable distance in each focal length state of the wide-angle end state, intermediate focal length state and telephoto end state upon focusing on infinity.

TABLE 23

[Variable Distance Data]

|  | Wide-angle end | Intermediate | Telephoto end |
|---|---|---|---|
| f | 9.3 | 19.1 | 29.1 |
| D3 | 1.20 | 10.52 | 22.40 |
| D13 | 25.66 | 6.03 | 1.50 |
| D24 | 1.50 | 1.61 | 1.50 |
| D26 | 5.10 | 9.21 | 13.32 |
| D28 | 9.82 | 16.26 | 18.22 |

Table 24 shows each conditional expression correspondence value of the variable power optical system ZL6. In Example 6, the positive lens included in the vibration-isolating lens group G32 is the positive lens L36, the positive lens included in the object side group G3a is the positive lens L31, and the final lens group is the fifth lens group G5.

TABLE 24

[Conditional Expression Correspondence Value]

(4) vdO = 71.7
(6) fv × FNOw/f3 = 3.15
(8) f3/ΔT3 = 1.49
(9) ndVR − 0.0052 × vdVR − 1.965 = −0.044
(10) vdVR = 81.49
(11) fr/fw = 6.54
(12) f3/(fw × ft)$^{1/2}$ = 1.27

Thus the variable power optical system ZL6 satisfies the above conditional expressions (4), (6), (8) to (12).

Figure 27A:
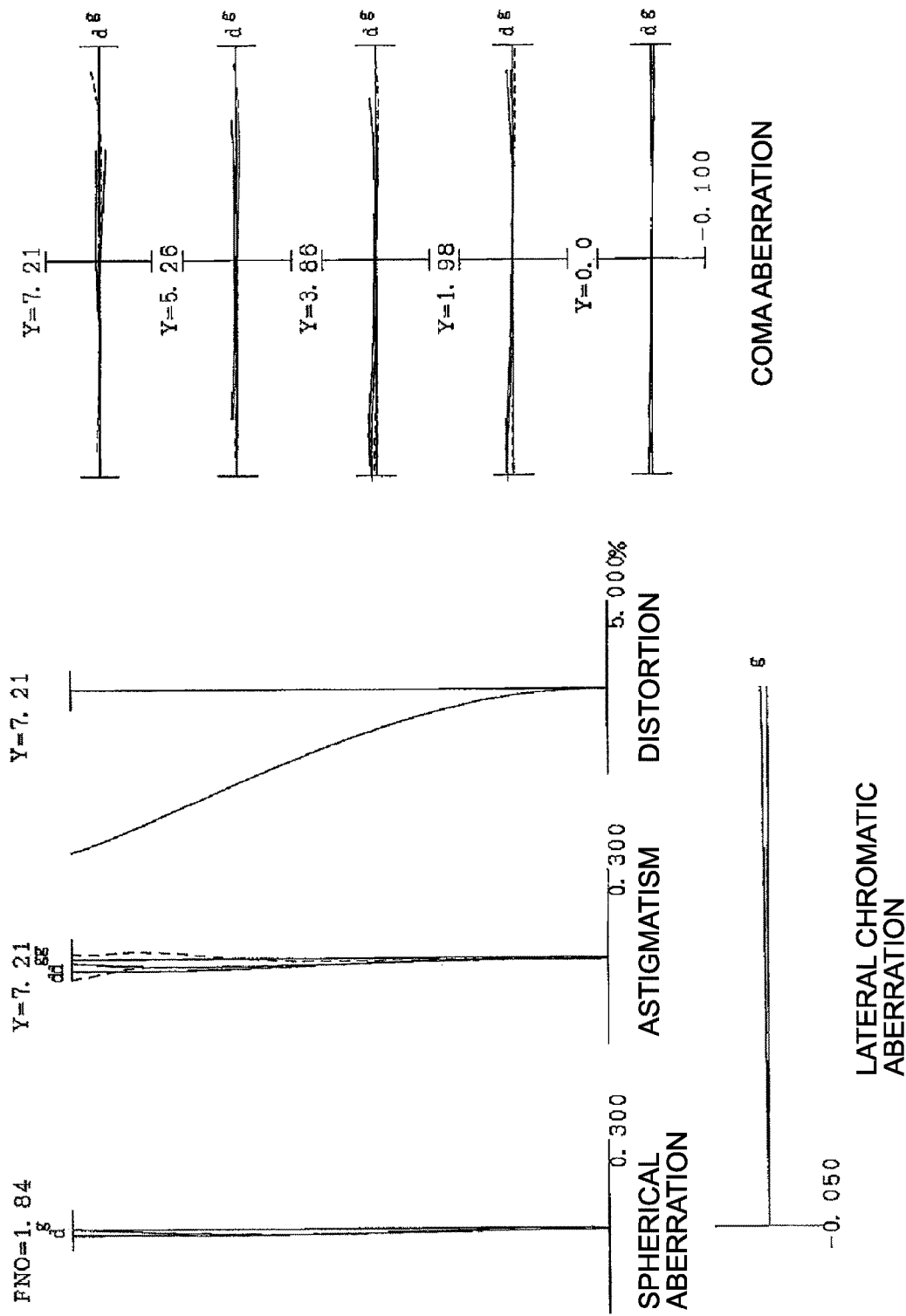
FIGS. 27A and 27B are graphs showing various aberrations of the variable power optical system according to Example 6 upon focusing on infinity, where FIG. 27A are graphs showing various aberrations in the wide-angle end state, and FIG. 27B are graphs showing coma aberrations when image blur is corrected in the wide-angle end state.
Figure 27B:
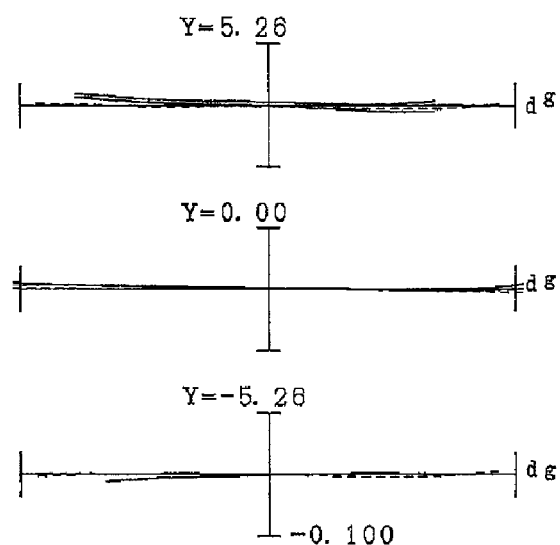
Figure 28A:
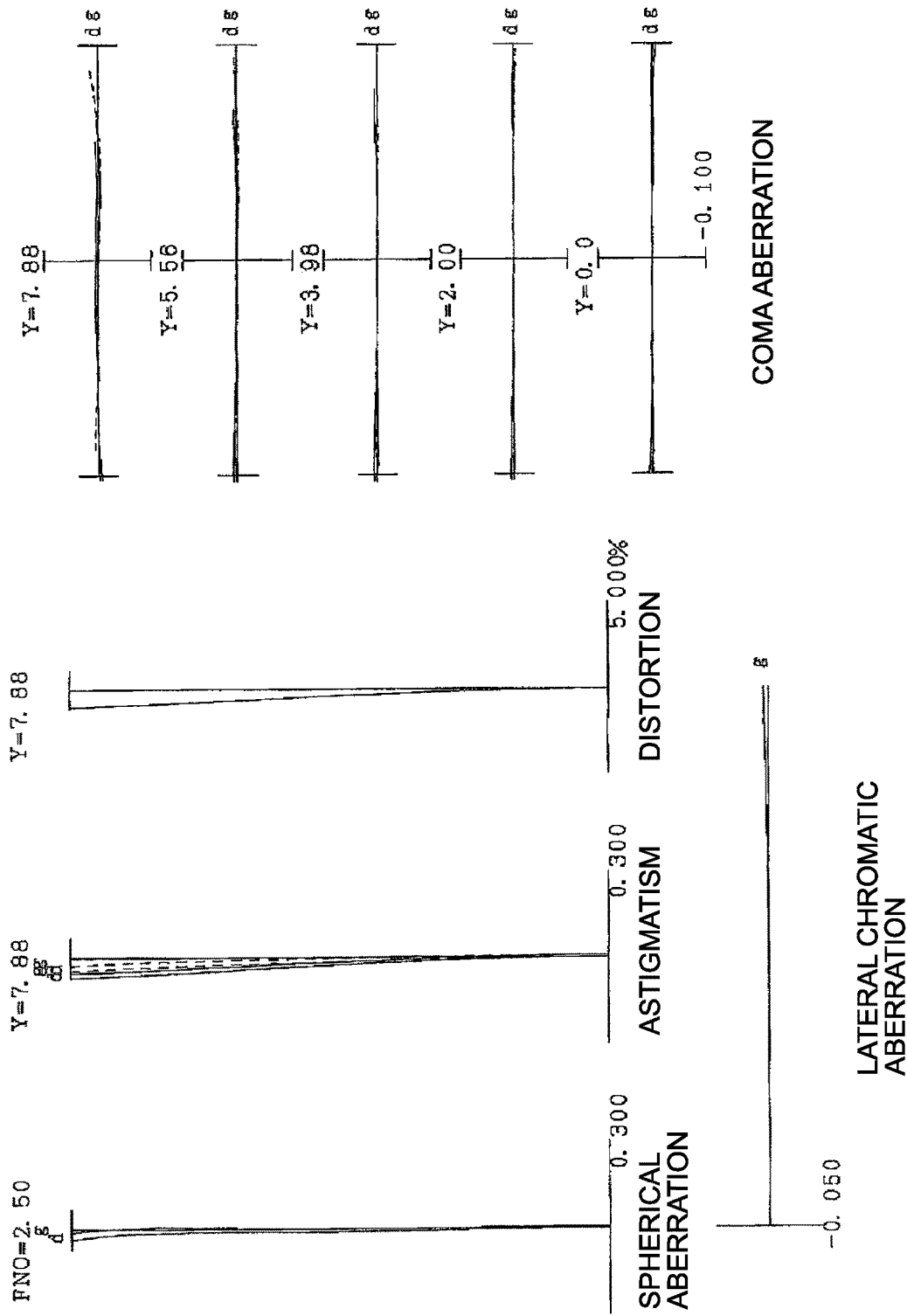
FIGS. 28A and 28B are graphs showing various aberrations of the variable power optical system according to Example 6 upon focusing on infinity, where FIG. 28A are graphs showing various aberrations in the intermediate focal length state, and FIG. 28B are graphs showing coma aberrations when image blur is corrected in the intermediate focal length state.
Figure 28B:
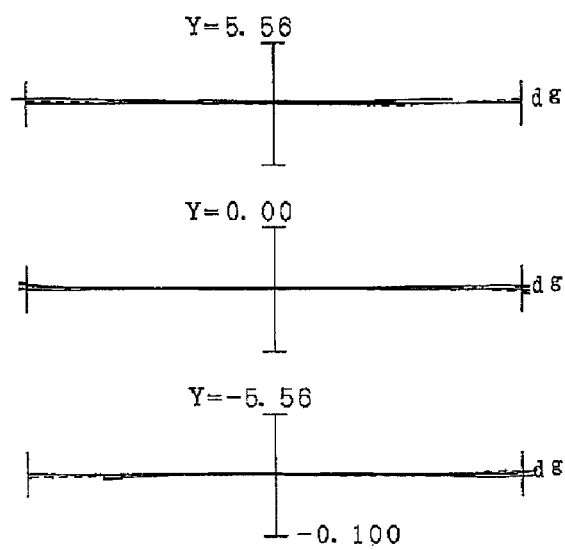
Figure 29A:
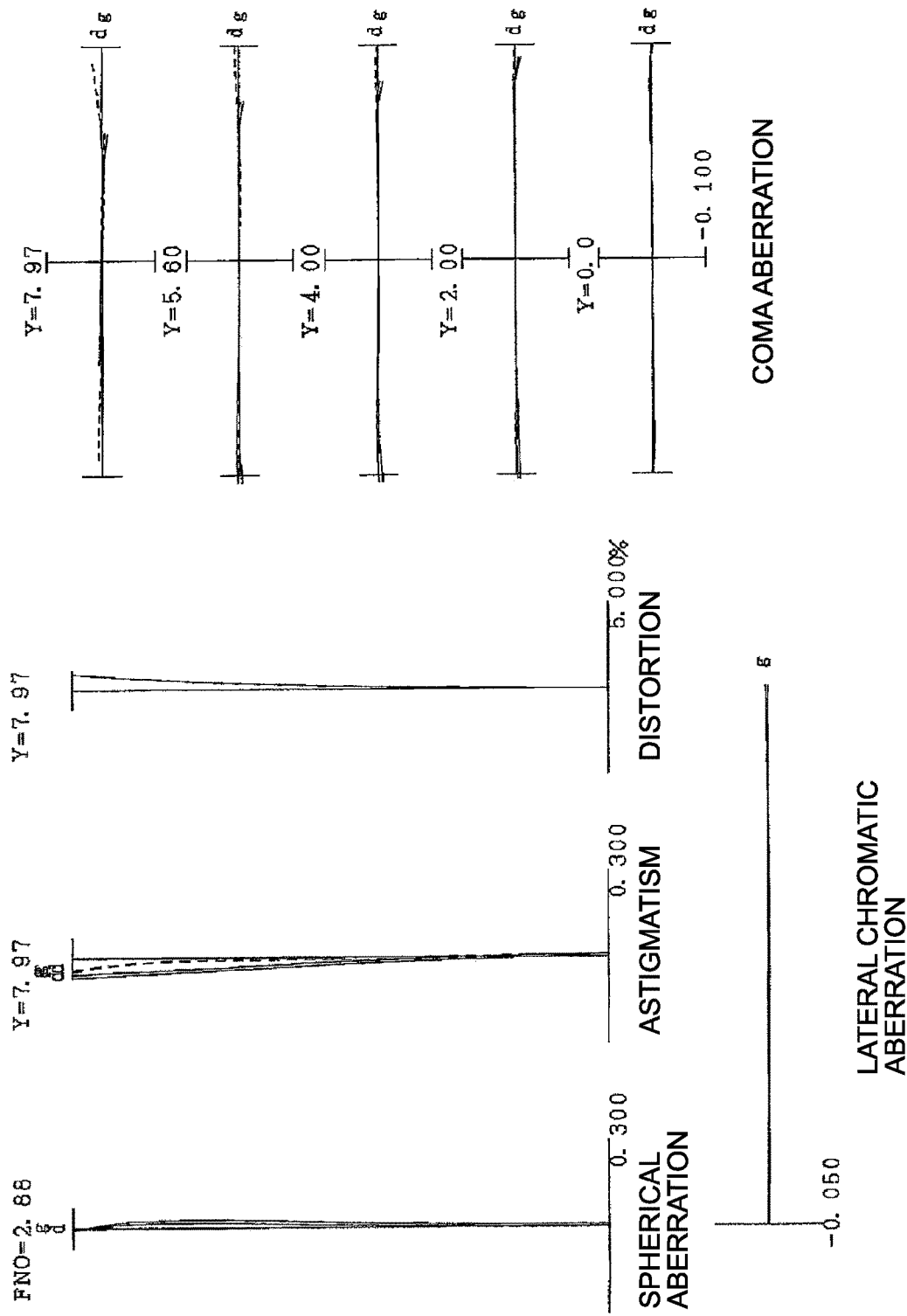
FIGS. 29A and 29B are graphs showing various aberrations of the variable power optical system according to Example 6 upon focusing on infinity, where FIG. 29A are graphs showing various aberrations in the telephoto end state, and FIG. 29B are graphs showing coma aberrations when image blur is corrected in the telephoto end state.
Figure 29B:
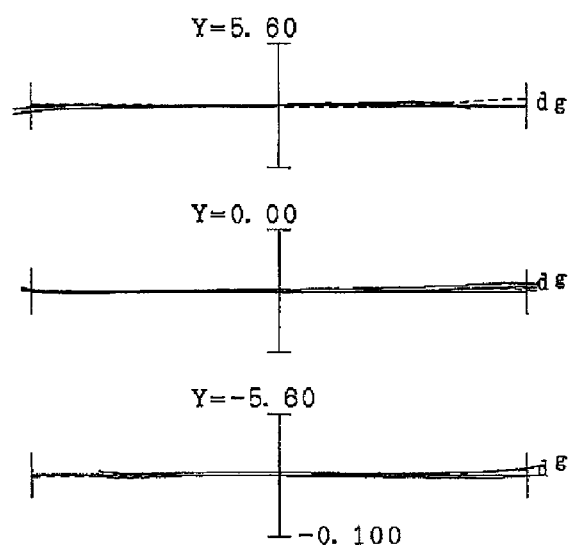

FIG. 27A, FIG. 28A and FIG. 29A are graphs showing spherical aberration, astigmatism, distortion, lateral chromatic aberration and coma aberration of the variable power optical system ZL6 upon focusing on infinity in the wide-angle end state, intermediate focal length state, and telephoto end state, and FIG. 27B, FIG. 28B and FIG. 29B are graphs showing coma aberration when image blur is corrected upon focusing on infinity in the wide-angle end state, intermediate focal length state and telephoto end state. As each graph showing aberration clarifies, various aberrations are corrected well in the variable power optical system ZL6, from the wide-angle end state to the telephoto end state.

EXPLANATION OF NUMERALS AND CHARACTERS 1 camera (optical apparatus)
ZL (ZL1 to ZL6) ariable power optical system
G1 first lens group
G2 second lens group
G3 rear group (third lens group)
G3a object side group
G3b intermediate group
G32 vibration-isolating lens group
G4 fourth lens group (final lens group)
G5 fifth lens group (final lens group)

The invention claimed is:

1. A variable power optical system comprising, in order from an object toward an image on an image side:
a first lens group having positive refractive power;
a second lens group having negative refractive power;
a third lens group having positive refractive power; and
a fourth lens group having positive or negative refractive power,
a distance between the first lens group and the second lens group, a distance between the second lens group and the third lens group, and a distance between the third lens group and the fourth lens group changing respectively upon zooming from a wide-angle end state to a telephoto end state,
the third lens group comprising, in order from the object, a first positive lens, a second positive lens, a first negative lens, a second negative lens and a third positive lens,
the third or the fourth lens group including a focusing group which is moved along an optical axis upon focusing, and
the focusing group consisting of a negative meniscus lens having a concave surface facing the image.

2. The variable power optical system according to claim 1, wherein a positive lens is provided next to the focusing group on the image side.

3. The variable power optical system according to claim 1, wherein the focusing group satisfies the following conditional expressions:

$$ndF + 0.0052 \times vdF - 1.965 < 0$$

$$vdF > 60$$

where ndF denotes a refractive index of a medium of the negative lens included in the focusing group at d-line, and νdF denotes an Abbe number of the medium of the negative meniscus lens included in the focusing group.

4. The variable power optical system according to claim 1, wherein the first positive lens satisfies the following conditional expression:

$$\nu dO > 60$$

where νdO denotes an Abbe number of a medium of the first positive lens.

5. The variable power optical system according to claim 1, wherein the second lens group comprises, in order from the object, a negative lens, a negative lens, a positive lens and a negative lens.

6. The variable power optical system according to claim 1, wherein the second lens group moves toward the image at first and then moves toward the object upon zooming from the wide-angle end state to the telephoto end state.

7. The variable power optical system according to claim 1, wherein the focusing group is placed next to the third positive lens on the image side, and a distance between the third positive lens and the focusing group changes upon zooming.

8. The variable power optical system according to claim 1, wherein a third negative lens, a fourth positive lens and a fourth negative lens are provided next to the third positive lens on the image side.

9. The variable power optical system according to claim 1, wherein the following conditional expression is satisfied:

$$0.9 < f3/(fw \times ft)^{1/2} < 2.0$$

where f3 denotes a focal length of the third lens group, fw denotes a focal length of the variable power optical system in the wide-angle end state, and ft denotes a focal length of the variable power optical system in the telephoto end state.

10. An optical apparatus comprising the variable power optical system according to claim 1.

11. A variable power optical system comprising, in order from an object:
a first lens group having positive refractive power;
a second lens group having negative refractive power;
a third lens group having positive refractive power; and
a fourth lens group having positive or negative refractive power,
a distance between the first lens group and the second lens group, a distance between the second lens group and the third lens group and a distance between the third lens group and the fourth lens group changing respectively upon zooming from a wide-angle end state to a telephoto end state,
the third lens group including, in order from the object, a first positive lens, a second positive lens, a first negative lens, a second negative lens and a third positive lens, and
the third lens group including a focusing group which is moved along an optical axis upon focusing.

12. The variable power optical system according to claim 11, wherein the third lens group comprises a vibration-isolating lens group which can move so as to have a movement component in a direction orthogonal to the optical axis upon correcting camera shake.

13. The variable power optical system according to claim 12, wherein the vibration-isolating lens group consists of one cemented lens.

14. The variable power optical system according to claim 12, wherein the vibration-isolating lens group consists of one negative lens and one positive lens.

15. The variable power optical system according to claim 11, wherein the following conditional expression is satisfied:

$$0.9 < f3/(fw \times ft)^{1/2} < 2.0$$

where f3 denotes a focal length of the third lens group, fw denotes a focal length of the variable power optical system in the wide-angle end state, and ft denotes a focal length of the variable power optical system in the telephoto end state.

16. The variable power optical system according to claim 11, wherein the first positive lens satisfies the following conditional expression:

$$\nu dO > 60$$

where νdO denotes an Abbe number of a medium of the first positive lens.

17. An optical apparatus comprising the variable power optical system according to claim 11.

18. A variable power optical system consisting of, in order from an object:
a first lens group having positive refractive power;
a second lens group having negative refractive power;
a third lens group having positive refractive power; and
a fourth lens group having positive or negative refractive power,
a distance between the first lens group and the second lens group, a distance between the second lens group and the third lens group and a distance between the third lens group and the fourth lens group changing respectively upon zooming from a wide-angle end state to a telephoto end state,
the third lens group comprising, in order from the object, a first positive lens, a second positive lens, a first negative lens, a second negative lens and a third positive lens,
the third or the fourth lens group including a focusing group which is moved along an optical axis upon focusing, and
the focusing group having negative refractive power.

19. A method of manufacturing a variable power optical system, comprising:
arranging, in order from an object, a first lens group having positive refractive power, a second lens group having negative refractive power, a third lens group having positive refractive power; and a fourth lens group having positive or negative refractive power,
the lens groups being arranged such that a distance between the first lens group and the second lens group, a distance between the second lens group and the third lens group and a distance between the third lens group and the fourth lens group change respectively upon zooming from a wide-angle end state to a telephoto end state, and
the third lens group comprising, in order from the object, a first positive lens, a second positive lens, a first negative lens, a second negative lens and a third positive lens,
the method further comprising one of the following features (A), (B) or (C):
the feature (A) including:
configuring the third or the fourth lens group to include a focusing group which is moved along an optical axis upon focusing,
the focusing group consisting of a negative meniscus lens having a concave surface facing the image, the feature (B) including:
configuring the third lens group to include a focusing group which is moved along an optical axis upon focusing,
the feature (C) including:
configuring the variable power optical system to consist of the first to the fourth lens groups, and
configuring the third or the fourth lens group to include a focusing group which is moved along an optical axis upon focusing,
the focusing group having negative refractive power.

* * * * *